United States Patent
Beaston

(10) Patent No.: US 9,331,497 B2
(45) Date of Patent: May 3, 2016

(54) ELECTRICAL ENERGY STORAGE UNIT AND CONTROL SYSTEM AND APPLICATIONS THEREOF

(75) Inventor: Virgil Lee Beaston, Tualatin, OR (US)

(73) Assignee: POWIN ENERGY CORPORATION, Tualatin, OR (US)

( * ) Notice: Subject to any disclaimer, the term of this patent is extended or adjusted under 35 U.S.C. 154(b) by 153 days.

(21) Appl. No.: 13/978,689

(22) PCT Filed: Mar. 5, 2011

(86) PCT No.: PCT/CN2011/071548
§ 371 (c)(1),
(2), (4) Date: Aug. 27, 2013

(87) PCT Pub. No.: WO2012/119297
PCT Pub. Date: Sep. 13, 2012

(65) Prior Publication Data
US 2013/0328530 A1   Dec. 12, 2013

(51) Int. Cl.
H02J 7/00 (2006.01)
H01M 10/42 (2006.01)
H02J 3/38 (2006.01)

(52) U.S. Cl.
CPC ............ *H02J 7/00* (2013.01); *H01M 10/4207* (2013.01); *H02J 3/383* (2013.01); *H02J 3/386* (2013.01); *H02J 7/0019* (2013.01); *H01M 2200/108* (2013.01); *Y02E 10/563* (2013.01); *Y02E 10/763* (2013.01)

(58) Field of Classification Search
CPC .................. H01M 10/4207; H01M 2200/108; H02J 7/0019; H02J 3/383; H02J 3/386; H02J 7/00; Y02E 10/563; Y02E 10/763

USPC ......................................................... 320/128
See application file for complete search history.

(56) References Cited

U.S. PATENT DOCUMENTS

| | | | |
|---|---|---|---|
| 6,172,481 B1 * | 1/2001 | Curtiss .......................... | 320/127 |
| 2004/0189248 A1 * | 9/2004 | Boskovitch et al. .......... | 320/116 |
| 2008/0093851 A1 * | 4/2008 | Maeda et al. ................ | 290/40 A |

(Continued)

FOREIGN PATENT DOCUMENTS

| CN | 1367565 A | 9/2002 |
|---|---|---|
| CN | 2648617 Y | 10/2004 |

(Continued)

OTHER PUBLICATIONS

International Preliminary Report on Patentability, mailed Sep. 10, 2013, in International Patent Application No. PCT/CN2011/071548; 5 pages.

International Search Report and Written Opinion on Patentability, mailed Dec. 1, 2011, in International Patent Application No. PCT/CN2011/071548; 10 pages.

(Continued)

*Primary Examiner* — Vuthe Siek
(74) *Attorney, Agent, or Firm* — Sterne, Kessler, Goldstein & Fox P.L.L.C.

(57) ABSTRACT

An electrical energy storage unit and control system, and applications thereof. In an embodiment, the electrical energy storage unit includes a battery system controller and battery packs. Each battery pack has battery cells, a battery pack controller that monitors the cells, a battery pack cell balancer that adjusts the amount of energy stored in the cells, and a battery pack charger. The battery pack controller operates the battery pack cell balancer and the battery pack charger to control the state-of-charge of the cells. In an embodiment, the cells are lithium ion battery cells.

20 Claims, 39 Drawing Sheets

(56) References Cited

U.S. PATENT DOCUMENTS

| | | | |
|---|---|---|---|
| 2009/0243540 A1 | 10/2009 | Choi et al. | |
| 2010/0237829 A1* | 9/2010 | Tatebayashi | H01M 4/661 320/118 |
| 2012/0062187 A1* | 3/2012 | Shim | 320/167 |
| 2012/0068715 A1* | 3/2012 | Martaeng | 324/434 |
| 2012/0074911 A1* | 3/2012 | Murao | H02J 7/0014 320/134 |
| 2014/0015469 A1* | 1/2014 | Beaston et al. | 320/101 |

FOREIGN PATENT DOCUMENTS

| | | |
|---|---|---|
| CN | 2796215 Y | 7/2006 |
| CN | 1819395 A | 8/2006 |
| CN | 101192755 A | 6/2008 |

OTHER PUBLICATIONS

U.S. Appl. No. 14/678,074, "Electrical Energy Storage Unit and Control System and Applications Thereof," to Beaston, et al., filed Apr. 3, 2015.

U.S. Appl. No. 14/851,460, "Battery Management System (BMS) Having Isolated, Distributed, Daisy-Chained Battery Module Controllers," to Nystrom, et al., filed Sep. 11, 2015.

U.S. Appl. No. 14/851,482, "Battery Pack with Integrated Battery Management System," to Beaston, et al., filed Sep. 11, 2015.

U.S. Appl. No. 14/932,688, "Battery Energy Storage System," to Beaston, filed Nov. 4, 2015.

U.S. Appl. No. 14/962,491, "Battery Energy Storage System and Control System and Applications Thereof," to Beaston, filed Dec. 8, 2015.

* cited by examiner

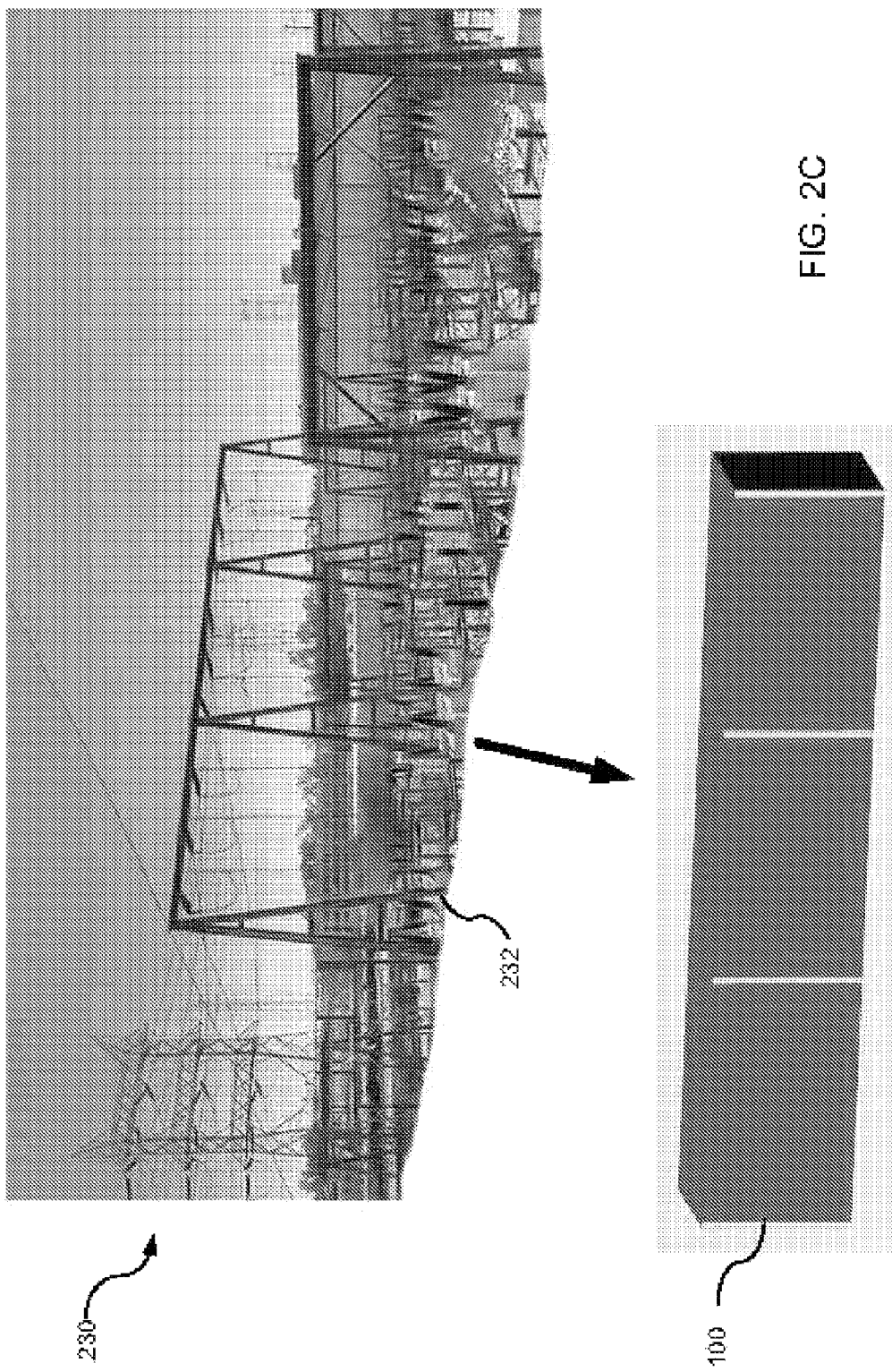

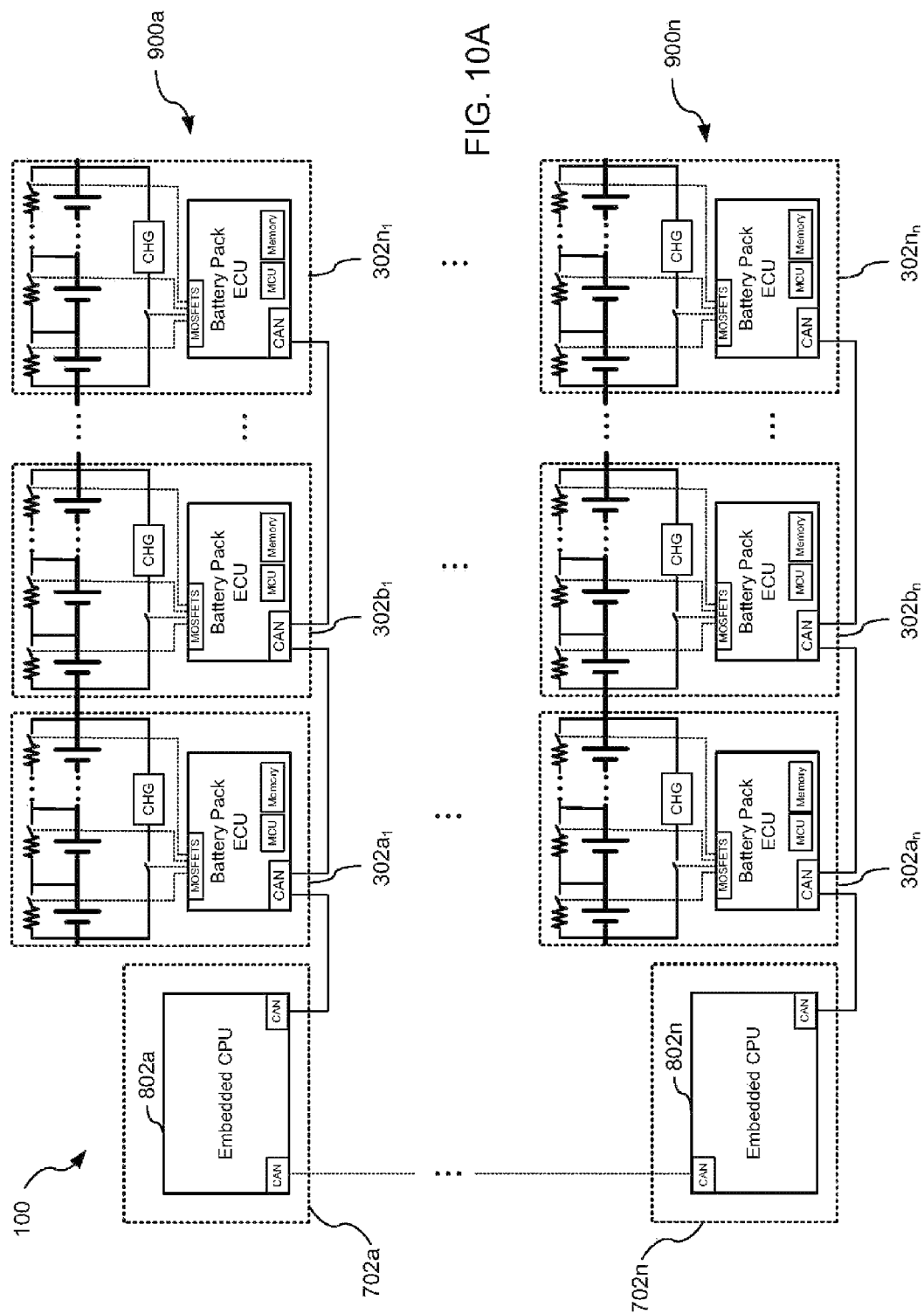

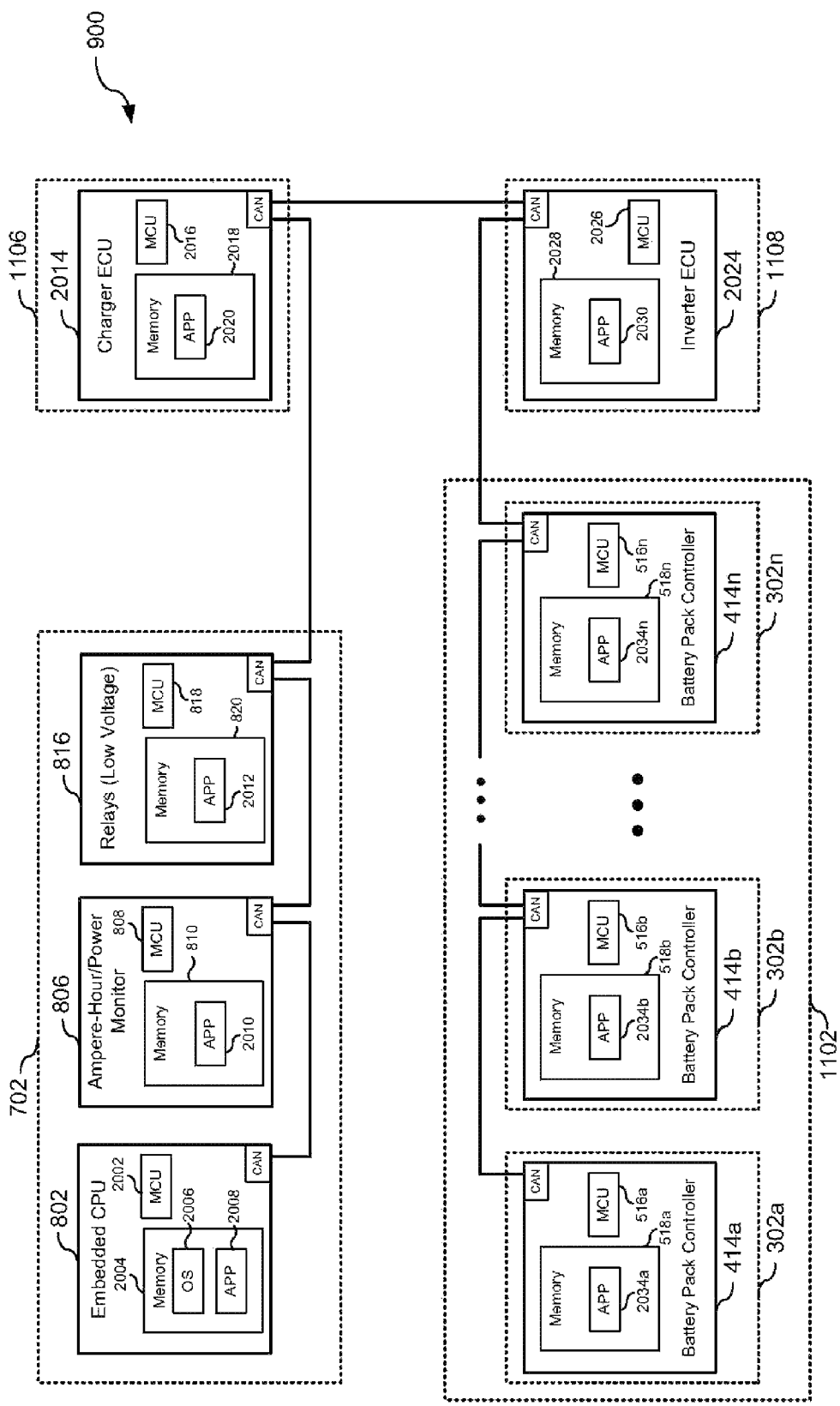

| Battery Pack Table | | | | | | | Last Calibration Discharge | | | Last Calibration Charge | | | AH Eff. | WH Eff. | Self Discharge Rate |
|---|---|---|---|---|---|---|---|---|---|---|---|---|---|---|---|
| | SOC | Voltage | Temp | AH Dischargeable | WH Dischargeable | Capacity | Date | AH DCHG | WH DCHG | Date | AH CHG | WH CHG | | | |
| Battery Pack | 0.70 | 53.44 | 22.0 | 28.6 | 1464 | 40.8 | 0815 2011 | 40.8 | 2091 | 0815 2011 | 40.8 | 2232 | 1.00 | 0.92 | 0.093 |
| Cell-0 | 0.70 | 3.34 | 22.1 | 28.8 | 93 | 41.2 | 0815 2011 | 41.2 | 132 | 0815 2011 | 41.2 | 143 | 1.00 | 0.92 | 0.093 |
| Cell-1 | 0.70 | 3.34 | 22.2 | 28.6 | 92 | 40.9 | 0815 2011 | 40.9 | 131 | 0815 2011 | 40.9 | 142 | 1.00 | 0.92 | 0.093 |
| ... | ... | ... | ... | ... | ... | ... | ... | ... | ... | ... | ... | ... | ... | ... | ... |
| Cell-N | 0.70 | 3.34 | 22.0 | 28.7 | 92 | 41.0 | 0815 2011 | 41.0 | 131 | 0815 2011 | 41.0 | 142 | 1.00 | 0.92 | 0.093 |

Battery Table — 2200

| Battery | SOC | | | Voltage | | | Temp | | | AH Dischargeable | WH Dischargeable |
|---|---|---|---|---|---|---|---|---|---|---|---|
| | Value | High Cell | Low Cell | Value | High Cell | Low Cell | Value | High Cell | Low Cell | | |
| BP-0 | 0.70 | 0.71 | 0.70 | 4027.4 | 3.35 | 3.32 | 22.0 | 22.2 | 21.8 | 28.6 | 1371.2 |
| BP-1 | 0.70 | 0.70 | 0.70 | 53.44 | 3.34 | 3.32 | 22.0 | 22.1 | 21.9 | 28.7 | 1469 |
| ... | 0.70 | 0.70 | 0.70 | 53.40 | 3.34 | 3.33 | 22.0 | 22.2 | 22.0 | 28.6 | 1464 |
| ... | ... | ... | ... | ... | ... | ... | ... | ... | ... | ... | ... |
| BP-N | 0.70 | 0.71 | 0.70 | 53.40 | 3.35 | 3.34 | 22.0 | 22.2 | 21.9 | 28.6 | 1465 |

FIG. 22A

Battery Table 2200

| Battery | WH Dischargeable | Capacity | Last Calibration Discharge | | | Last Calibration Charge | | | AH Eff | WH Eff | Self Discharge Rate |
|---|---|---|---|---|---|---|---|---|---|---|---|
| | | | Date | AH DCHG | WH DCHG | Date | AH CHG | WH CHG | | | |
| BP-0 | 1712 | 40.8 | 0815 2011 | 40.8 | 1672 | 0815 2011 | 40.0 | 1818 | 1.00 | 0.92 | 0.031 |
| BP-1 | 1469 | 40.9 | 0815 2011 | 40.9 | 2096 | 0815 2011 | 40.9 | 2278 | 1.00 | 0.92 | 0.030 |
| ... | 1464 | 40.8 | 0815 2011 | 40.8 | 2091 | 0815 2011 | 40.8 | 2272 | 1.00 | 0.92 | 0.031 |
| ... | ... | ... | ... | ... | ... | ... | ... | ... | ... | ... | ... |
| BP-N | 1469 | 40.9 | 0815 2011 | 40.9 | 2096 | 0815 2011 | 40.9 | 2278 | 1.00 | 0.92 | 0.030 |

ELECTRICAL ENERGY STORAGE UNIT AND CONTROL SYSTEM AND APPLICATIONS THEREOF

FIELD OF THE INVENTION

The present invention generally relates to electrical energy storage. More particularly, it relates to an electrical energy storage unit and control system, and applications thereof.

BACKGROUND OF THE INVENTION

Electrical energy is vital to modern national economies. Increasing electrical energy demand and a trend towards increasing the use of renewable energy assets to generate electricity, however, are creating pressures on aging electrical infrastructures that have made them more vulnerable to failure, particularly during peak demand periods. In some regions, the increase in demand is such that periods of peak demand are dangerously close to exceeding the maximum supply levels that the electrical power industry can generate and transmit.

What are needed are new energy storage systems, methods, and apparatuses that allow electricity to be generated and used in a more cost effective and reliable manner.

BRIEF SUMMARY OF THE INVENTION

The present invention provides an electrical energy storage unit and control system, and applications thereof. In an embodiment, the electrical energy storage unit includes a battery system controller and battery packs. Each battery pack has battery cells, a battery pack controller that monitors the cells, a battery pack cell balancer that adjusts the amount of energy stored in the cells, and a battery pack charger. The battery pack controller operates the battery pack cell balancer and the battery pack charger to control the state-of-charge of the cells. In an embodiment, the cells are lithium ion battery cells.

In one embodiment, the battery pack cell balancer includes resistors that are used to discharge energy stored in the battery cells. In another embodiment, the battery pack cell balancer includes capacitors, inductors, or both that are used to transfer energy between the battery cells.

In an embodiment, an ampere-hour monitor calculates an ampere-hour value that is used by the battery pack controllers in determining the state-of-charge of each of the battery cells.

In an embodiment, a relay controller operates relays that control the charge and discharge of the battery cells as well as other functions such as, for example, turning-on and turning-off of cooling fans, controlling power supplies, et cetera.

It is a feature of the invention that the energy storage unit and control system are highly scalable, ranging from small kilowatt-hour size electrical energy storage units to megawatt-hour size electrical energy storage units. It is also a feature of the invention that it can control and balance battery cells based on cell state-of-charge calculations in addition to cell voltages.

Further embodiments, features, and advantages of the invention, as well as the structure and operation of various embodiments of the invention, are described in detail below with reference to the accompanying drawings.

BRIEF DESCRIPTION OF THE DRAWINGS/FIGURES

The accompanying drawings/figures, which are incorporated herein and form a part of the specification, illustrate the present invention and, together with the description, further serve to explain the principles of the invention and to enable a person skilled in the pertinent art to make and use the invention.

FIG. 2C is a diagram that illustrates the electrical energy storage unit of FIG. 1 being used in conjunction with the power grid.

Figure 8A:
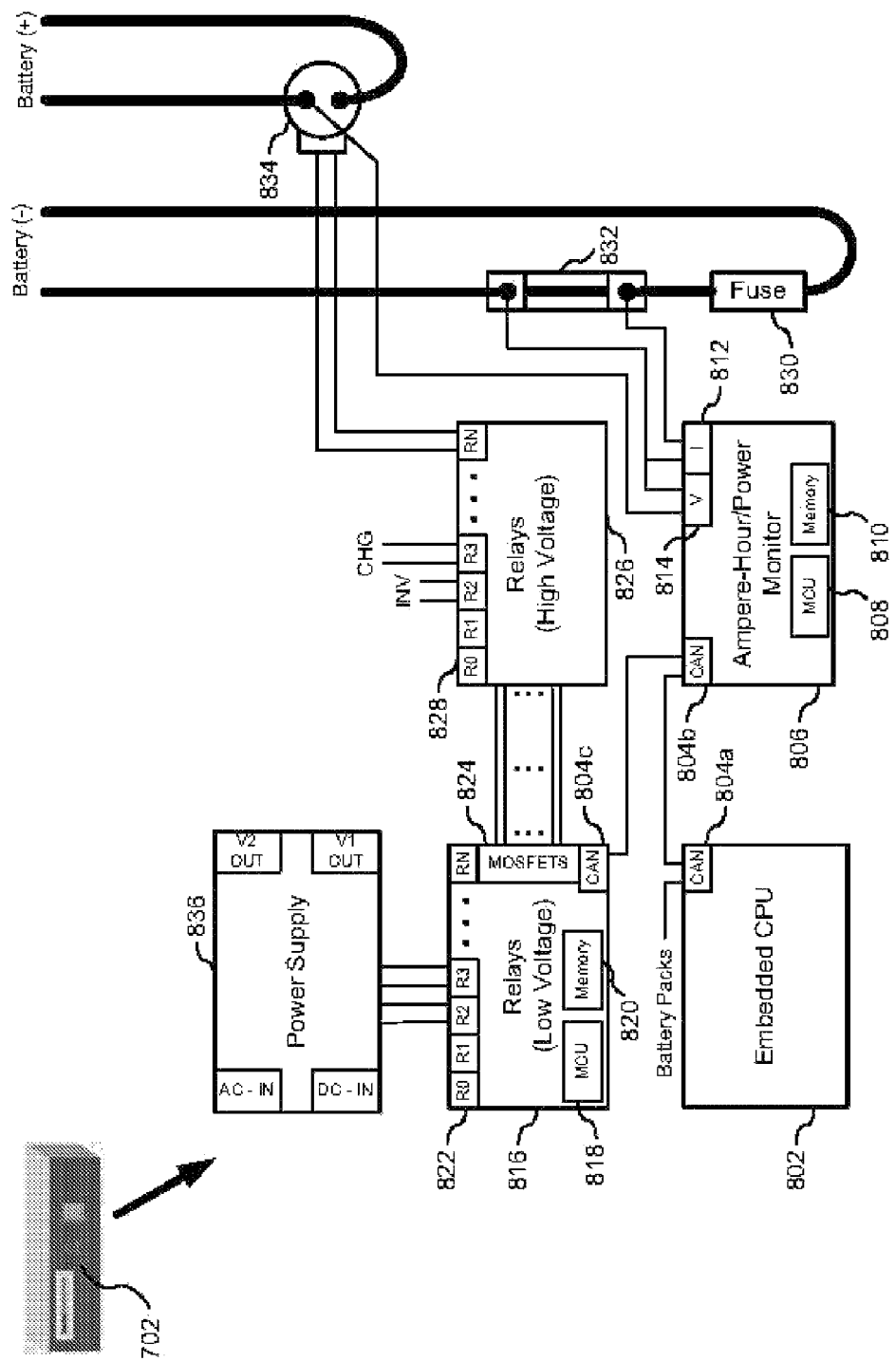
Figure 8B:
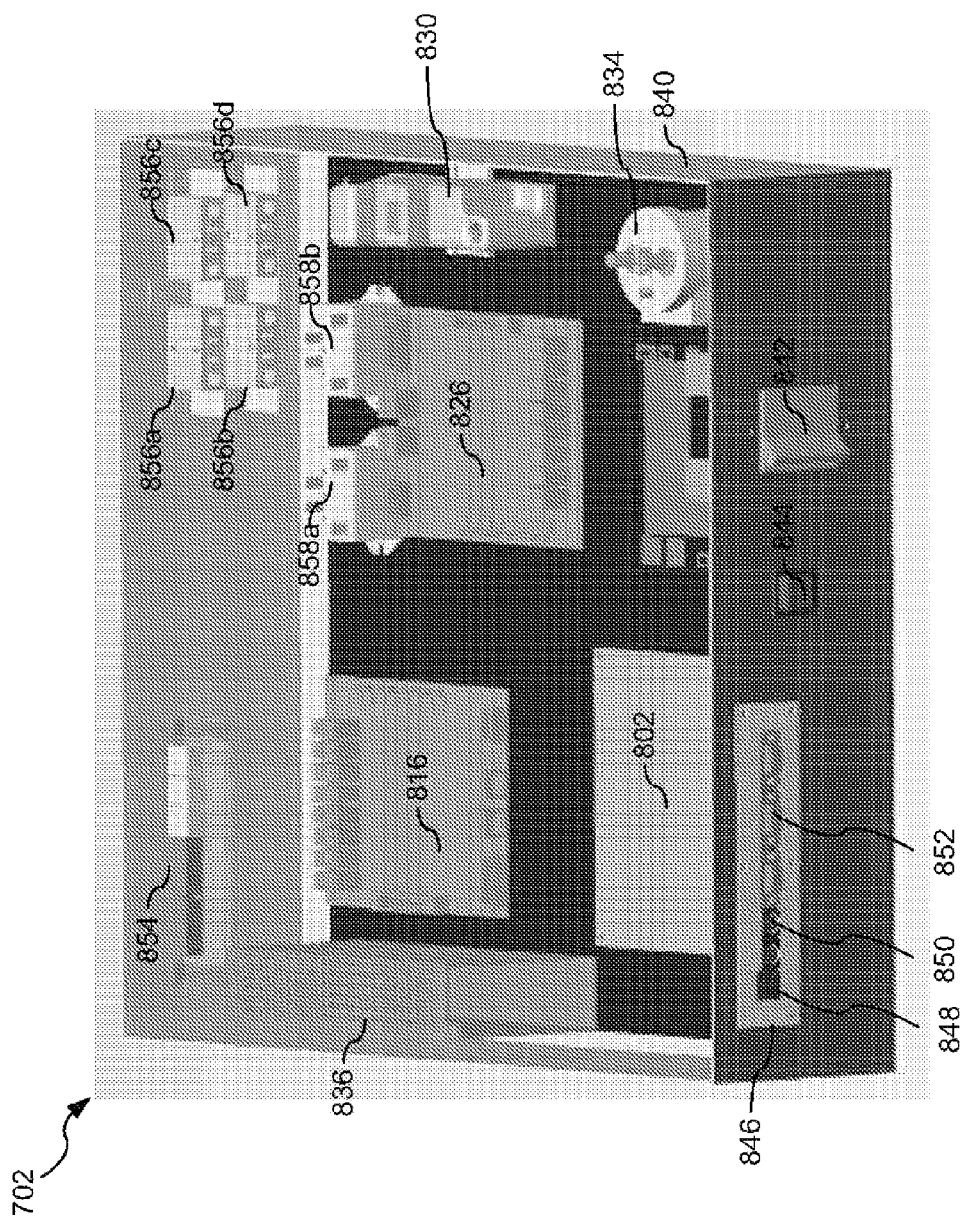
Figure 8C:
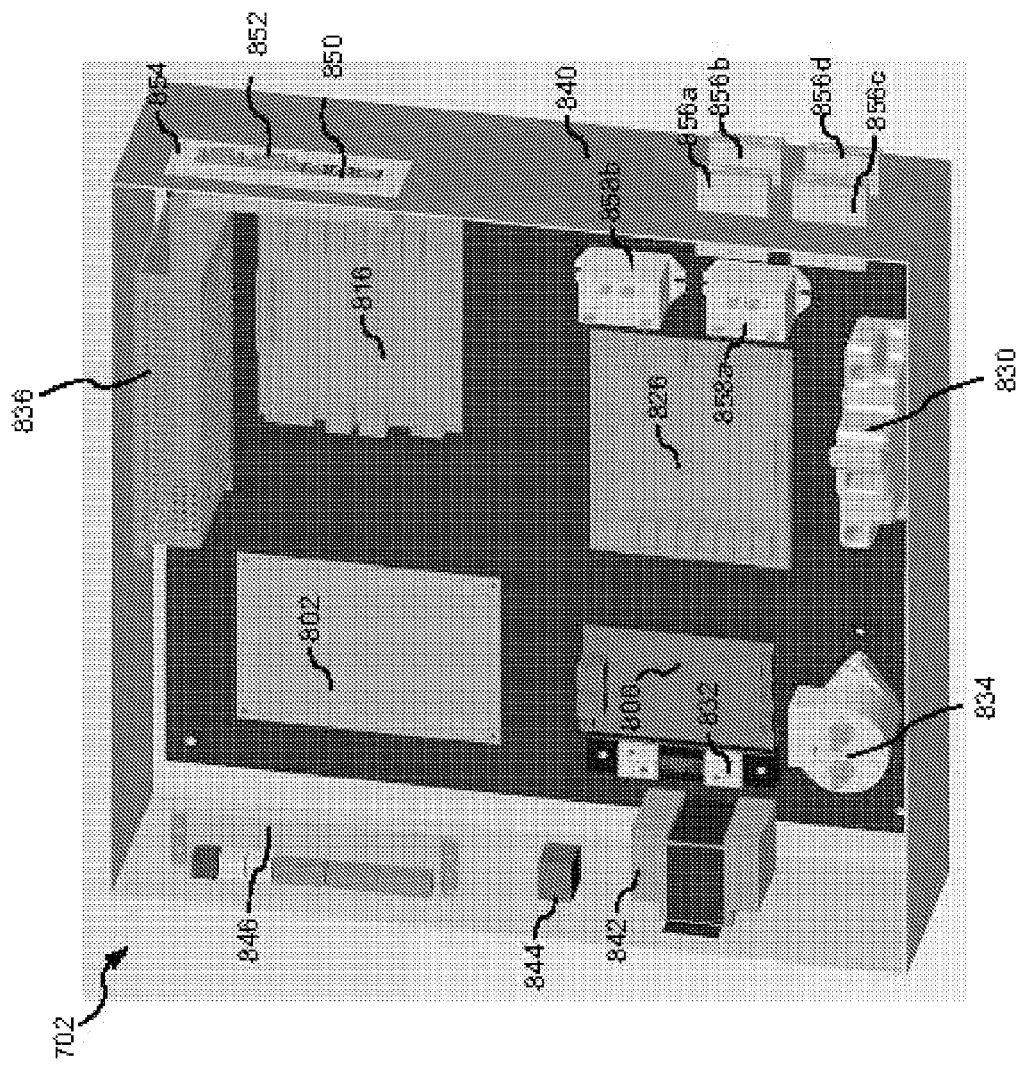

FIGS. 8A-C are diagrams that illustrate a battery system controller according to an embodiment of the invention.

Figure 9:
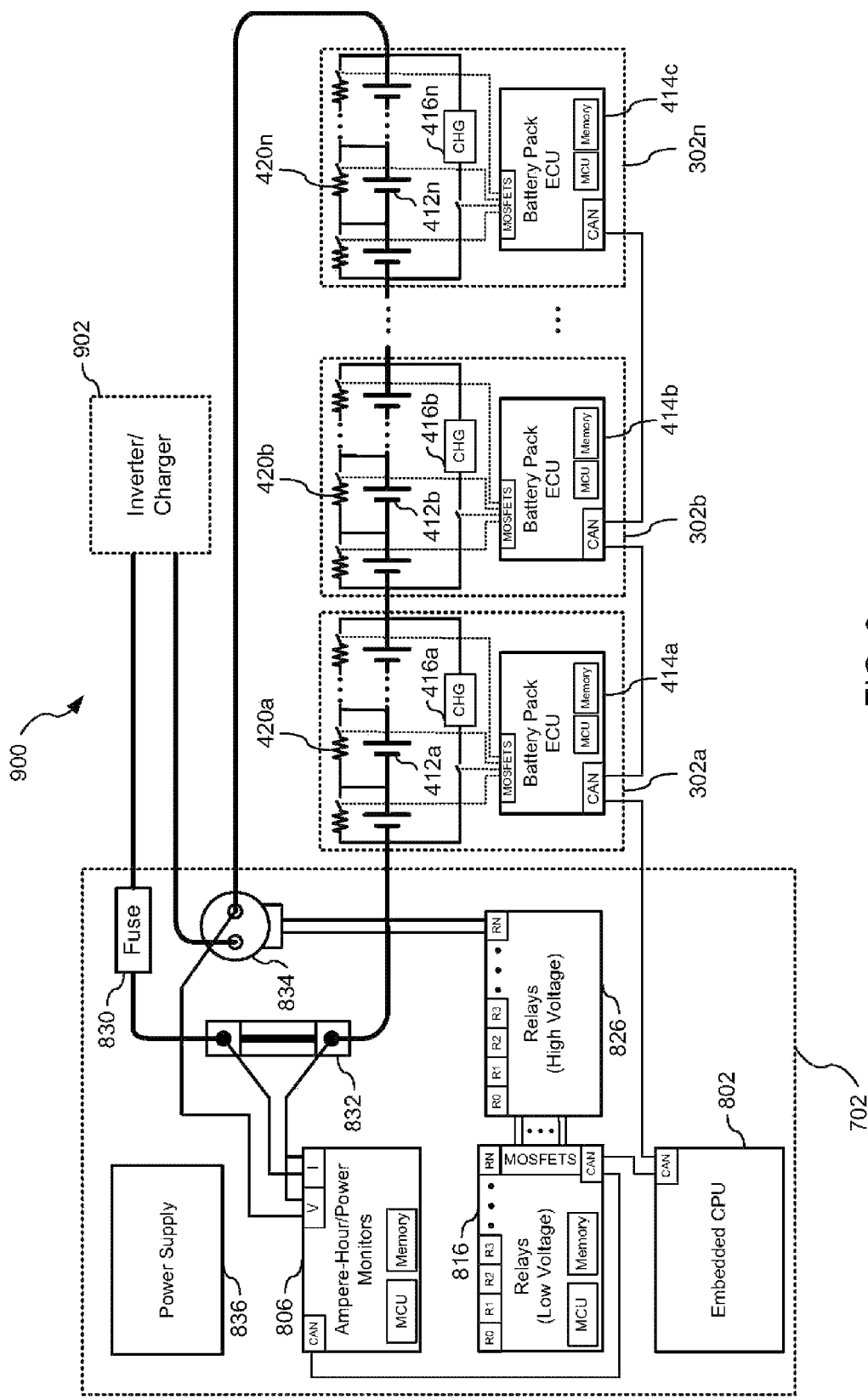

FIG. 9 is a diagram that illustrates an electrical energy storage unit according to an embodiment of the invention.

FIG. 10A is a diagram that illustrates an electrical energy storage unit according to an embodiment of the invention.

Figure 10B:
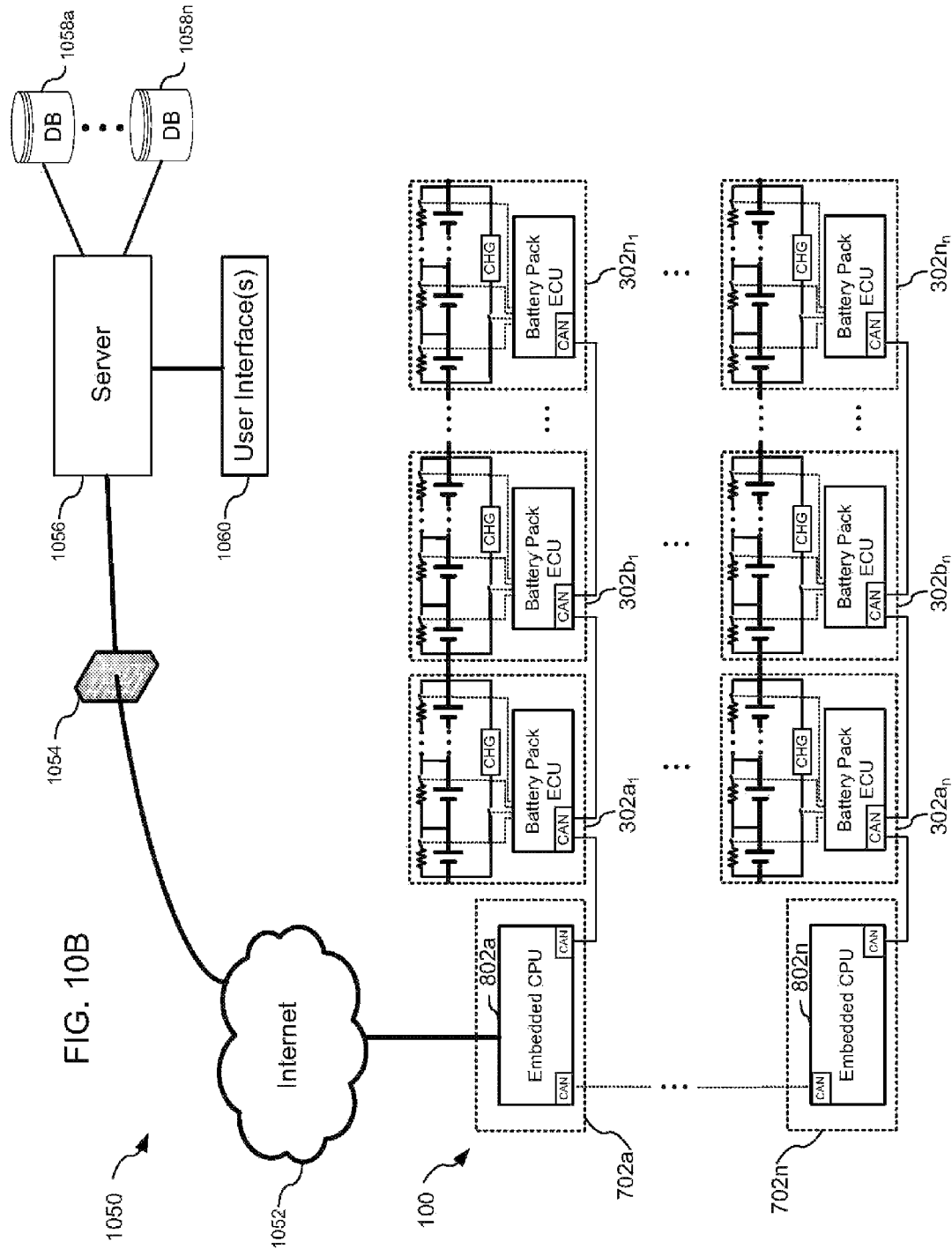

FIG. 10B is a diagram that illustrates an electrical energy storage system according to an embodiment of the invention.

Figure 10C:
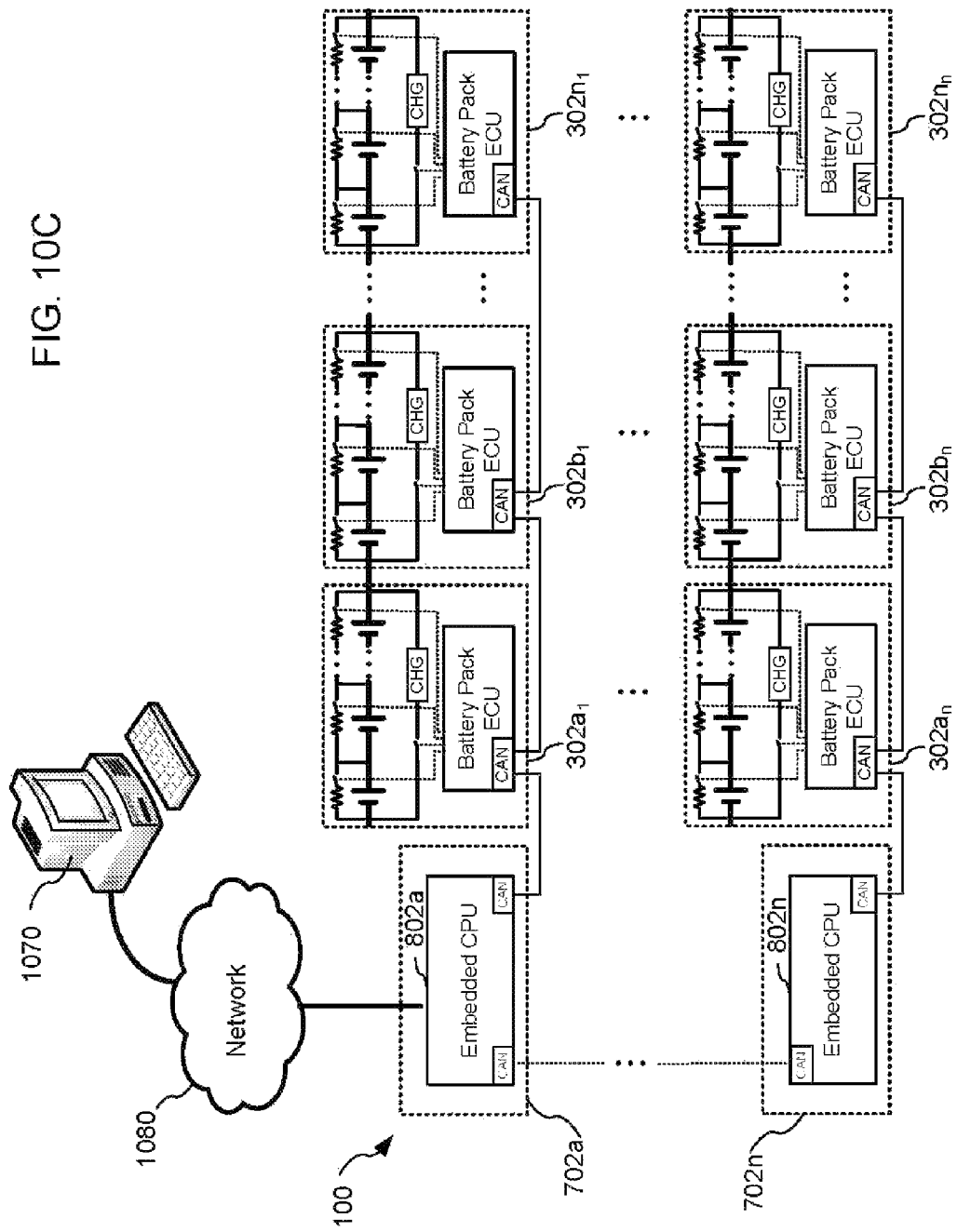

FIG. 10C is a diagram that illustrates another electrical energy storage system according to an embodiment of the invention.

Figure 11:
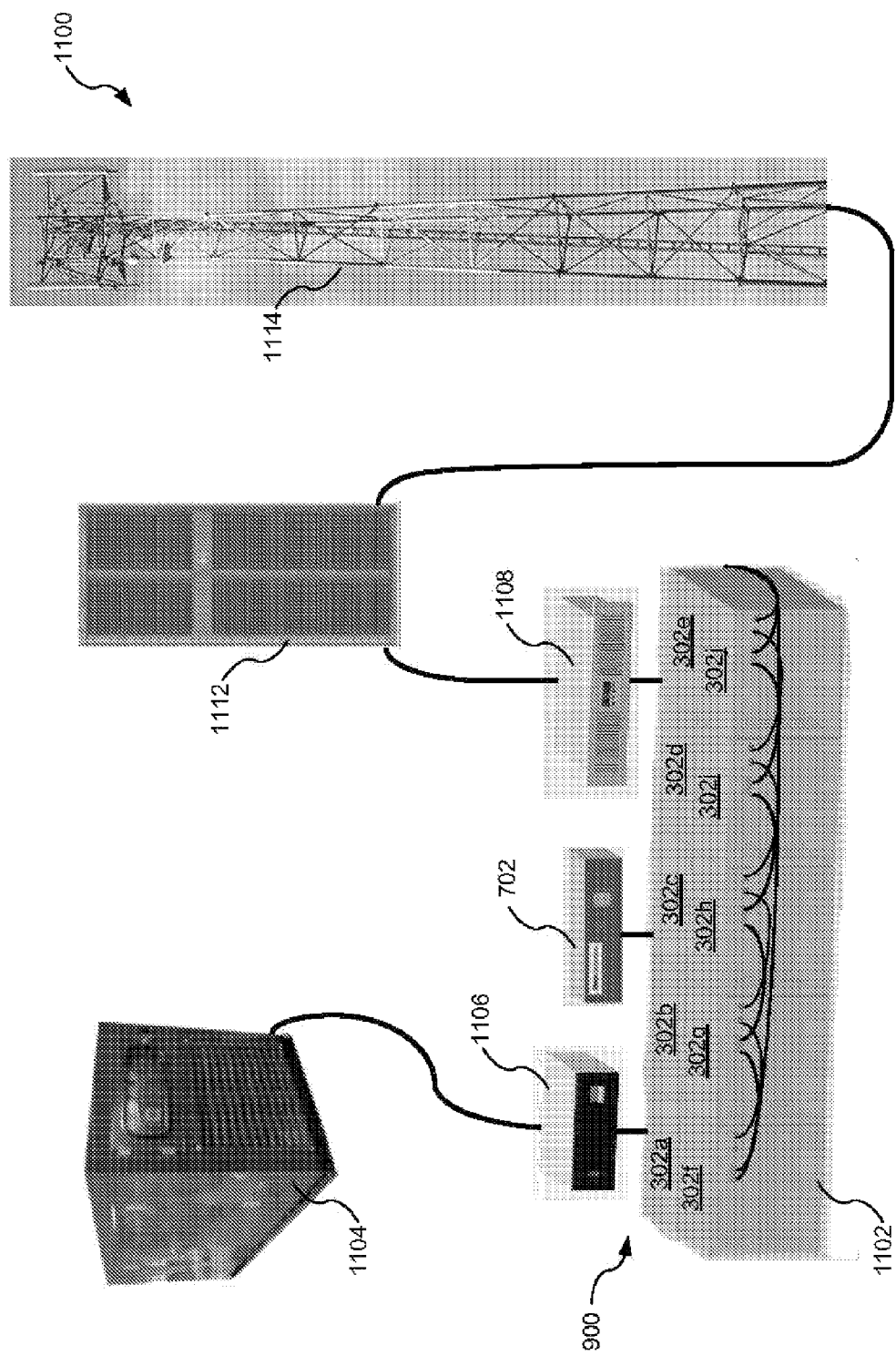

FIG. 11 is a diagram that illustrates an electrical energy storage system according to an embodiment of the invention.

Figure 12:
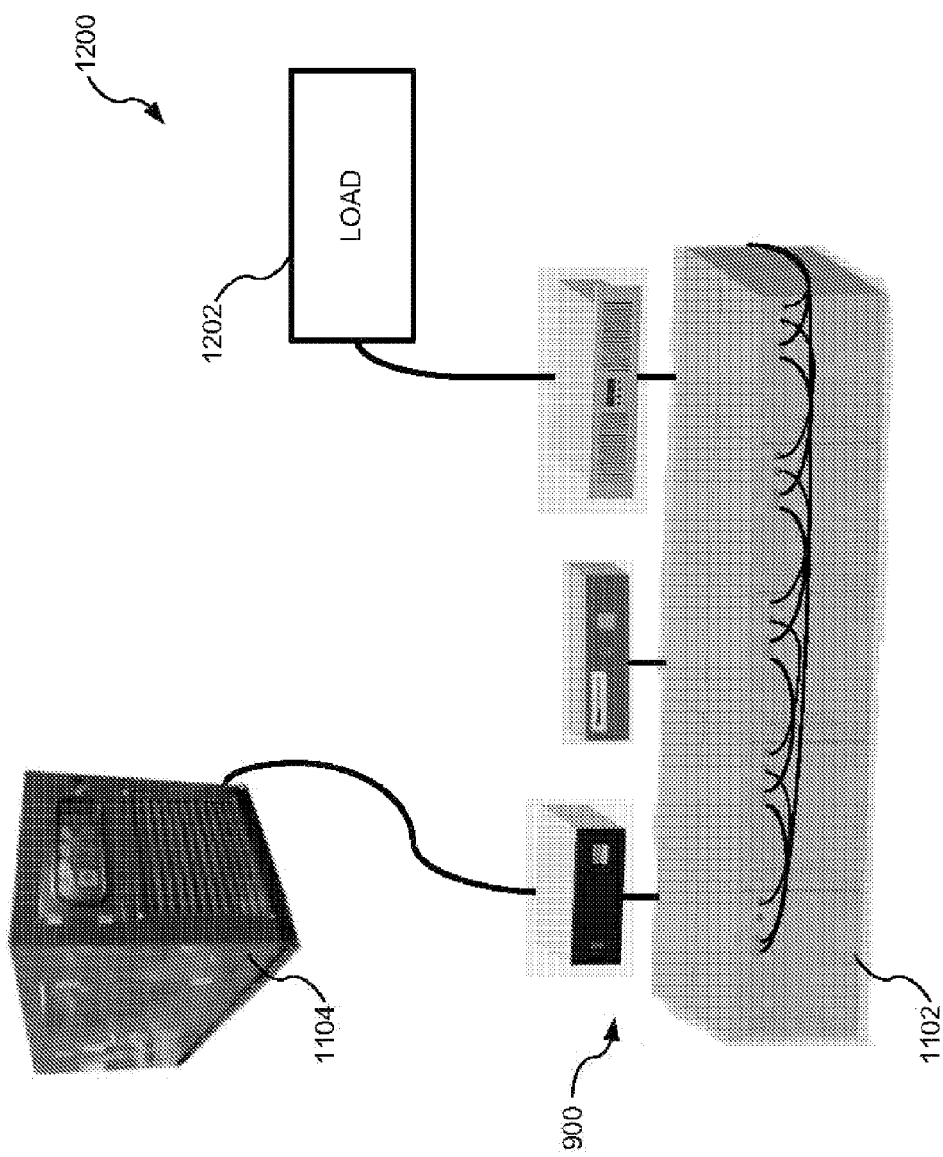

FIG. 12 is a diagram that illustrates an electrical energy storage system according to an embodiment of the invention.

Figure 13:
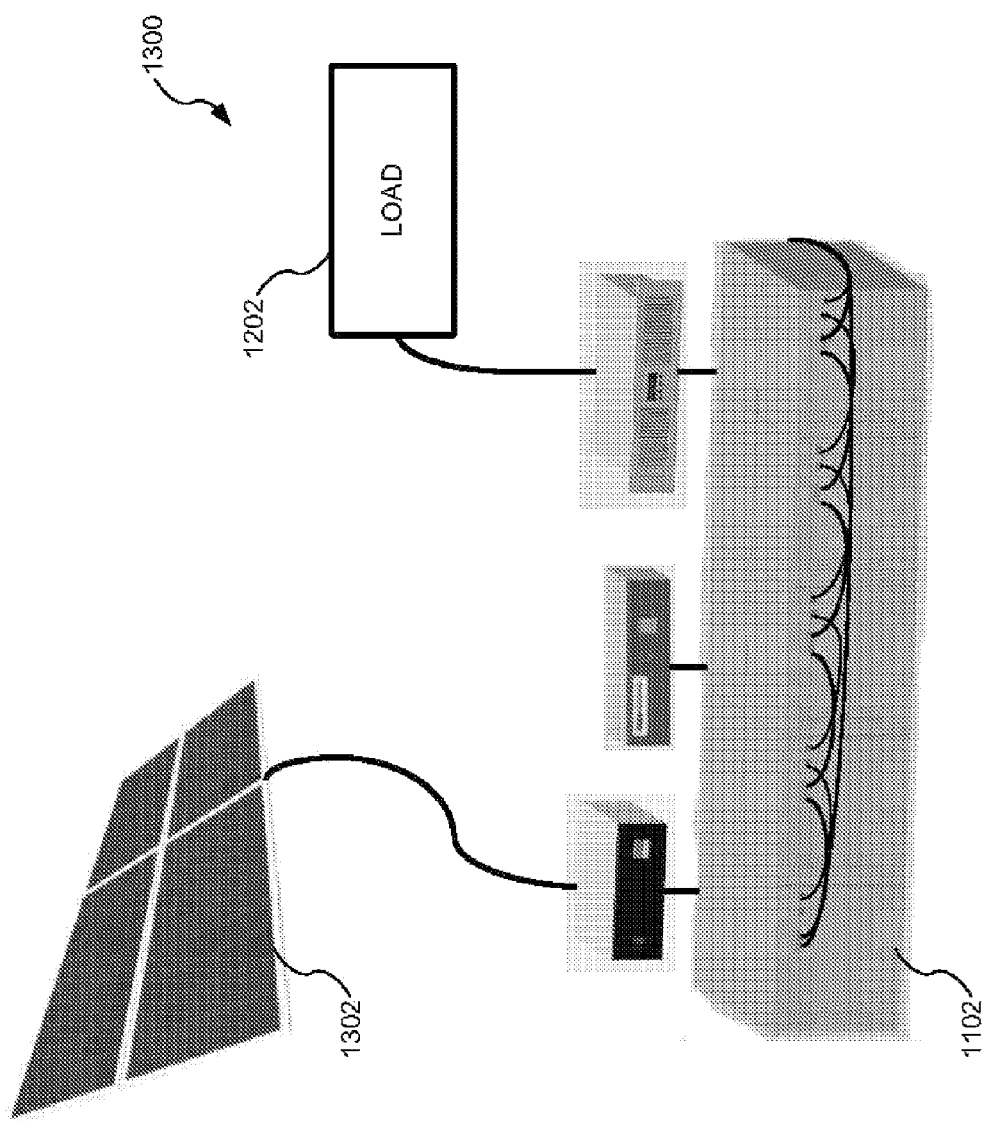

FIG. 13 is a diagram that illustrates an electrical energy storage system according to an embodiment of the invention.

Figure 14:
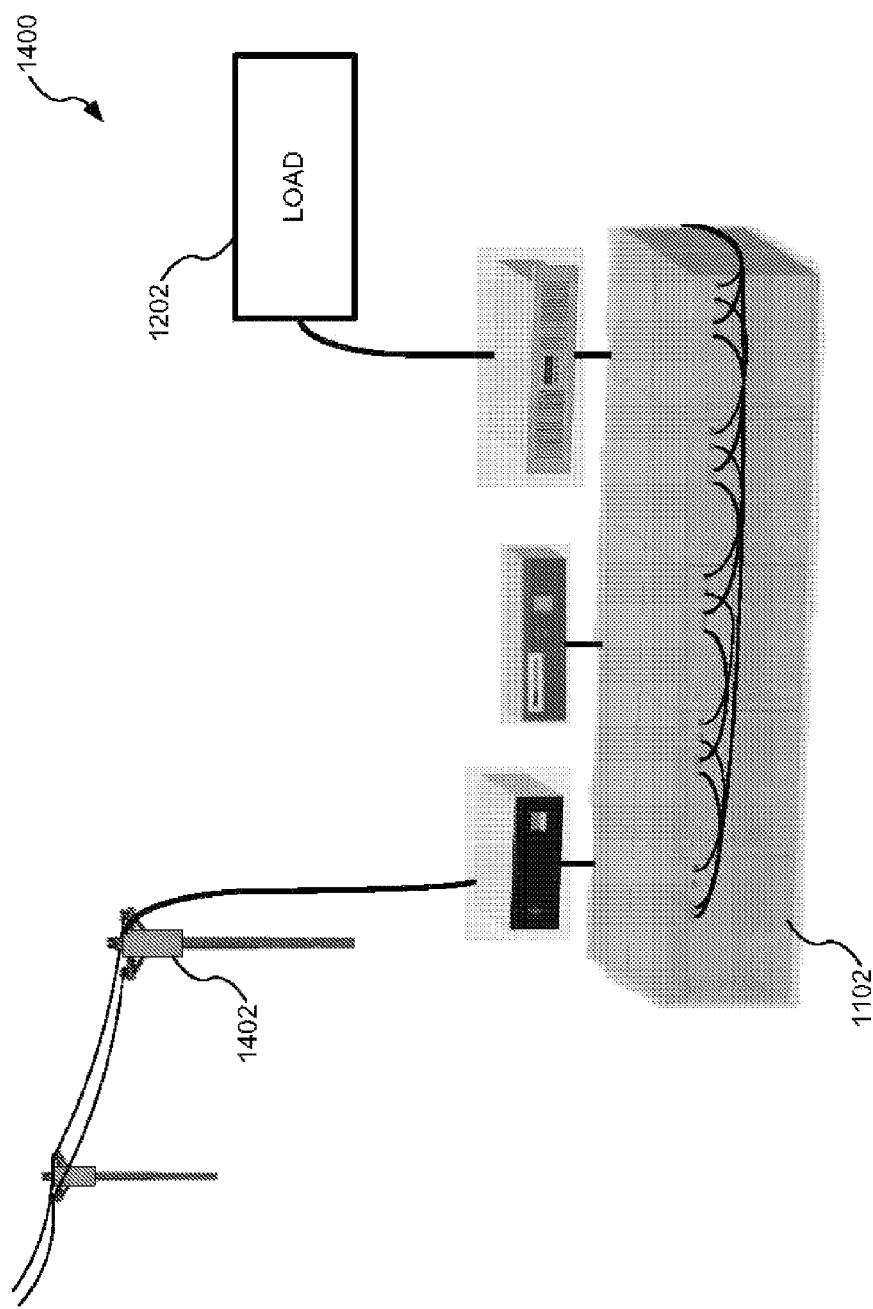

FIG. 14 is a diagram that illustrates an electrical energy storage system according to an embodiment of the invention.

Figure 15:
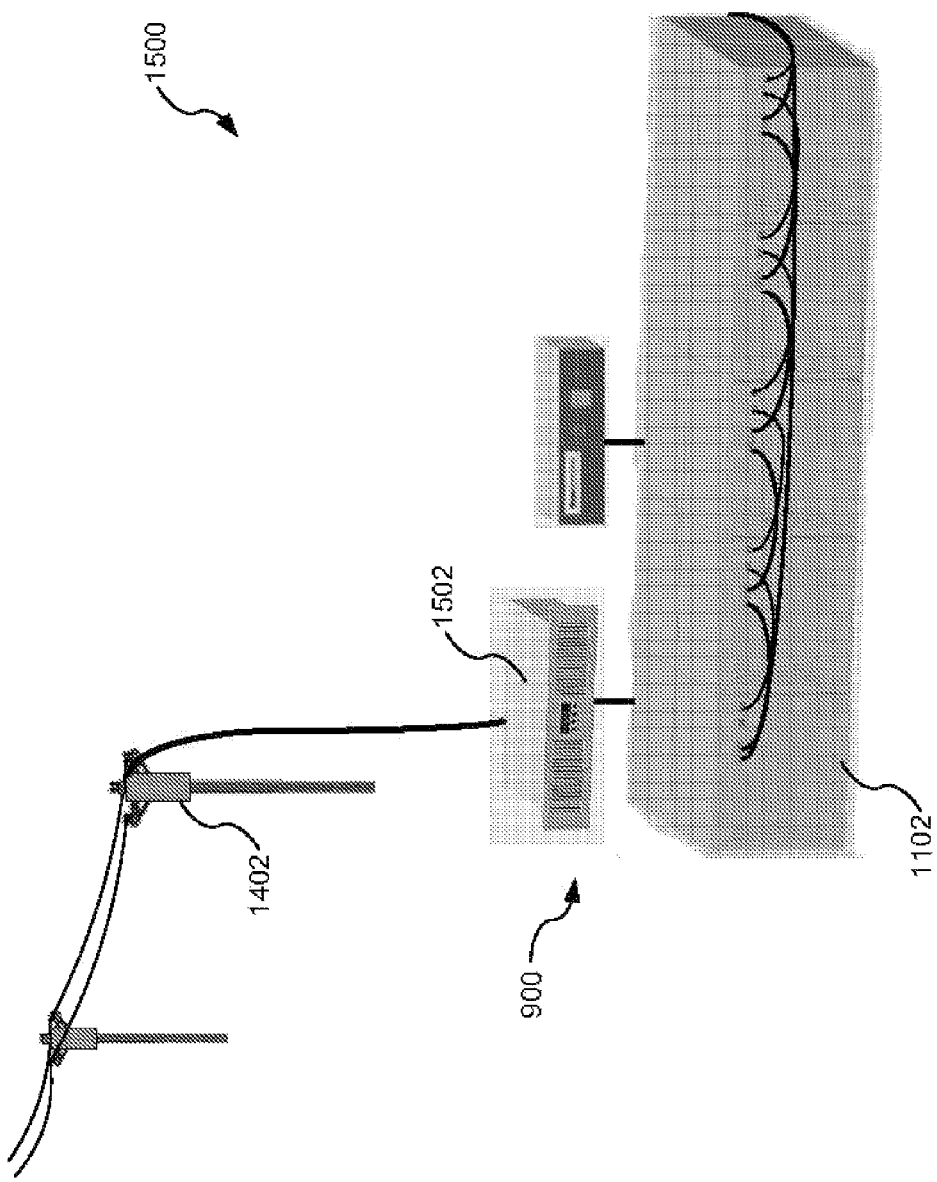

FIG. 15 is a diagram that illustrates an electrical energy storage system according to an embodiment of the invention.

Figure 16:
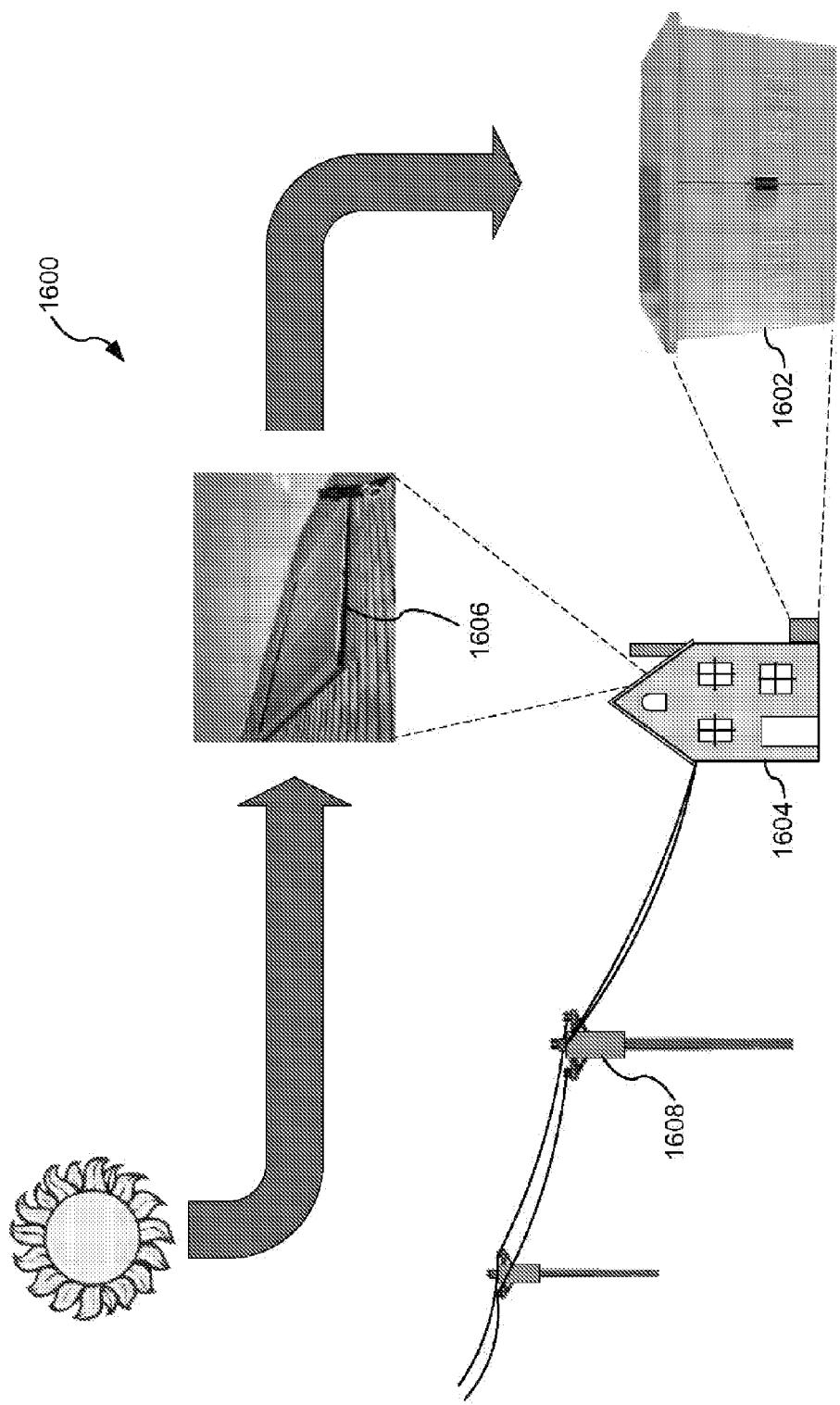

FIG. 16 is a diagram that illustrates an electrical energy storage system according to an embodiment of the invention.

Figure 17:
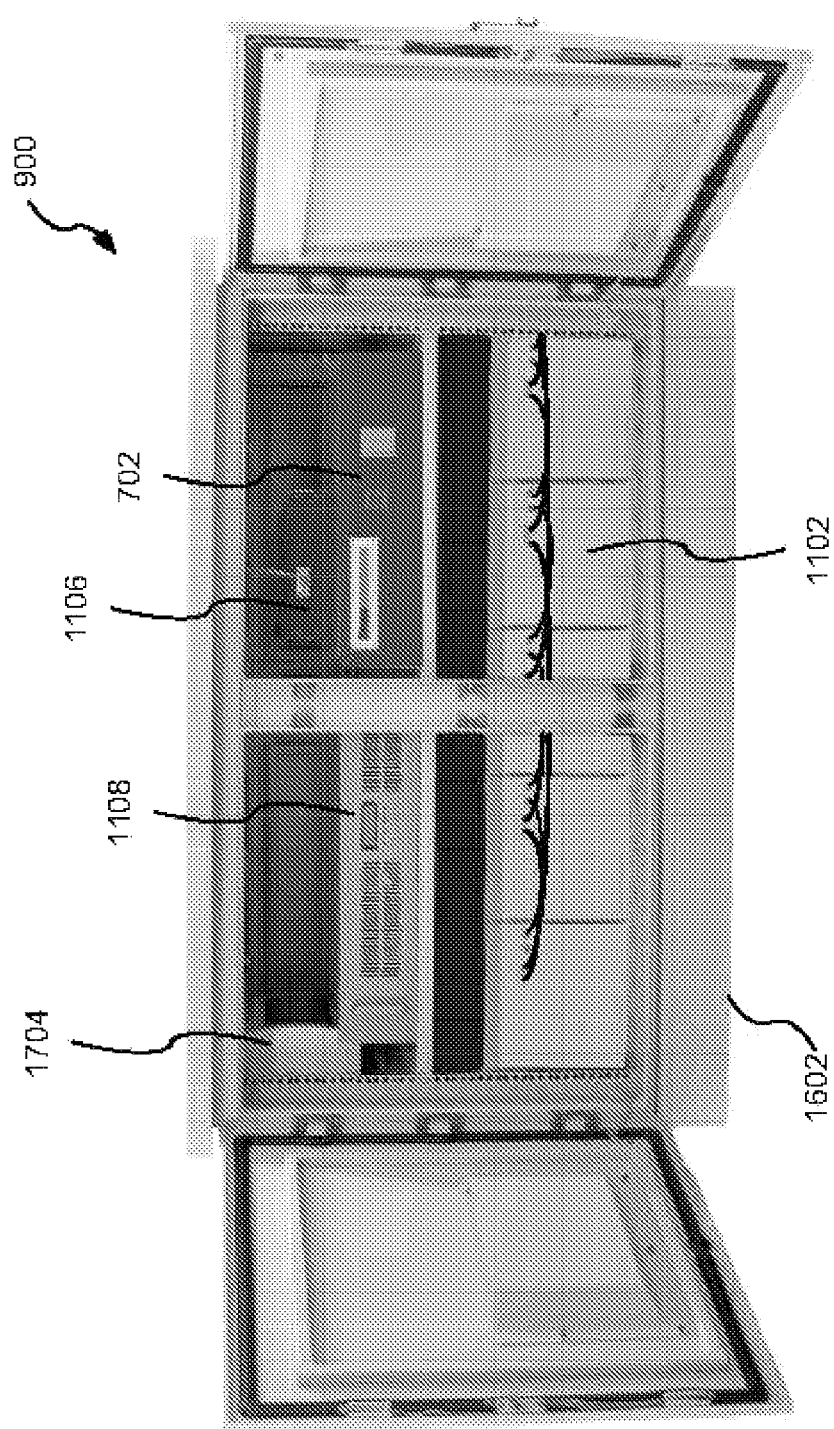

FIG. 17 is a diagram that illustrates an electrical energy storage unit according to an embodiment of the invention.

Figure 18:
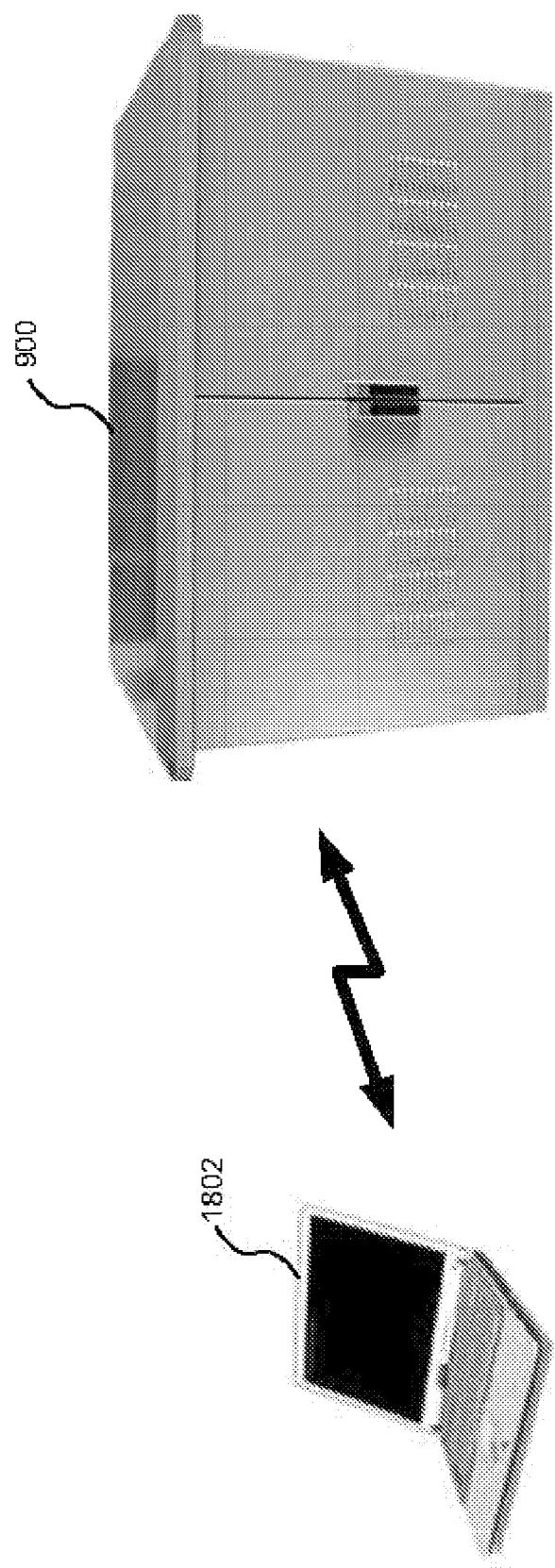

FIG. 18 is a diagram that illustrates an electrical energy storage unit according to an embodiment of the invention.

FIGS. 19A-E are diagrams that illustrate an exemplary user interface for an electrical energy storage unit according to an embodiment of the invention.

FIG. 20 is a diagram that illustrates an electrical energy storage unit according to an embodiment of the invention.

FIG. 21 is a diagram that illustrates exemplary battery pack data used in an embodiment of an electrical energy storage unit according to the invention.

FIGS. 22A-B are diagrams that illustrate exemplary battery data used in an embodiment of an electrical energy storage unit according to the invention.

Figures 23A, 23B:
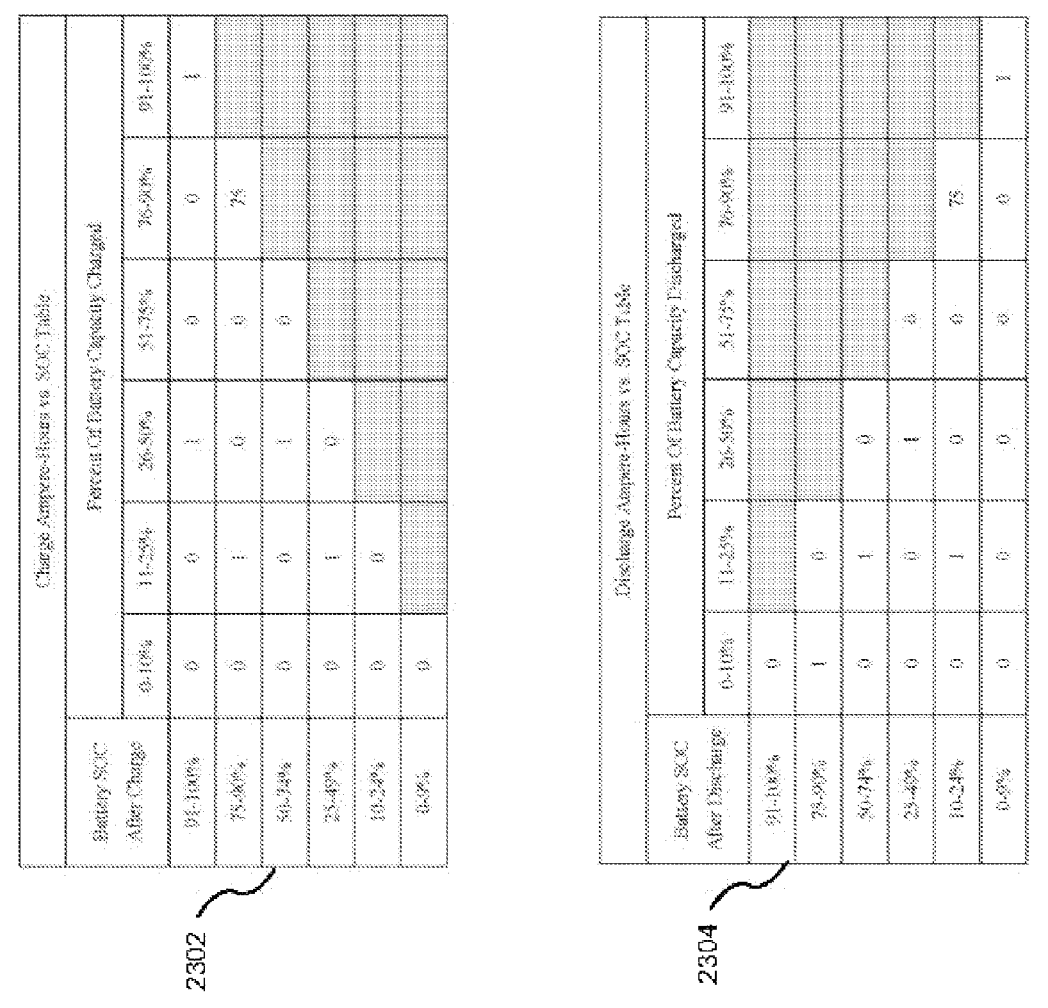

FIGS. 23A-B are diagrams that illustrates exemplary battery cycle data used in an embodiment of an electrical energy storage unit according to the invention.

Figure 24A:
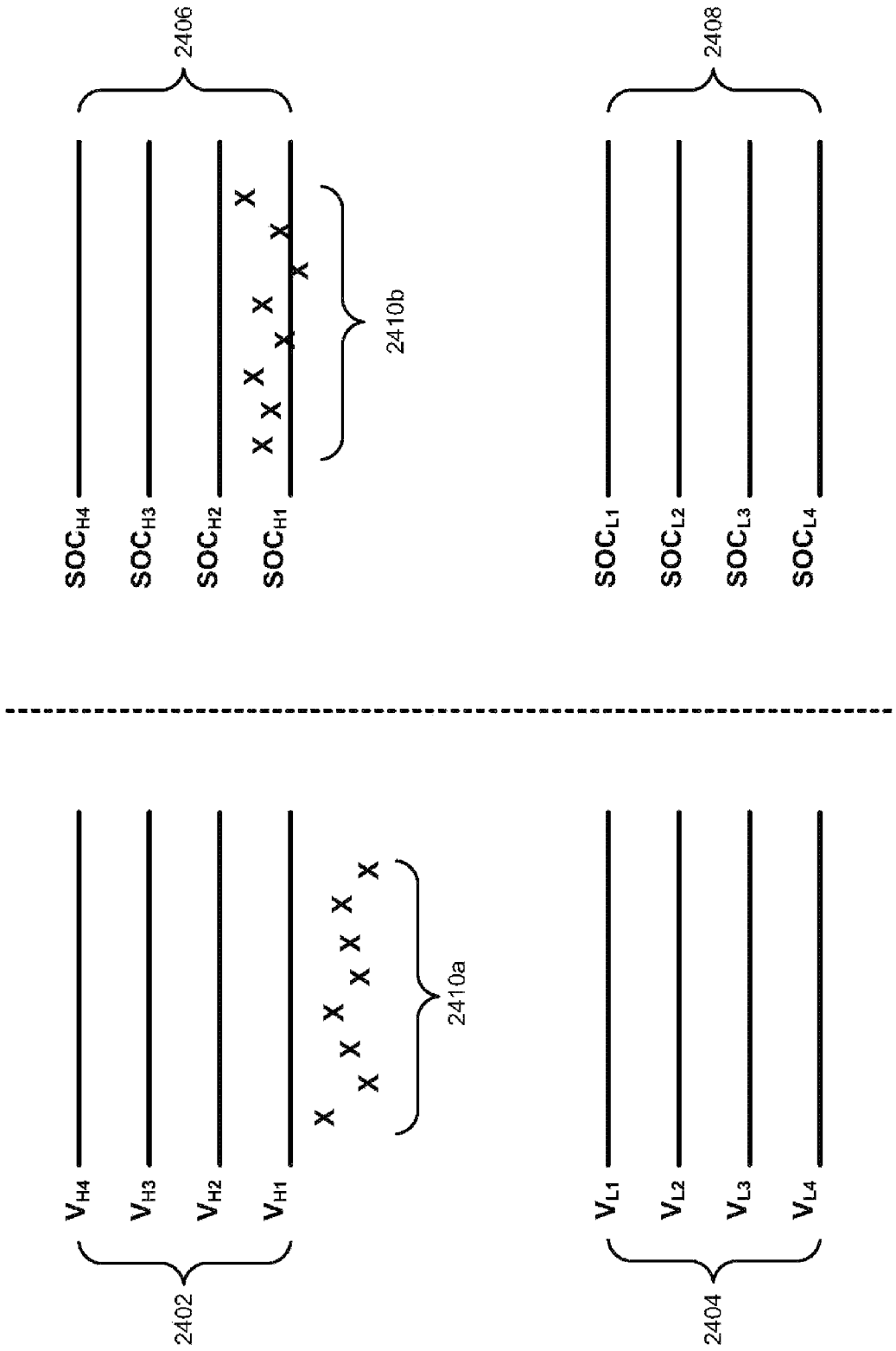
Figure 24B:
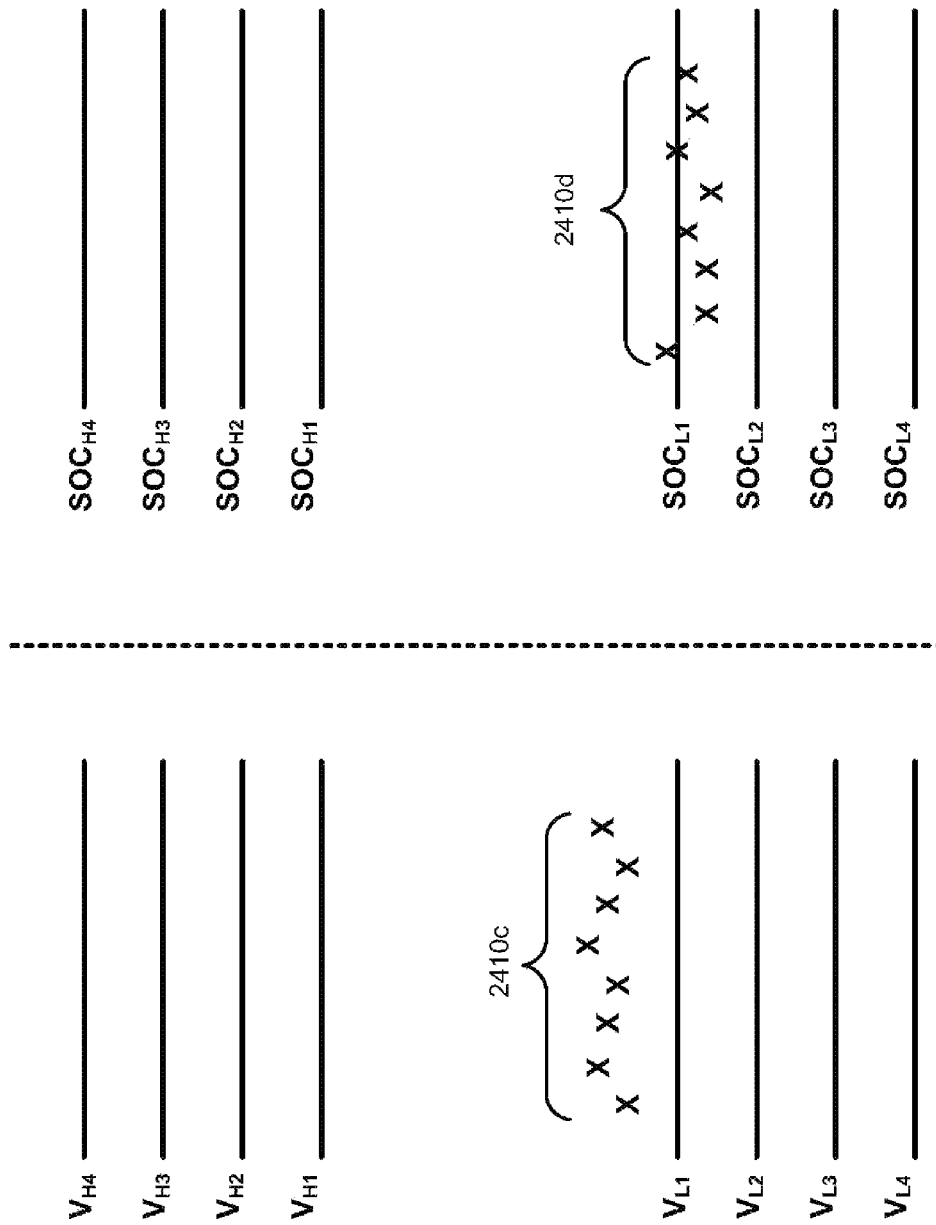

FIGS. 24A-B are diagrams that illustrates operation of an electrical energy storage unit according to an embodiment of the invention.

Figure 25:
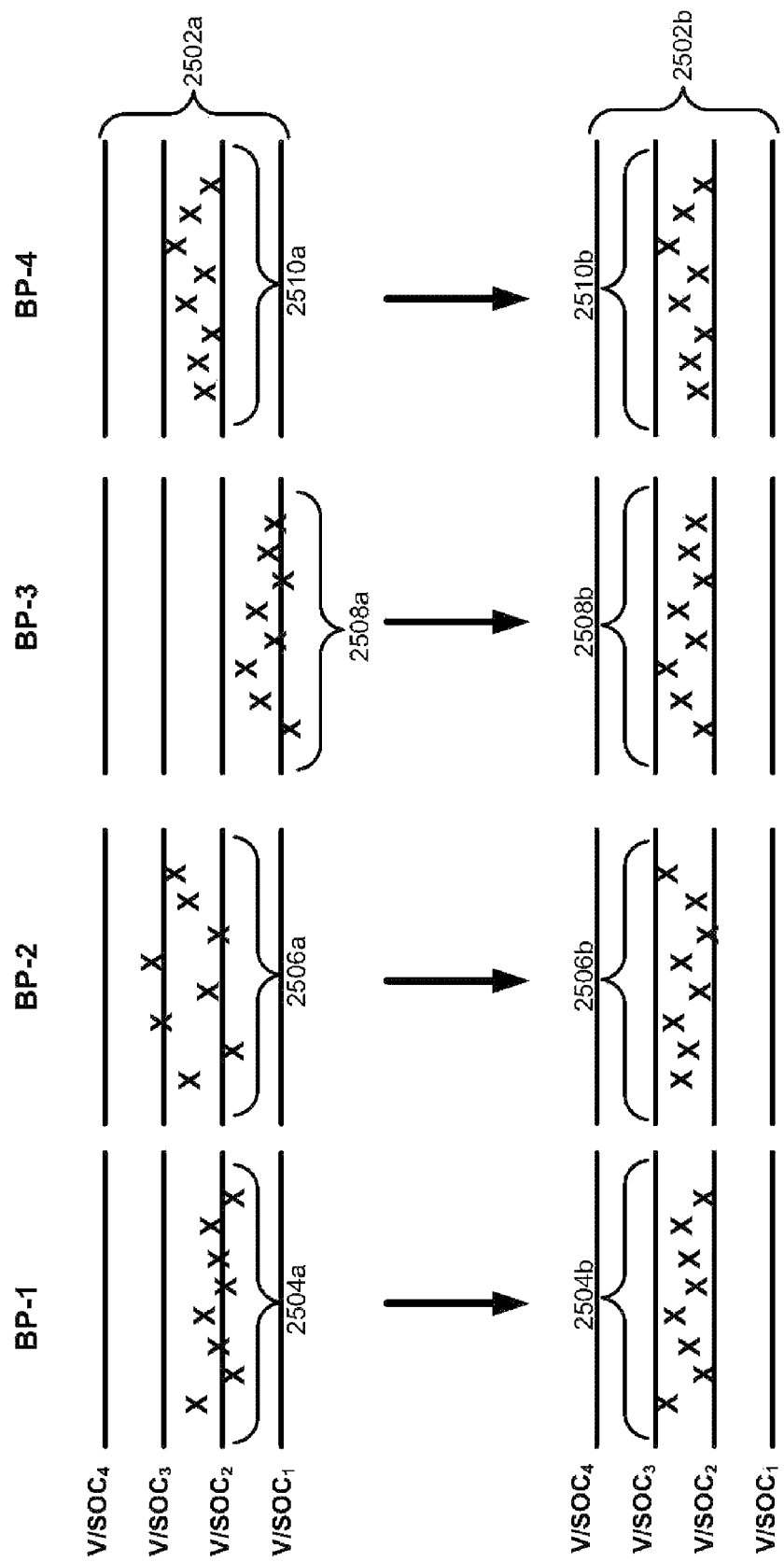

FIG. 25 is a diagram that illustrates operation of an electrical energy storage unit according to an embodiment of the invention.

The invention is described with reference to the accompanying drawings/figures. The drawing in which an element first appears is typically indicated by the leftmost digit or digits in the corresponding reference number.

DETAILED DESCRIPTION OF THE INVENTION

The present invention provides an electrical energy storage unit and control system, and applications thereof. In the detailed description of the invention herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In an embodiment of the invention, the electrical energy storage unit includes a battery system controller and battery packs. Each battery pack has battery cells, a battery pack controller that monitors the cells, a battery pack cell balancer that adjusts the amount of energy stored in the cells, and a battery pack charger. The battery pack controller operates the battery pack cell balancer and the battery pack charger to control the state-of-charge of the cells. In an embodiment, the cells are lithium ion battery cells.

As described herein, it is a feature of the invention that the energy storage unit and control system are highly scalable, ranging from small kilowatt-hour size electrical energy storage units to megawatt-hour size electrical energy storage units.

Figure 1:
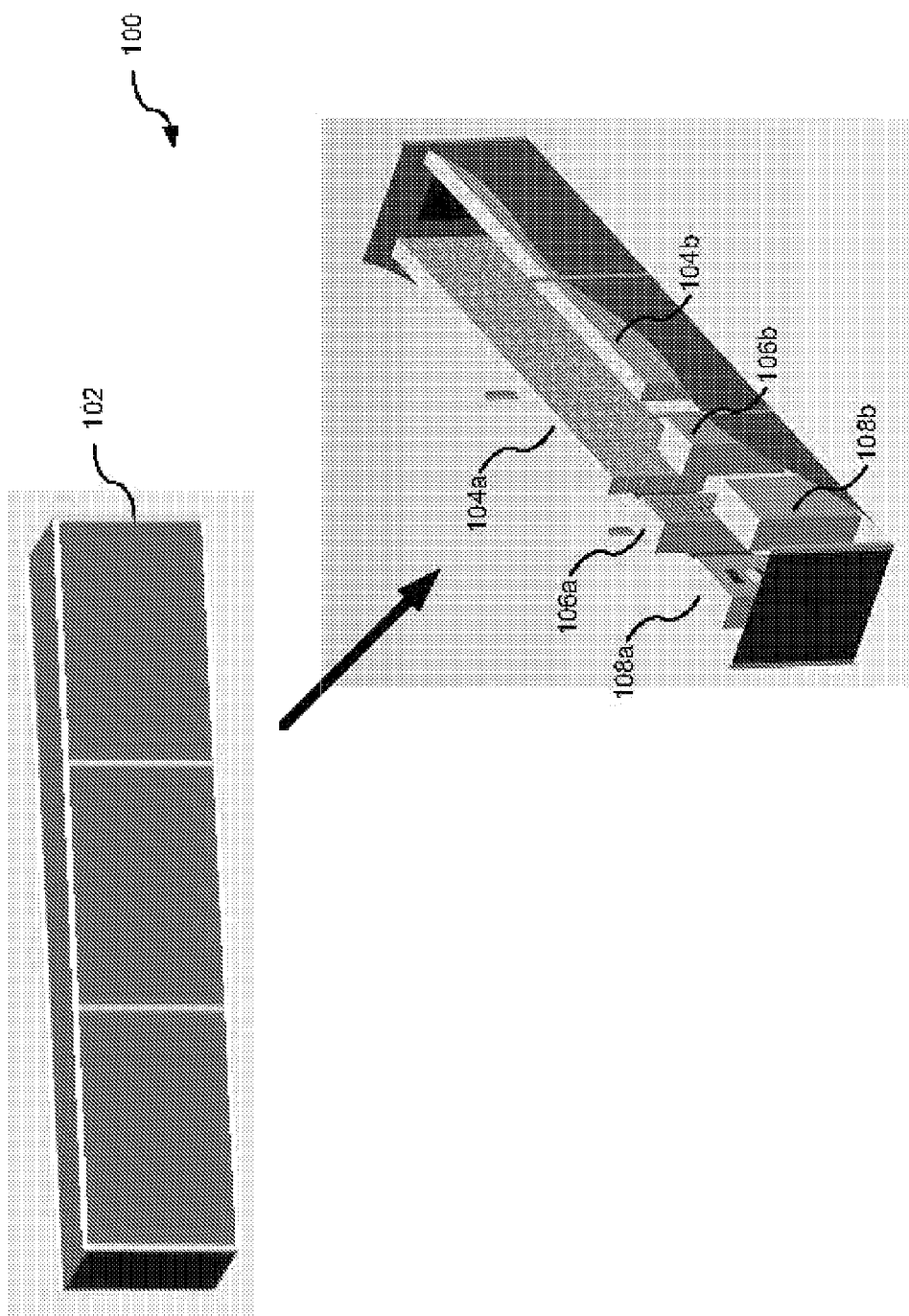
FIG. 1 is a diagram that illustrates an electrical energy storage unit according to an embodiment of the invention.

FIG. 1 is a diagram that illustrates an electrical energy storage unit 100 according to an embodiment of the invention. As shown in FIG. 1, electrical energy storage unit 100 includes battery units 104a and 104b, control units 106a and 106b, and inverters 108a and 108b. In an embodiment, electrical energy storage unit 100 is housed in a container 102, which is similar to a shipping container. In such embodiments, electrical energy storage unit 100 is movable and can be transported by truck.

Figure 2A:
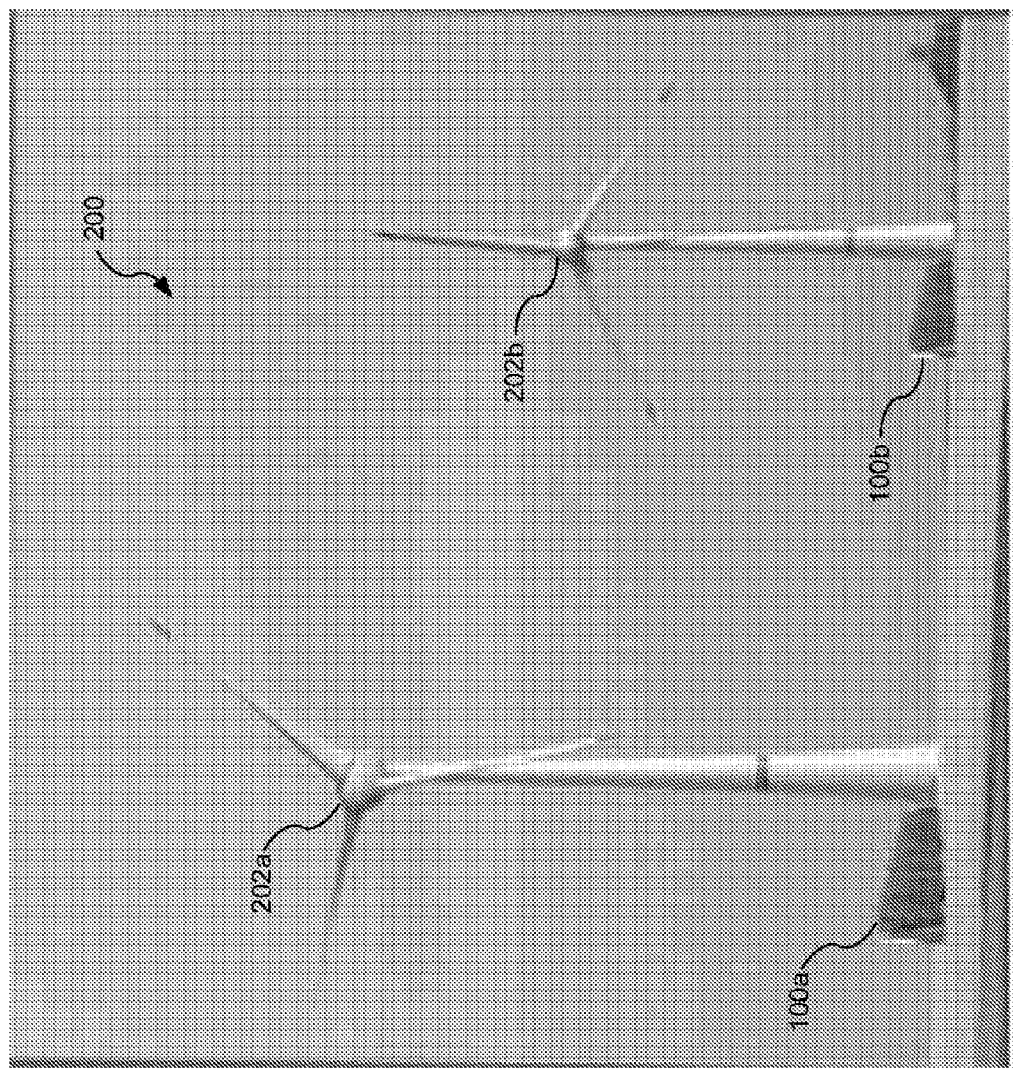
FIG. 2A is a diagram that illustrates the electrical energy storage unit of FIG. 1 being used in conjunction with wind mills.
Figure 2B:
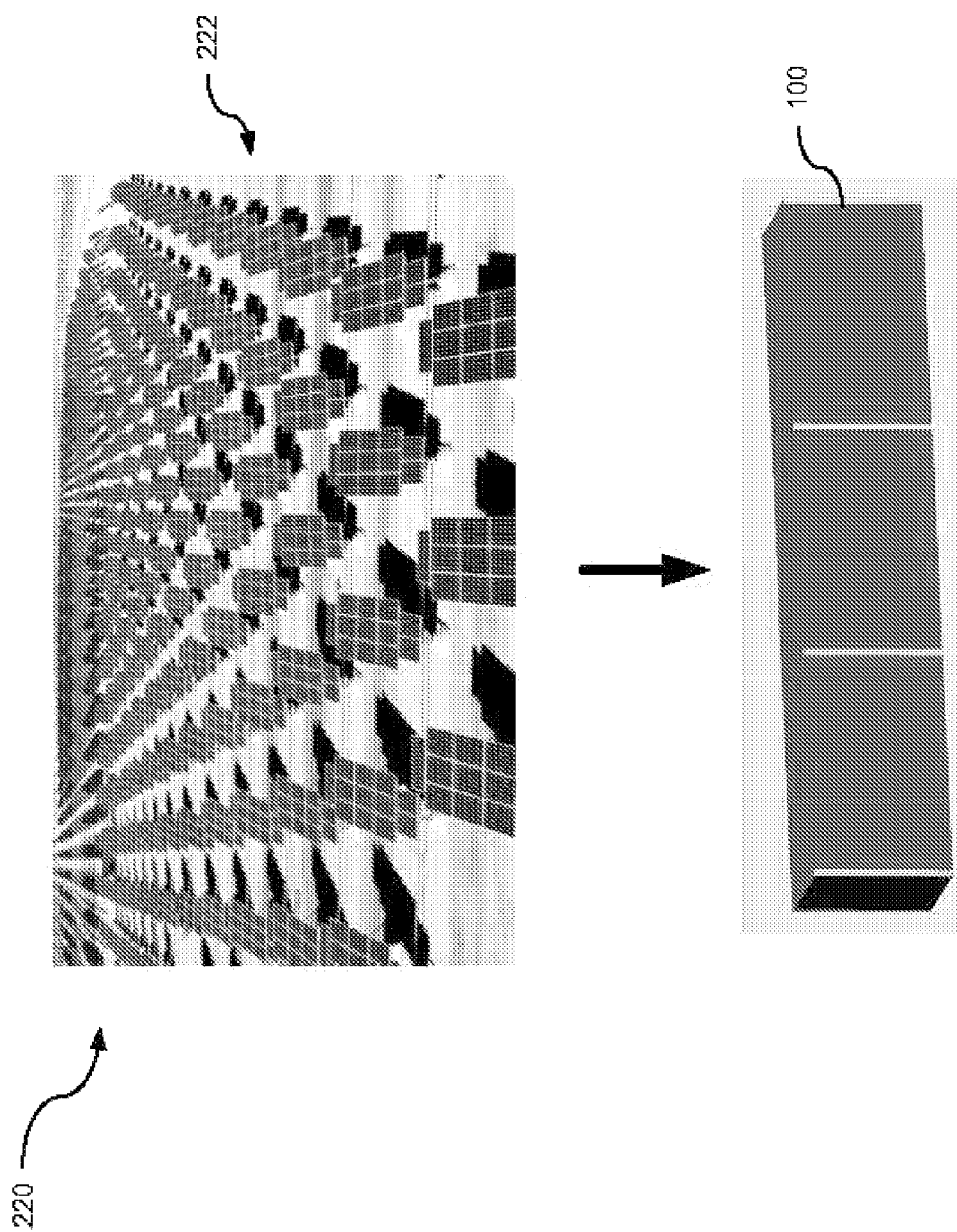
FIG. 2B is a diagram that illustrates the electrical energy storage unit of FIG. 1 being used in conjunction with solar panels.

As shown in FIGS. 2A-2C, electrical energy storage unit 100 is suitable for storing large amounts of electrical energy.

FIG. 2A is a diagram that illustrates the electrical energy storage unit 100 of FIG. 1 being used as a part of a renewable wind energy system 200. Wind energy system 200 includes wind turbines 202a and 202b. Energy from wind turbine 202a is stored in an electrical energy storage unit 100a. Energy from wind turbine 202b is stored in an electrical energy storage unit 100b. As will be understood by persons skilled in the relevant art, electrical energy storage units 100a and 100b enable stored electrical energy generated by wind turbines 202a and 202b to be dispatched.

FIG. 2B is a diagram that illustrates the electrical energy storage unit 100 of FIG. 1 being used as a part of a renewable solar energy system 220. Solar energy system 220 includes a solar array 222 and an electrical energy storage unit 100. Energy from solar array 222 is stored in the electrical energy storage unit 100. Electrical energy storage unit 100 enables stored electrical energy generated by solar array 222 to be dispatched.

FIG. 2C is a diagram that illustrates the electrical energy storage unit 100 of FIG. 1 being used as a part of a grid energy system 230. Grid energy system 230 includes electrical equipment 232 and an electrical energy storage unit 100. Energy from grid energy system 230 is stored in the electrical energy storage unit 100. Electrical energy stored by electrical energy storage unit 100 can be dispatched.

Figure 3:
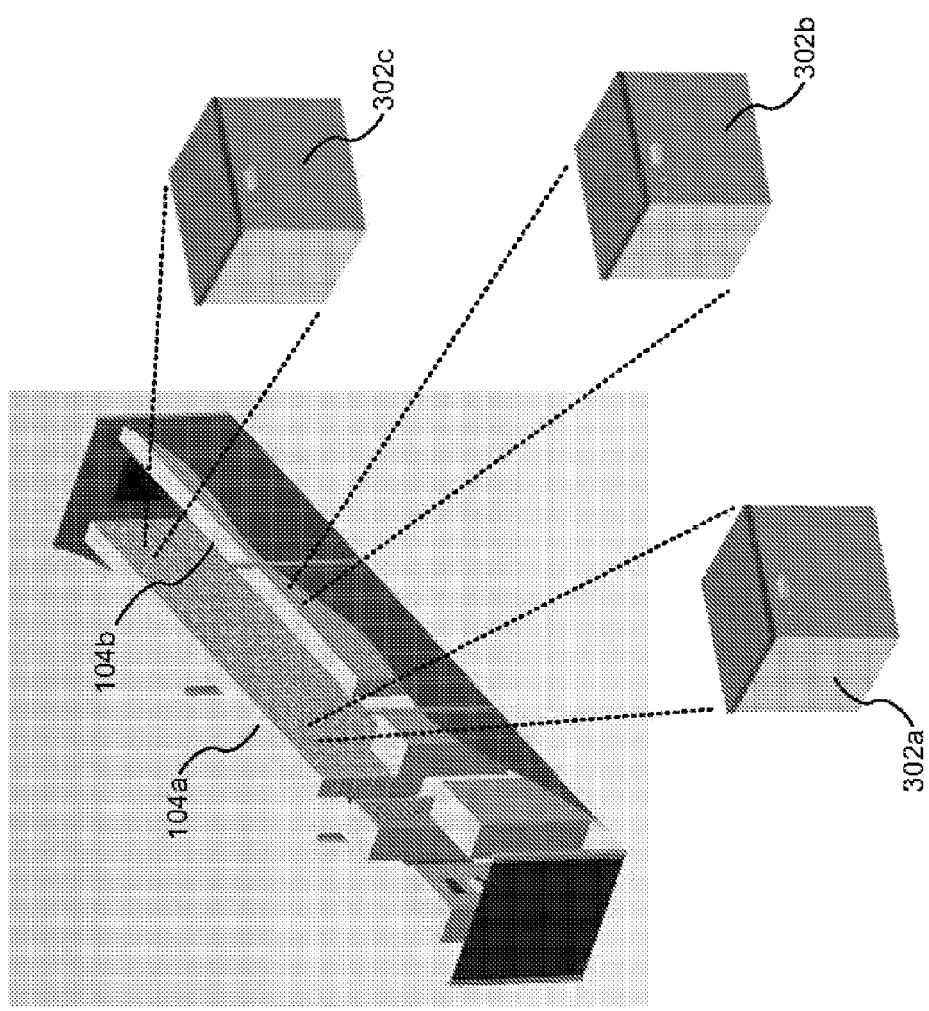
FIG. 3 is a diagram that illustrates battery packs according to an embodiment of the invention.

FIG. 3 is a diagram that further illustrates battery units 104a and 104b of electrical energy storage unit 100. As shown in FIG. 3, battery units 104a and 104b are formed using multiple battery packs 302 according to an embodiment of the invention. In FIG. 3, three battery packs 302a-c are shown. Battery packs 302a and 302c form a part of battery unit 104a. Battery pack 302b forms a part of battery unit 104b.

Figure 4:
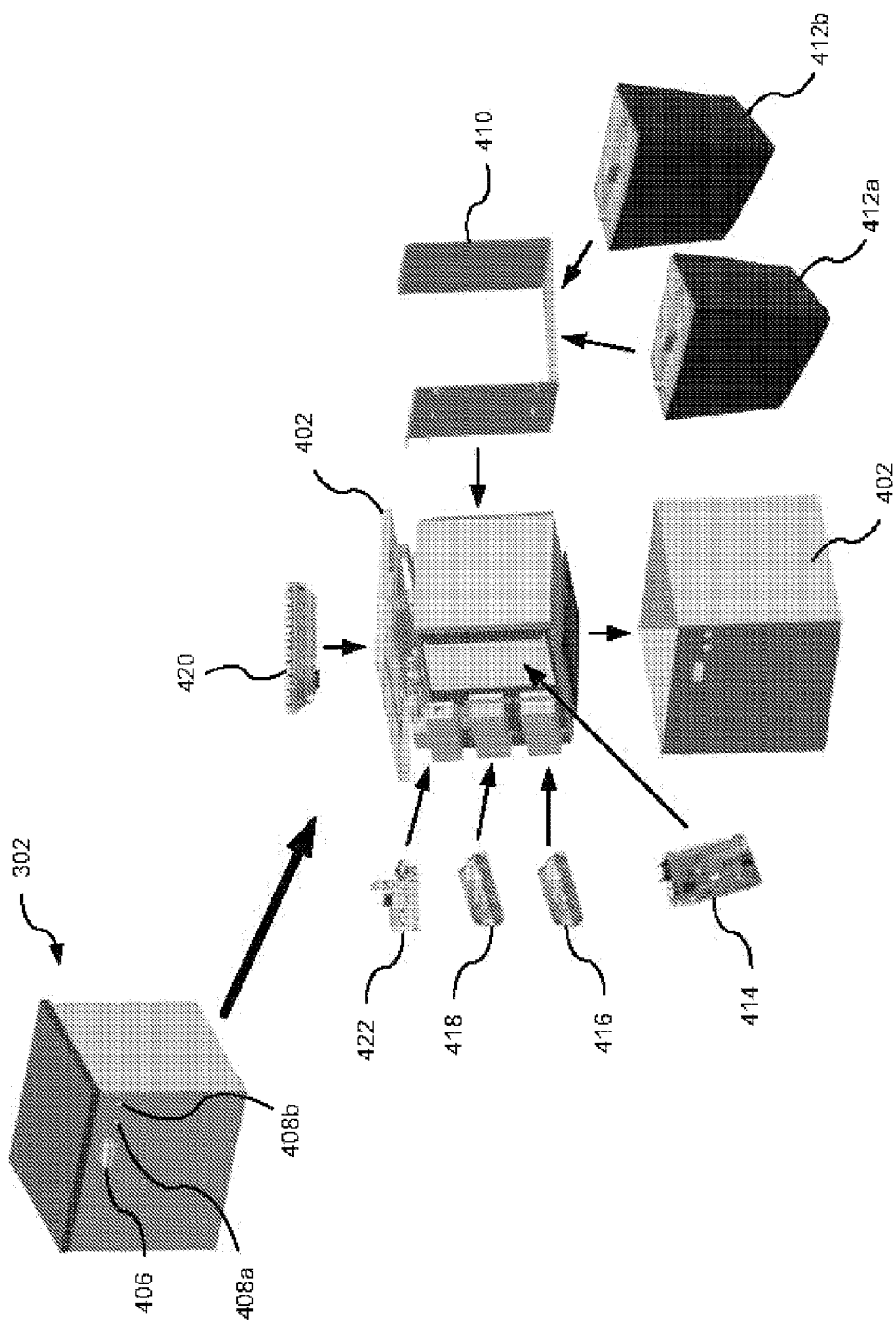
FIG. 4 is a diagram that further illustrates a battery pack according to an embodiment of the invention.

FIG. 4 is a diagram that further illustrates a battery pack 302 according to an embodiment of the invention. Battery pack 302 includes an enclosure 402, a lid 404, a power connector 406, and two signal connectors 408a and 408b. Enclosure 402 and lid 404 are preferably made from a strong plastic or metal. The power connector 406 includes connections for the positive and negative terminals of the battery pack, connections for the DC supply power, and connections for AC supply power. In embodiments of the invention, only DC supply power or AC supply power can be used. The signal connectors 408a and 408b are RJ-45 connectors, but other types of connectors can be used too. The signal connectors are used, for example, for CAN (CANBus) communications between battery pack 302 and other components of electrical energy storage unit 100.

As shown in FIG. 4, in an embodiment enclosure 402 houses a battery lift plate 410 that supports two battery modules 412a and 412b. Battery modules 412a and 412b each include multiple pouch-type batteries connected together in a series/parallel configuration. In embodiments, battery modules 412a and 412b can comprise, but are not limited to, for example, 10 to 50 AH cells arranged in a 1P16S configuration, a 2P16S configuration, a 3P16S configuration, or a 4P16S configuration. Other configurations are also possible and form a part of the scope of the invention. In an embodiment, the battery cells are connected using a printed circuit board that includes the wiring and connections for voltage and temperature monitoring of the battery cells as well as for balancing the battery cells.

Other items housed in enclosure 402 include a battery pack controller 414, an AC power supply 416, a DC power supply 418, a battery pack cell balancer 420, and a fuse and fuse holder 422. In embodiments of the invention, only AC power supply 416 or DC power supply 418 can be used.

Figure 5:
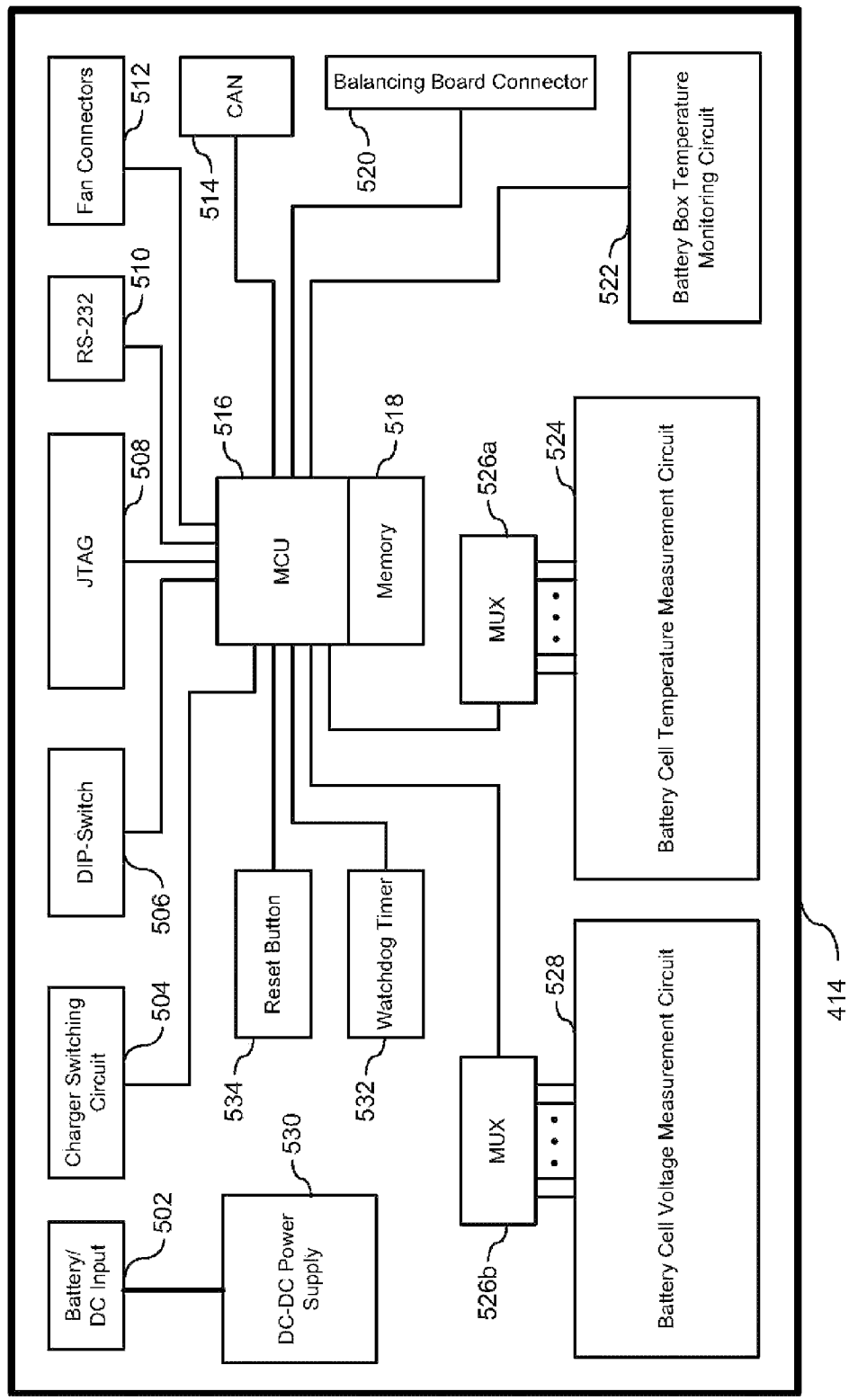
FIG. 5 is a diagram that illustrates a battery pack controller according to an embodiment of the invention.

FIG. 5 is a diagram that further illustrates battery pack controller 414 according to an embodiment of the invention. In an embodiment, battery pack controller 414 includes a battery/DC input 502, a charger switching circuit 504, a DIP-switch 506, a JTAG connection 508, and RS-232 connection 510, fan connectors 512, a CAN (CANBus) connection 514, a microprocessor unit (MCU) 516, memory 518, a balancing board connector 520, a battery box (enclosure) temperature monitoring circuit 522, a battery cell temperature measurement circuit 524, a battery cell voltage measurement circuit 528, a DC-DC power supply 530, a watchdog timer 532, and a reset button 534. The battery cell temperature measurement circuit 524 and the battery cell voltage measurement circuit 528 are coupled to MCU 516 using multiplexers (MUX) 526a and 526b, respectively.

In an embodiment, battery pack controller 414 is powered from energy stored in the battery cells. Battery pack controller 414 is connected to the battery cells by battery/DC input 502. In other embodiments, battery pack controller 414 is powered from a DC power supply connected to battery/DC input 502. DC-DC power supply 530 then converts the input DC power to one or more power levels appropriate for operating the various electrical components of battery pack controller 414.

Charger switching circuit 504 is coupled to MCU 516. Charger switching circuit 504 and MCU 516 are used to control operation of AC power supply 416 and/or DC power supply 418. As described herein, AC power supply 416 and/or DC power supply 418 are used to add energy to the battery cells of battery pack 302.

Battery pack controller 414 includes several interfaces and connectors for communicating. These interfaces and connectors are coupled to MCU 516 as shown in FIG. 5. In an embodiment, these interfaces and connectors include: DIP-switch 506, which is used to set a portion of software bits used to identify battery pack controller 414; JTAG connection 508, which is used for testing and debugging battery pack controller 414; RS-232 connection 510, which is used to communicate with MCU 516; CAN (CANBus) connection 514, which is used to communicate with MCU 516; and balancing board connector 520, which is used to communicate signals between battery pack controller 414 and battery pack cell balancer 420.

Fan connectors 512 are coupled to MCU 516. Fan connectors 512 are used together with MCU 516 and battery box temperature monitoring circuit 522 to operate one or more optional fans that can aid in cooling battery pack 302. In an embodiment, battery box temperature monitoring circuit 522 includes multiple temperature sensors that can monitor the temperature of battery pack cell balancer 420 and/or other heat sources within battery pack 302 such as, for example, AC power supply 416 and/or DC power supply 418.

Microprocessor unit (MCU) 516 is coupled to memory 518. MCU 516 is used to execute an application program that manages battery pack 302. As described herein, in an embodiment the application program performs the following functions: monitors the voltage and temperature of the battery cells of battery pack 302, balances the battery cells of battery pack 302, monitor and controls (if needed) the temperature of battery pack 302, handles communications between battery pack 302 and other components of electrical energy storage system 100, and generates warnings and/or alarms, as well as taking other appropriate actions, to prevent over-charging or over-discharging the battery cells of battery pack 302.

Battery cell temperature measurement circuit 524 is used to monitor the cell temperatures of the battery cells of battery pack 302. In an embodiment, individual temperature monitoring channels are coupled to MCU 516 using a multiplexer (MUX) 526a. The temperature readings are used to ensure that the battery cells are operated within their specified temperature limits and to adjust temperature related values calculated and/or used by the application program executing on MCU 516, such as, for example, how much dischargeable energy is stored in the battery cells of battery pack 302.

Battery cell voltage measurement circuit 528 is used to monitor the cell voltages of the battery cells of battery pack 302. In an embodiment, individual voltage monitoring channels are coupled to MCU 516 using a multiplexer (MUX) 526b. The voltage readings are used, for example, to ensure that the battery cells are operated within their specified voltage limits and to calculate DC power levels.

Watchdog timer 532 is used to monitor and ensure the proper operation of battery pack controller 414. In the event that an unrecoverable error or unintended infinite software loop should occur during operation of battery pack controller 414, watchdog timer 532 can reset battery pack controller 414 so that is resumes operating normally.

Reset button 534 is used to manually reset operation of battery pack controller 414. As shown in FIG. 5, reset button 534 is coupled to MCU 516.

Figure 6A:
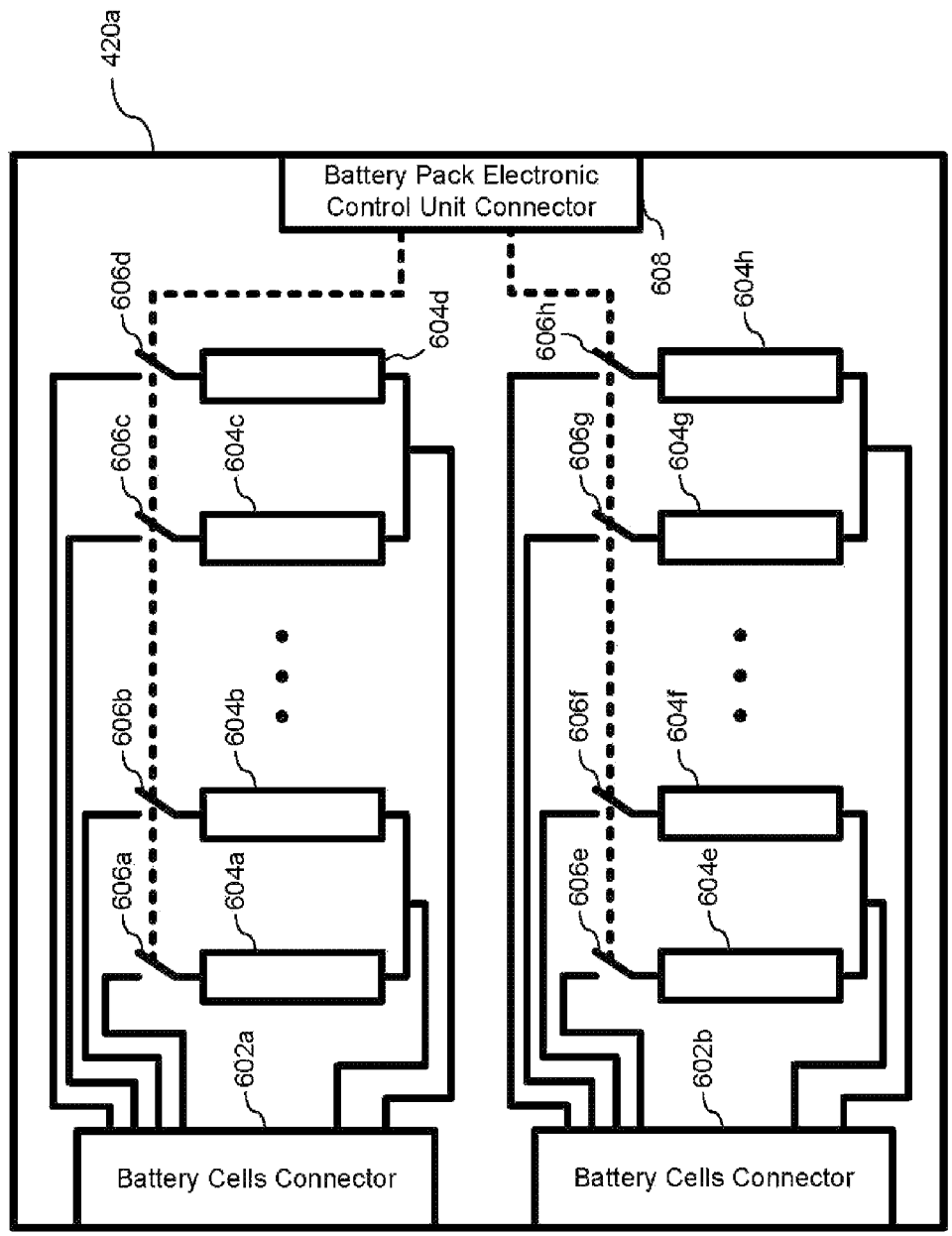
FIG. 6A is a diagram that illustrates a battery pack cell balancer according to an embodiment of the invention.

FIG. 6A is a diagram that illustrates a battery pack cell balancer 420a according to an embodiment of the invention. Battery pack cell balancer 420a includes a first set of resistors 604a-d coupled through switches 606a-d to a battery cells connector 602a and a second set of resistors 604e-h coupled through switches 606e-h to a battery cells connector 602b. Battery cells connectors 602a and 602b are used to connect battery pack cell balancer 420a to the battery cells of battery pack 302. A battery pack electronic control unit (ECU) connector 608 connects switches 604a-h to battery pack controller 414.

In operation, switches 606a-h of battery pack cell balancer 420a are selectively opened and closed to vary the amount of energy stored in the battery cells of battery pack 302. The selective opening and closing of switches 606a-h allows energy stored in particular battery cells of battery pack to be discharged through resistors 604a-h, or for energy to bypass selected battery cells during charging of the battery cells of battery pack 302. The resistors 604a-h are sized to permit a selected amount of energy to be discharged from the battery cells of battery pack 302 in a selected amount of time and to permit a selected amount of energy to bypass the battery cells of battery pack 302 during charging. In an embodiment, when the charging energy exceeds the selected bypass energy amount, the closing of switches 604a-h is prohibited by battery pack controller 414.

Figure 6B:
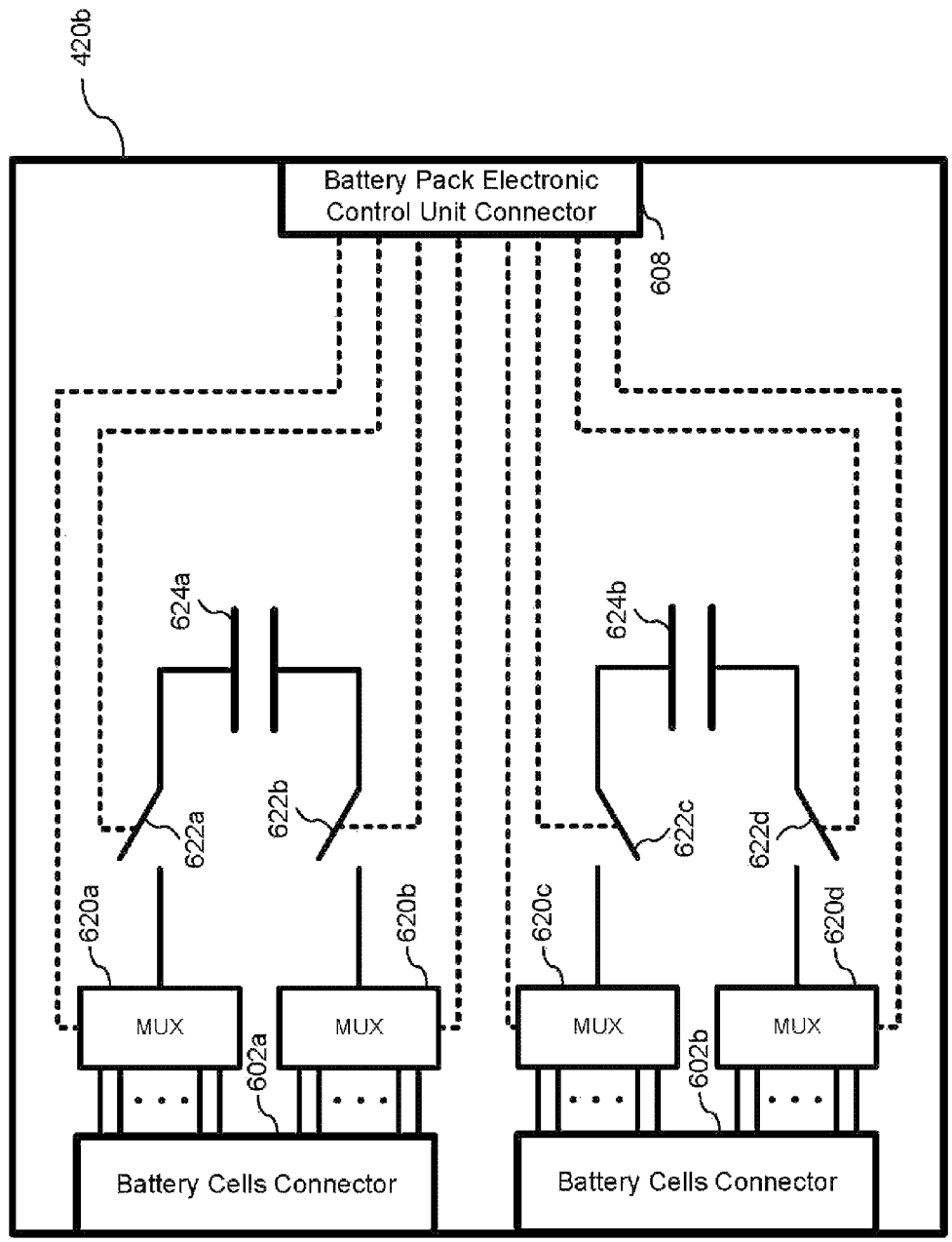
FIG. 6B is a diagram that illustrates a battery pack cell balancer according to an embodiment of the invention.

FIG. 6B is a diagram that illustrates a battery pack cell balancer 420b. Battery pack cell balancer 420b includes a first capacitor 624a coupled to two multiplexers (MUX) 620a and 620b through switches 622a and 622b, and a second capacitor 624b coupled to two multiplexers (MUX) 620c and 620d through switches 622c and 622d. Multiplexers 620a and 620b are connected to battery cells connector 602a. Multiplexers 620c and 620d are connected to battery cells connector 602b. Battery pack electronic control unit (ECU) connector 608 connects switches 622a-d to battery pack controller 414.

In operation, multiplexers 620a-b and switches 622a-b are first configured to connect capacitor 624a to a first battery cell of battery pack 302. Once connected, capacitor 624a is charged by the first battery cell, and this charging of capacitor 624a reduces the amount of energy stored in the first battery cell. After charging, multiplexers 620a-b and switches 622a-b are then configured to connect capacitor 624a to a second battery cell of battery pack 302. This time, energy stored in capacitor 624a is discharged into the second battery cell thereby increasing the amount of energy stored in the second battery cell. By continuing this process, capacitor 624a shuttles energy between various cells of battery pack 302 and thereby balances the battery cells. In a similar manner, multiplexers 620c-d, switches 622c-d, and capacitor 624b are also used to shuttle energy between various cells of battery pack 302 and balance the battery cells.

Figure 6C:
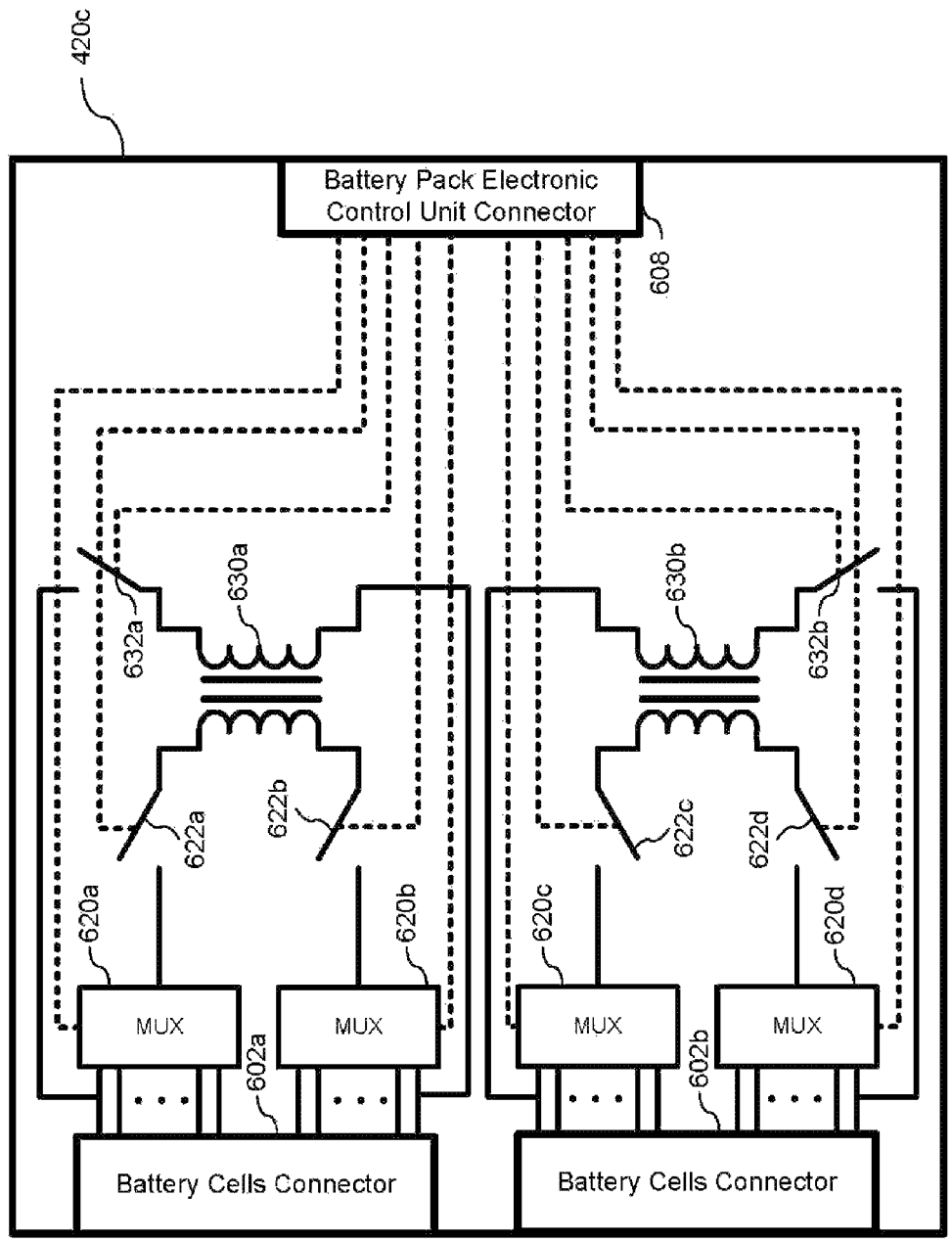
FIG. 6C is a diagram that illustrates a battery pack cell balancer according to an embodiment of the invention.

FIG. 6C is a diagram that illustrates a battery pack cell balancer 420c. Battery pack cell balancer 420c includes a first inductor 630a coupled to two multiplexers (MUX) 620a and 620b through switches 622a and 622b, and a second inductor 630*b* coupled to two multiplexers (MUX) 620*c* and 620*d* through switches 622*c* and 622*d*. Multiplexers 620*a* and 620*b* are connected to battery cells connector 602*a*. Multiplexers 620*c* and 620*d* are connected to battery cells connector 602*b*. Battery cells connectors 602*a* and 602*b* are used to connect battery pack cell balancer 420*a* to the battery cells of battery pack 302. Inductor 630*a* is also connected by a switch 632*a* to battery cells of battery pack 302, and inductor 630*b* is connected by a switch 632*b* to battery cells of battery pack 302. Battery pack electronic control unit (ECU) connector 608 connects switches 622*a-d* and switches 632*a-b* to battery pack controller 414.

In operation, switch 632*a* is first closed to allow energy from the batteries of battery pack 302 to charge inductor 630*a*. This charging removes energy from the battery cells of battery pack 302 and stores the energy in inductor 630*a*. After charging, multiplexers 620*a-b* and switches 622*a-b* are configured to connect inductor 630*a* to a selected battery cell of battery pack 302. Once connected, inductor 630*a* discharges its stored energy into the selected battery cell thereby increasing the amount of energy stored in the selected battery cell. By continuing this process, inductor 630*a* is thus used to take energy from the battery cells of battery pack 302 connected to inductor 632*a* by switch 632*a* and to transfer this energy only to selected battery cells of battery pack 302. The process thus can be used to balance the battery cells of battery pack 302. In a similar manner, multiplexers 620*c-d*, switches 622*c-d* and 632*b*, and inductor 630*b* are also used to transfer energy and balance the battery cells of battery pack 302.

As will be understood by persons skilled in the relevant art given the description herein, each of the circuits described in FIGS. 6A-C have advantages in their operation, and in embodiments of the invention elements of these circuits are combined and used together to bypass and/or transfer energy and thereby balance the battery cells of battery pack 302.

Figure 7:
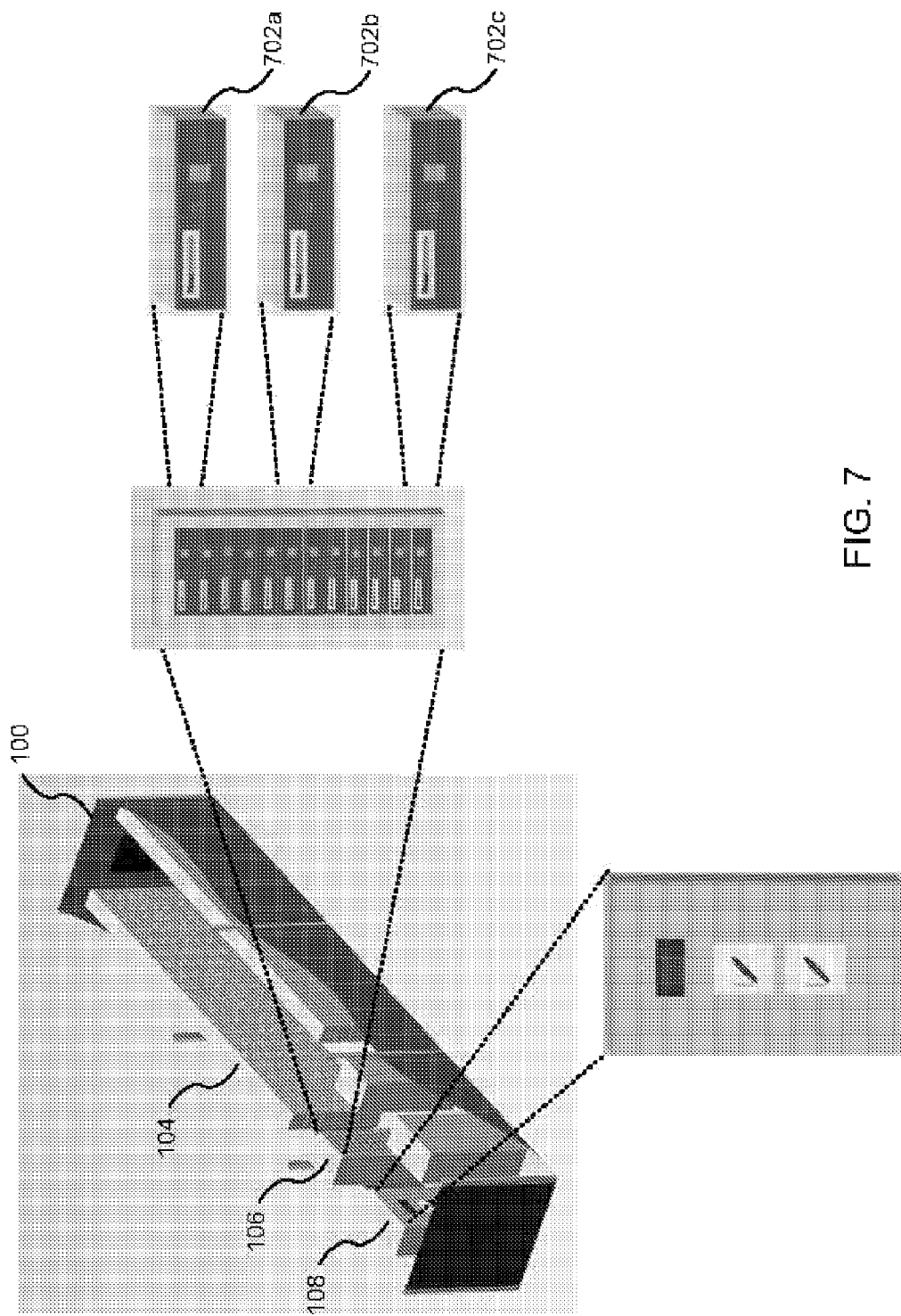
FIG. 7 is a diagram that illustrates an electrical energy storage unit according to an embodiment of the invention.

FIG. 7 is a diagram that further illustrates an electrical energy storage unit 100 according to an embodiment of the invention. As shown in FIG. 7, a control unit 106 includes multiple battery system controllers 702*a-c*. As described in more detail below, each battery system controller 702 monitors and controls a subset of the battery packs 302 that make up a battery unit 104 (see FIG. 3). In an embodiment, the battery system controllers 702 are linked together using CAN (CANBus) communications, which enables the battery system controllers 702 to operate together as part of an overall network of battery system controllers. This network of battery system controllers can manage and operate any size battery system such as, for example, a multi-megawatt-hour centralized storage battery system. In an embodiment, one of the networked battery system controllers 702 can be designated as a master battery system controller and used to control battery charge and discharge operations by sending commands that operate one or more inverters and/or chargers connected to the battery system.

As shown in FIG. 7, in an embodiment electrical energy storage unit 100 includes a bi-directional inverter 108. Bi-directional inverter 108 is capable of both charging a battery unit 104 and discharging the battery unit 104 using commands issued, for example, via a computer over a network (e.g. the Internet, an Ethernet, et cetera) as described in more detail below with reference to FIGS. 10B and 10C. In embodiments of the invention, both the real power and the reactive power of inverter 108 can be controlled. Also, in embodiments, inverter 108 can be operated as a backup power source when grid power is not available and/or electrical energy storage unit 100 is disconnected from the grid.

FIG. 8A is a diagram that further illustrates a battery system controller 702 according to an embodiment of the invention. As shown in FIG. 8A, in an embodiment battery system controller 702 includes an embedded computer processing unit (Embedded CPU) 802, an ampere-hour/power monitor 806, a low voltage relay controller 816, a high voltage relay controller 826, a fuse 830, a current shunt 832, a contactor 834, and a power supply 836.

As shown in FIG. 8A, in an embodiment embedded CPU 802 communicates via CAN (CANBus) communications port 804*a* with ampere-hour/power monitor 806, low voltage relay controller 816, and battery packs 302. In embodiments, as described herein, embedded CPU 802 also communicates with one or more inverters and/or one or more chargers using, for example, CAN (CANBus) communications. Other means of communications can also be used however such as, for example, RS 232 communications or RS 485 communications.

In operation, embedded CPU 802 performs many functions. These functions include: monitoring and controlling selected functions of battery packs 302, ampere-hour/power monitor 806, low voltage relay controller 816, and high voltage relay controller 826; monitoring and controlling when, how much, and at what rate energy is stored by battery packs 302 and when, how much, and at what rate energy is discharged by battery packs 302; preventing the over-charging or over-discharging of the battery cells of battery packs 302; configuring and controlling system communications; receiving and implementing commands, for example, from an authorized user or another networked battery system controller 702; and providing status and configuration information to an authorized user or another networked battery system controller 702. These functions, as well as other functions performed by embedded CPU 802, are described in more detail below.

As described in more detail below, examples of the types of status and control information monitored and maintained by embedded CPU 802 include that identified with references to FIGS. 19A-E, 21, 22A-B, and 23A-B. In embodiments, embedded CPU 802 monitors and maintains common electrical system information such as inverter output power, inverter output current, inverter AC voltage, inverter AC frequency, charger output power, charger output current, charger DC voltage, et cetera. Additional status and control information monitored and maintained by embodiments of embedded CPU 802 will also be apparent to persons skilled in the relevant arts given the description herein.

As shown in FIG. 8A, ampere-hour/power monitor 806 includes a CAN (CANBus) communications port 804*b*, a micro-control unit (MCU) 808, a memory 810, a current monitoring circuit 812, and a voltage monitoring circuit 814. Current monitoring circuit 812 is coupled to current shunt 832 and used to determine a current value and to monitor the charging and discharging of battery packs 302. Voltage monitoring circuit 814 is coupled to current shunt 832 and contactor 834 and used to determine a voltage value and to monitor the voltage of battery packs 302. Current and voltage values obtained by current monitoring circuit 812 and voltage monitoring circuit 814 are stored in memory 810 and communicated, for example, to embedded CPU 802 using CAN (CANBus) communications port 804*b*.

In an embodiment, the current and voltage values determined by ampere-hour/power monitor 806 are stored in memory 810 and are used by a program stored in memory 810, and executed on MCU 808, to derive values for power, ampere-hours, and watt-hours. These values, as well as status information regarding ampere-hour/power monitor 806, are communicated to embedded CPU 802 using CAN (CANBus) communications port 804*b*.

As shown in FIG. 8A, low voltage relay controller 816 includes a CAN (CANBus) communications port 804*c*, a micro-control unit (MCU) 818, a memory 820, a number of relays 822 (i.e., relays R0, R1 . . . RN), and MOSFETS 824. In embodiments, low voltage relay controller 816 also includes temperature sensing circuits (not shown) to monitor, for example, the temperature of the enclosure housing components of battery system controller 702, the enclosure housing electrical energy storage unit 100, et cetera.

In operation, low voltage relay controller 816 receives commands from embedded CPU 802 via CAN (CANBus) communications port 804*c* and operates relays 822 and MOSFETS 824 accordingly. In addition, low voltage relay controller 816 sends status information regarding the states of the relays and MOSFETS to embedded CPU 802 via CAN (CANBus) communications port 804*c*. Relays 822 are used to perform functions such, for example, turning-on and turning-off cooling fans, controlling the output of power supplies such as, for example, power supply 836, et cetera. MOSFETS 824 are used to control relays 828 of high voltage relay controller 826 as well as, for example, to control status lights, et cetera. In embodiments, low voltage relay controller 816 executes a program stored in memory 820 on MCU 818 that takes over operational control for embedded CPU 802 in the event that embedded CPU stops operating and/or communication as expected. This program can then make a determination as to whether it is safe to let the system continue operating when waiting for embedded CPU 802 to recover, or whether to initiate a system shutdown and restart.

As shown in FIG. 8A, high voltage relay controller 826 includes a number of relays 828. One of these relays is used to operate contactor 834, which is used to make or break a connection in a current carrying wire that connects battery packs 302. In embodiments, other relays 828 are used, for example to control operation of one or more inverters and/or one or more chargers. Relays 828 can operate devices either directly or by controlling additional contactors (not shown), as appropriate, based on voltage and current considerations.

In embodiments, a fuse 830 is included in battery system controller 702. The purpose of fuse 830 is to interrupt high currents that could damage battery cells or connecting wires.

Current shunt 832 is used in conjunction with ampere-hour/power monitor 806 to monitor the charging and discharging of battery packs 302. In operation, a voltage is developed across current shunt 832 that is proportional to the current flowing through current shunt 832. This voltage is sensed by current monitoring circuit 812 of ampere-hour/power monitor 806 and used to generate a current value.

Power supply 836 provides DC power to operate the various components of battery system controller 702. In embodiments, the input power to power supply 836 is either AC line voltage, DC battery voltage, or both.

FIGS. 8B and 8C are diagrams that further illustrate an exemplary battery system controller 702 according to an embodiment of the invention. FIG. 8B is a top, front-side view of the example battery system controller 702, with the top cover removed in order to show a layout for the housed components. FIG. 8C is a top, left-side view of the exemplary battery system controller 702, also with the top cover removed to show the layout of the components.

As shown in FIG. 8B, FIG. 8C, or both, battery system controller 702 includes an enclosure 840 that houses embedded CPU 802, ampere-hour/power monitor 806, low voltage relay controller 816, high voltage relay controller 826, a fuse holder and fuse 830, current shunt 832, contactor 834, and power supply 836. Also included in enclosure 840 are a circuit breaker 842, a power switch 844, a first set of signal connectors 846 (on the front side of enclosure 840), a second set of signal connectors 854 (on the back side of enclosure 840), a set of power connectors 856*a-d* (on the back side of enclosure 840), and two high voltage relays 858*a* and 858*b*. In FIGS. 8B and 8C, the wiring has been intentionally omitted so as to more clearly show the layout of the components. How to wire the components together, however, will be understood by persons skilled in the relevant art given the description herein.

The purpose and operation of embedded CPU 802, ampere-hour/power monitor 806, low voltage relay controller 816, high voltage relay controller 826, a fuse holder and fuse 830, current shunt 832, contactor 834, and power supply 836 have already been described above with reference to FIG. 8A. As will be known to persons skilled in the relevant art, the purpose of circuit breaker 842 is safety. Circuit breaker 842 is connected in series with current shunt 832 and is used to interrupt high currents that could damage battery cells or connecting wires. It can also be used, for example, to manually open the current carry wire connecting battery packs 302 together during periods of maintenance or non-use of electrical energy storage unit 100. Similarly, power switch 844 is used to turn-on and turn-off the AC power input to battery system controller 702.

The purpose of the first set of signal connectors 846 (on the front side of enclosure 840) is to be able to connect to embedded CPU 802 without having to take battery system controller 702 out of control unit 106 and/or without having to remove the top cover of enclosure 840. In an embodiment, the first set of signal connectors 846 includes USB connectors 848, RJ-45 connectors 850, and 9-pin connectors 852. Using these connectors, it is possible to connect, for example, a keyboard and a display (not shown) to embedded CPU 802.

The purpose of the second set of signal connectors 854 (on the back side of enclosure 840) is to be able to connect to and communicate with other components of electrical energy storage unit 100 such as, for example, battery packs 302 and inverters and/or chargers. In an embodiment, the second set of signal connectors 854 includes RJ-45 connectors 850 and 9-pin connectors 852. The RJ-45 connectors 850 are used, for example, for CAN (CANBus) communications and Ethernet/internet communications. The 9-pin connectors 852 are used, for example, for RS-232 or RS-485 communications.

The purpose of the power connectors 856*a-d* (on the back side of enclosure 840) is for connecting power conductors. In an embodiment, each power connect 856 has two larger current carrying connection pins and four smaller current carrying connection pins. One of the power connectors 856 is used to connect one end of current shunt 832 and one end of contactor 834 to the power wires connecting together battery packs 302 (e.g., using the two larger current carrying connection pins) and for connecting the input power to one or both of power supplies 416 or 418 of battery packs 302 to control a relay or relays inside enclosure 840 (e.g., using either two or four of the four smaller current carrying connection pins). A second power connector 856 is used, for example, to connect grid AC power to a control relay inside housing 840. In embodiments, the remaining two power connectors 856 are used, for example, to connect relays inside enclosure 840 such as relays 856*a* and 856*b* to power carrying conductors of inverters and/or chargers.

In an embodiment, the purpose of high voltage relays 858*a* and 858*b* is to make or to break a power carrying conductor of a charger and/or an inverter connected to battery packs 302. By breaking the power carrying conductors of a charger and/ or an inverter connected to battery packs 302, these relays can be used to prevent operation of the charger and/or inverter and thus protect against the over-charging or over-discharging of battery packs 302.

FIG. 9 is a diagram that illustrates an electrical energy storage unit 900 according to an embodiment of the invention. Electrical energy storage unit 900, as described herein, can be operated as a stand-alone electrical energy storage unit, or it can be combined together with other electrical energy storage units 900 to form a part of a larger electrical energy storage unit such as, for example, electrical energy storage unit 100.

As shown in FIG. 9, electrical energy storage unit 900 includes a battery system controller 702 coupled to one or more battery packs 302a-n. In embodiments, as described in more detail below, battery system controller 702 can also be coupled to one or more chargers and one or more inverters represented in FIG. 9 by inverter/charge 902.

The battery system controller 702 of electrical energy storage unit 900 includes an embedded CPU 802, an ampere-hour/power monitor 806, a low voltage relay controller 816, a high voltage relay controller 826, a fuse 830, a current shunt 832, a contactor 834, and a power supply 836. Each of the battery packs 302a-n includes a battery module 412, a battery pack controller 414, an AC power supply 416, and a battery pack cell balancer 420.

In operation, for example, during a battery charging evolution, electrical energy storage unit 900 performs as follows. Embedded CPU 802 continually monitors status information transmitted by the various components of electrical energy storage unit 900. If based on this monitoring, embedded CPU 802 determines that the unit is operating properly, then when commanded, for example, by an authorized user or by a program execution on embedded CPU 802 (see, e.g., FIG. 10B below), embedded CPU 802 sends a command to low voltage relay controller 816 to close a MOSFET switch associated with contactor 834. Closing this MOSFET switch activates a relay on high voltage relay controller 826, which in turn closes contactor 834. The closing of contactor 834 couples the charger (i.e., inverter/charger 902) to battery packs 302a-n.

Once the charger is coupled to battery packs 302a-n, embedded CPU 802 sends a command to the charger to start charging the battery packs. In embodiments, this command can be, for example, a charger output current command or a charger output power command. After performing self checks, the charge will start charging. This charging causes current to flow through current shunt 832, which is measured by ampere-hour/power monitor 806. Ampere-hour/power monitor 806 also measures the total voltage of the battery packs 302a-n. In addition to measuring current and voltage, ampere-hour/power monitor 806 calculates a DC power value, an ampere-hour value, and a watt-hour value. The ampere-hour value and the watt-hour value are used to update an ampere-hour counter and a watt-hour counter maintained by ampere-hour/power monitor 806. The current value, the voltage value, the ampere-hour counter value, and the watt-hour counter value are continuously transmitted by ampere-hour/power monitor 806 to embedded CPU 802 and the battery packs 302a-n.

During the charging evolution, battery packs 302a-n continuously monitor the transmissions from ampere-hour/power monitor 806 and use the ampere-hour counter values and watt-hour counter values to update values maintained by the battery packs 302a-n. These values include battery pack and cell state-of-charge (SOC) values, battery pack and cell ampere-hour (AH) dischargeable values, and battery pack and cell watt-hour (WH) dischargeable values, as described in more detail below with reference to FIG. 21. Also during the charging evolution, embedded CPU 802 continuously monitors the transmissions from ampere-hour/power monitor 806 as well as the transmissions from battery packs 302a-n, and uses the ampere-hour counter transmitted values and the battery pack 302a-n transmitted values to update values maintained by embedded CPU 802. The values maintained by embedded CPU 802 include battery pack and cell SOC values, battery pack and cell AH dischargeable values, battery pack and cell WH dischargeable values, battery and cell voltages, and battery and cell temperatures as described in more detail below with reference to FIGS. 22A and 22B. As long as everything is working as expected, the charging evolution will continue until a stop criteria is met. In embodiments, the stop criteria include, for example, a maximum SOC value, a maximum voltage value, or a stop-time value.

During the charging evolution, when a stop criterion is met, embedded CPU 802 sends a command to the charger to stop the charging. Once the charging is stopped, embedded CPU 802 sends a command to low voltage relay controller 816 to open the MOSFET switch associated with contactor 834. Opening this MOSFET switch changes the state of the relay on high voltage relay controller 826 associated with contactor 834, which in turn opens contactor 834. The opening of contactor 834 decouples the charger (i.e., inverter/charger 902) from battery packs 302a-n.

As described in more detail below, battery packs 302a-n are responsible for maintaining the proper SOC and voltage balances of their respective battery modules 412. In an embodiment, proper SOC and voltage balances are achieved by the battery packs using their battery pack controllers 414, and/or their AC power supplies 416 to get their battery modules 412 to conform to target values such as, for example, target SOC values and target voltage values transmitted by embedded CPU 802. This balancing can take place either during a portion of the charging evolution, after the charging evolution, or at both times.

As will be understood by persons skilled in the relevant art given the description here, a discharge evolution by electrical energy storage unit 900 occurs in a manner similar to that of a charge evolution except that the battery packs 302a-n are discharged rather than charged.

FIG. 10A is a diagram that further illustrates electrical energy storage unit 100 according to an embodiment of the invention. As shown in FIG. 10A, electrical energy storage unit 100 is formed by combining and networking several electrical energy storage units 900a-n. Electrical energy storage unit 900a includes a battery system controller 702a and battery packs $302a_1$-$n_1$. Electrical energy storage unit 900n includes a battery system controller 702n and battery packs $302a_n$-$n_n$. The embedded CPUs 802a-n of the battery system controllers 702a-n are coupled together and communicate with each other using CAN (CANBus) communications. Other communication protocols can also be used. Information communicated between the embedded CPUs 802a-n include information identified below with reference to FIGS. 22A and 22B.

In operation, electrical energy storage unit 100 operates similarly to that described herein for electrical energy storage system 900. Each battery system controller 702 monitors and controls its own components such as, for example, battery packs 302. In addition, one of the battery system controllers 702 operates as a master battery system controller and coordinates the activities of the other battery system controllers 702. This coordination includes, for example, acting as an overall monitor for electrical energy storage unit 100 and determining and communicating target values such as, for example target SOC values and target voltage values that can be used to achieve proper battery pack balancing. More details regarding how this is achieved are described below, for example, with reference to FIG. 25.

FIG. 10B is a diagram that illustrates an electrical energy storage system 1050 according to an embodiment of the invention. As illustrated in FIG. 10B, in an embodiment, system 1050 includes an electrical energy storage unit 100 that is in communication with a server 1056. Server 1056 is in communication with data bases/storage devices 1058a-n. Server 1056 is protected by a firewall 1054 and is shown communicating with electrical energy storage unit 100 via internet network 1052. In other embodiments, other means of communication are used such as, for example, cellular communications or an advanced metering infrastructure communication network. Users of electrical energy storage system 1050 such as, for example, electric utilities and/or renewable energy asset operators interact with electrical energy storage system 1050 using user interface(s) 1060. In an embodiment, the user interfaces are graphical, web-based user interfaces, for example, which can be accessed by computers connected directly to server 1056 or to internet network 1052. In embodiments, the information displayed and/or controlled by user interface(s) 1060 include, for example, the information identified below with references to FIGS. 19A-E, 21, 22A-B, and 23A-B. Additional information as will be apparent to persons skilled in the relevant art(s) given the description herein can also be included and/or controlled.

In embodiments, user interface(s) 1060 can be used to update and/or change programs and control parameters used by electrical energy storage unit 100. By changing the programs and/or control parameters, a user can control electrical energy storage unit 100 in any desired manner. This includes, for example, controlling when, how much, and at what rate energy is stored by electrical energy storage unit 100 and when, how much, and at what rate energy is discharged by electrical energy storage unit 100. In an embodiment, the user interfaces can operate one or more electrical energy storage units 100 so that they respond, for example, like spinning reserve and potentially prevent a power brown out or black out.

In an embodiment, electrical energy storage system 1050 is used to learn more about the behavior of battery cells. Server 1056, for example, can be used for collecting and processing a considerable amount of information about the behavior of the battery cells that make up electrical energy storage unit 100 and about electrical energy storage unit 100 itself. In an embodiment, information collected about the battery cells and operation of electrical energy storage unit 100 can be utilized by a manufacturer, for example, for improving future batteries and for developing a more effective future system. The information can also be analyzed to determine, for example, how operating the battery cells in a particular manner effects the battery cells and the service life of the electrical energy storage unit 100. Further features and benefits of electrical energy storage system 1050 will be apparent to persons skilled in the relevant art(s) given the description herein.

FIG. 10C is a diagram that illustrates an electrical energy storage system 1050 according to an alternative embodiment of the invention. A user of the electrical energy storage system 1050 may use a computer 1070 (on which a user interface may be provided) to access the electrical energy storage unit 100 via a network connection 1080 other than the internet. The network 1080 in FIG. 10C may be any network contemplated in the art, including an Ethernet, or even a single cable that directly connects the computer 1070 to the electrical energy storage unit 100.

FIGS. 11-20 are diagrams that further illustrate exemplary electrical energy storage units and various electrical energy storage systems that employee the electrical energy storage units according to the invention.

FIG. 11 is a diagram that illustrates an electrical energy storage system 1100 according to an embodiment of the invention. Electrical energy storage system 1100 includes an electrical energy storage unit 900, a generator 1104, cellular telephone station equipment 1112, and a cellular telephone tower and equipment 1114. As shown in FIG. 11, electrical energy storage unit 900 includes a battery 1102 comprised on ten battery packs 302a-j, a battery system controller 702, a charger 1106, and an inverter 1108. In embodiments of the invention, battery 1102 can contain more ten or less than ten battery packs 302.

In operation, generator 1104 is run and used to charge battery 1102 via charger 1106. When battery 1102 is charged to a desired state, generator 1104 is shutdown. Battery 1102 is then ready to supply power to cellular telephone station equipment 1112 and/or to equipment on the cellular telephone tower. Battery system controller 702 monitors and controls electrical energy storage unit 900 as described herein.

In embodiments of the invention, inverter 1108 can operate at the same time charger 1106 is operating so that inverter 1108 can power equipment without interruption during charging of battery 1102. Electrical energy storage system 1100 can be use for backup power (e.g., when grid power is unavailable), or it can be used continuously in situations in which there is no grid power present (e.g., in an off-grid environment).

FIG. 12 is a diagram that illustrates an electrical energy storage system 1200 according to an embodiment of the invention. Electrical energy storage system 1200 is similar to electrical energy storage system 1100 except that electrical energy storage unit 900 now powers a load 1202. Load 1202 can be any electrical load so long as battery 1102 and generator 1104 are sized accordingly.

Electrical energy storage system 1200 is useful, for example, in off-grid environments such as remote hospitals, remote schools, remote government facilities, et cetera. Because generator 1104 is not required to run continuously to power load 1202, significant fuel savings can be achieved as well as an improvement in the operating life of generator 1104. Other savings can also be realized using electrical energy storage system 1200 such as, for example, a reduction in the costs of transporting the fuel needed to operate generator 1104.

FIG. 13 is a diagram that illustrates an electrical energy storage system 1300 according to an embodiment of the invention. Electrical energy storage system 1300 is similar to electrical energy storage system 1200 except that generator 1104 has been replaced by solar panels 1302. In electrical energy storage system 1300, solar panels 1302 are used to generate the electricity that is used to charge battery 1102 and to power load 1202.

Electrical energy storage system 1300 is useful, for example, in off-grid environments similar to electrical energy storage system 1200. One advantage of electrical energy storage system 1300 over electrical energy storage system 1200 is that no fuel is required. Not having a generator and the no fuel requirement makes electrical energy storage system 1300 easier to operate and maintain than electrical energy storage system 1200.

FIG. 14 is a diagram that illustrates an electrical energy storage system 1400 according to an embodiment of the invention. Electrical energy storage system 1400 is similar to electrical energy storage system 1300 except that solar panels 1302 have been replaced by a grid connection 1402. In electrical energy storage system 1400, grid connection 1402 is used to provide the electricity that is used to charge battery 1102 and to power load 1202.

Electrical energy storage system 1400 is useful, for example, in environments where grid power is available. One advantage of electrical energy storage system 1400 over electrical energy storage system 1300 is that its initial purchase price is less than the purchase price of electrical energy storage system 1400. This is because no solar panels 1302 are required.

FIG. 15 is a diagram that illustrates an electrical energy storage system 1500 according to an embodiment of the invention. Electrical energy storage system 1500 includes an electrical energy storage unit 900 connected to the power grid via grid connection 1402.

Electrical energy storage system 1500 stores energy from the grid and supplies energy to the grid, for example, to help utilities shift peak loads and perform load leveling. As such, electrical energy storage unit 900 can use a bi-directional inverter 1502 rather than, for example, a separate inverter and a separate charger. Using a bi-directional inverter is advantageous in that it typically is less expensive than buying a separate inverter and a separate charger.

In embodiments of the invention, electrical energy storage unit 900 of electrical energy storage system 1500 is operated remotely using a user interface and computer system similar to that described herein with reference to FIG. 10B. Such a system makes the energy stored in battery 1102 dispatchable in a manner similar to how utility operators interact to dispatch energy from a gas turbine.

FIG. 16 is a diagram that illustrates an electrical energy storage system 1600 according to an embodiment of the invention. Electrical energy storage system 1600 includes an electrical energy storage unit 900 (housed in an outdoor enclosure 1602) that is coupled to solar panels 1606 (mounted on the roof of a house 1640) and to a grid connection 1608.

In operation, solar panels 1606 and/or grid connection 1608 can be used to charge the battery of electrical energy storage unit 900. The battery of electrical energy storage unit 900 can then be discharge to power loads within house 1604 and/or to provide power to the grid via grid connection 1608.

FIG. 17 is a diagram that illustrates the electrical energy storage unit 900 housed in outdoor enclosure 1602 according to an embodiment of the invention. As shown in FIG. 17, electrical energy storage unit 900 includes a battery 1102, a battery system controller 702, a charger 1106, and inverter 1108, and a circuit breaker box and circuit breakers 1704. Electrical energy storage unit 900 operates in a manner described herein.

In an embodiment, outdoor enclosure 1602 is a NEMA 3R rated enclosure. Enclosure 1602 has two door mounted on the front side and two doors mounted on the back side of enclosure 1602 for accessing the equipment inside the enclosure. The top and side panels of the enclosure can also be removed for additional access. In embodiment, enclosure 1602 is cooled using fans controlled by battery system controller 702. In embodiments, cooling can also be achieved by an air conditioning unit (not shown) mounted on one of the doors.

As will be understood by persons skilled in the relevant art(s) given the description herein, the invention is not limited to using outdoor enclosure 1602 to house electrical energy storage unit 900. Other enclosures can also be used.

As shown in FIG. 18, in an embodiment of the invention a computer 1802 is used to interact with and control electrical energy storage unit 900. Computer 1802 can be any computer such as, for example, a personal computer running a Windows or a Linux operating system. The connection between the computer 1802 and electrical energy storage system 900 can be either a wired connection or a wireless connection. This system for interacting with electrical energy storage unit 900 is suitable, for example, for a user residing in house 1604 who wants to use the system. For other users such as, for example, a utility operator, a system similar to that described herein with reference to FIG. 10B may be used, thereby providing additional control and more access to information available from electrical energy storage unit 900.

In embodiments of the invention, electrical energy storage unit 900 may be monitored and/or controlled by more than one party such as, for example, by the resident of house 1602 and by a utility operator. In such cases, different priority levels for authorized users can be established in order to avoid any potential conflicting commands.

FIGS. 19A-E are diagrams that illustrate an exemplary user interface 1900 according to an embodiment of the invention, which is suitable for implementation, for example, on computer 1802. The exemplary interface is intended to be illustrative and not limiting of the invention.

Figure 19A:
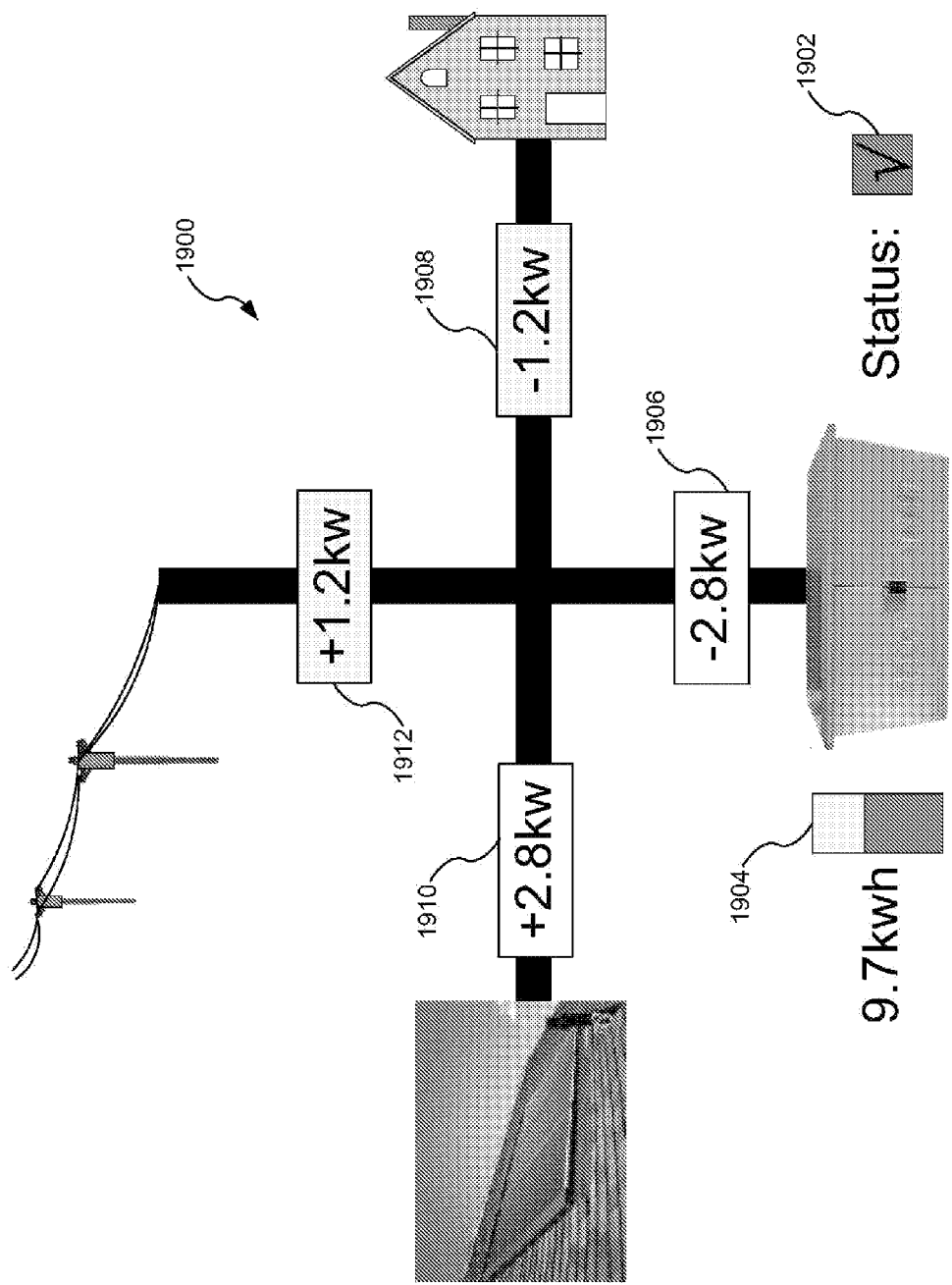

In an embodiment, as shown in FIG. 19A, user interface 1900 includes a status indicator 1902, a stored energy indicator 1904, an electrical energy storage unit power value 1906, a house load value 1908, a solar power value 1910, and a grid power value 1912. The status indicator 1902 is used to indicate the operational status of electrical energy storage unit 900. The stored energy indicator 1904 is used to show how much energy is available to be discharged from electrical energy storage unit 900. The four values 1906, 1908, 1910 and 1912 show the rate and the direction of energy flow of the components of electrical energy storage system 1600.

In FIG. 19A, the value 1906 indicates that energy is flowing into electrical energy storage unit 900 at a rate of 2.8 kw. The value 1908 indicates that energy is flowing into house 1604 to power loads at a rate of 1.2 kw. The value 1910 indicates that energy is being generated by solar panels 1606 at a rate of 2.8 kw. The value 1912 indicates that energy being drawn from grid connection 1608 at a rate of 1.2 kw. From these values, one can determine that the system is working, that the solar panels are generating electricity, that the battery of the electrical energy storage unit is being charged, and that energy is being purchased from a utility at a rate of 1.2 kw.

Figure 19B:
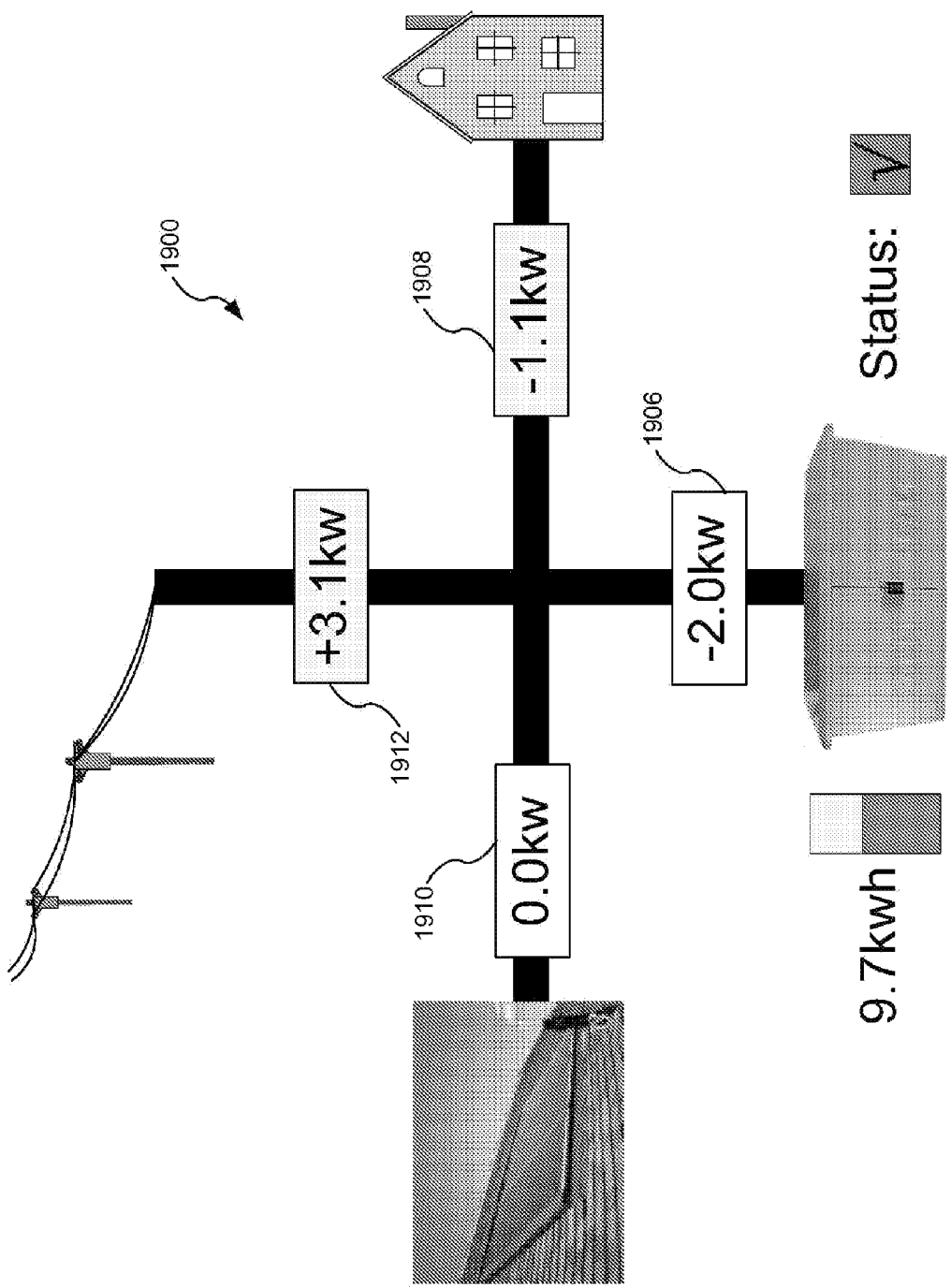

FIG. 19B depicts the state of electrical energy power system 1600 at a point in time when no energy is being produced by the solar panels such as, for example, at night. The value 1906 indicates that energy is flowing into electrical energy storage unit 900 at a rate of 2.0 kw. The value 1908 indicates that energy is flowing into house 1604 to power loads at a rate of 1.1 kw. The value 1910 indicates that no energy is being generated by solar panels 1606. The value 1912 indicates that energy is being provided from grid connection 1608 at a rate of 3.1 kw. From these values, one can determine that the system is working, that the solar panels are not generating electricity, that the battery of the electrical energy storage unit is being charged, and that energy is being purchased from the utility at a rate of 3.1 kw.

Figure 19C:
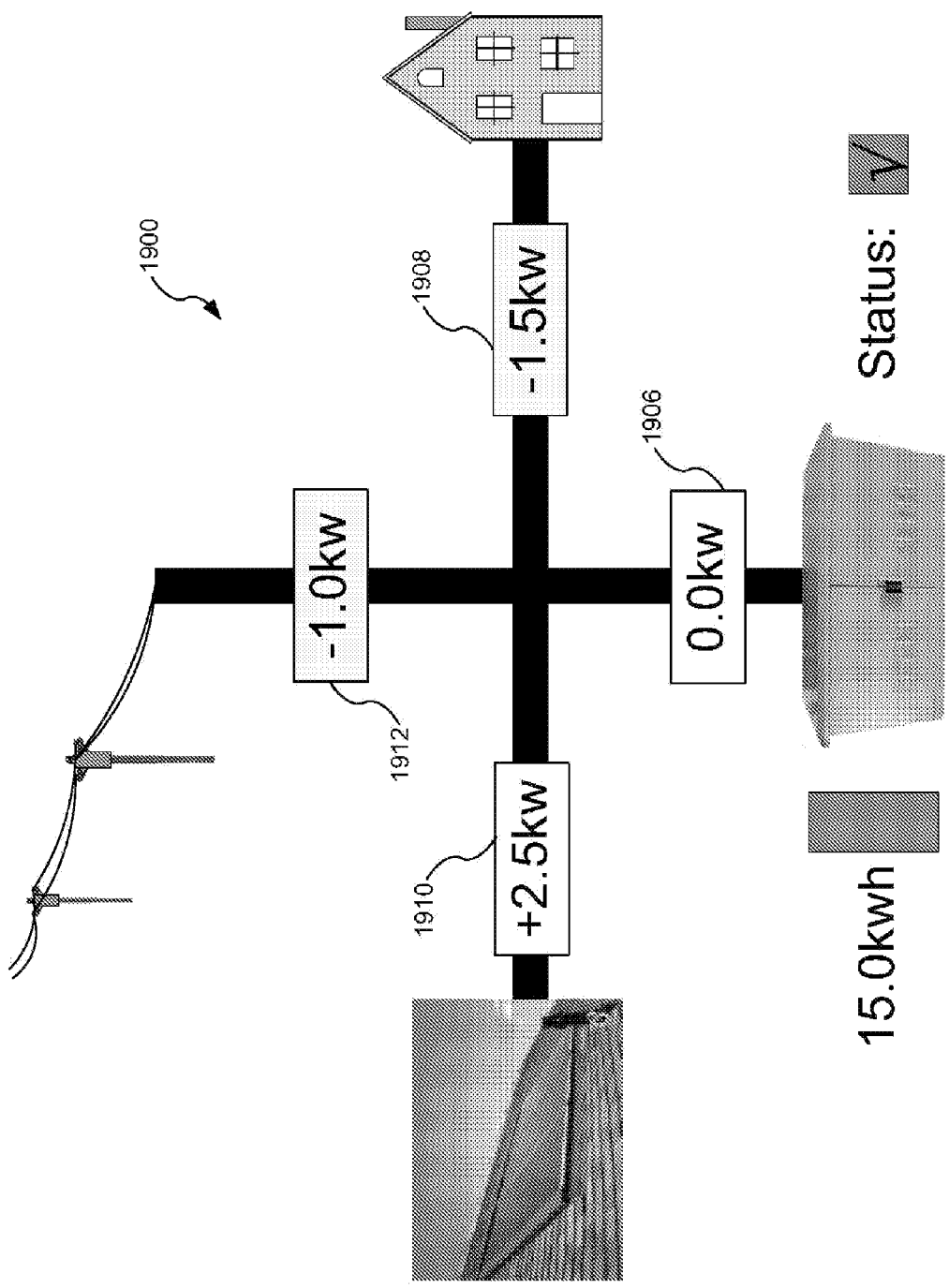

FIG. 19C depicts the state of electrical energy power system 1600 at a point in time in which the battery of electrical energy storage unit 900 is fully charged and the solar panels are generating electricity. The value 1906 indicates electrical energy storage unit 900 is neither consuming power nor generating power. The value 1908 indicates that energy is flowing into house 1604 to power loads at a rate of 1.5 kw. The value 1910 indicates that energy is being generated by solar panels 1606 at a rate of 2.5 kw. The value 1912 indicates that energy is being provided to grid connection 1608 at a rate of 1.0 kw.

Figure 19D:
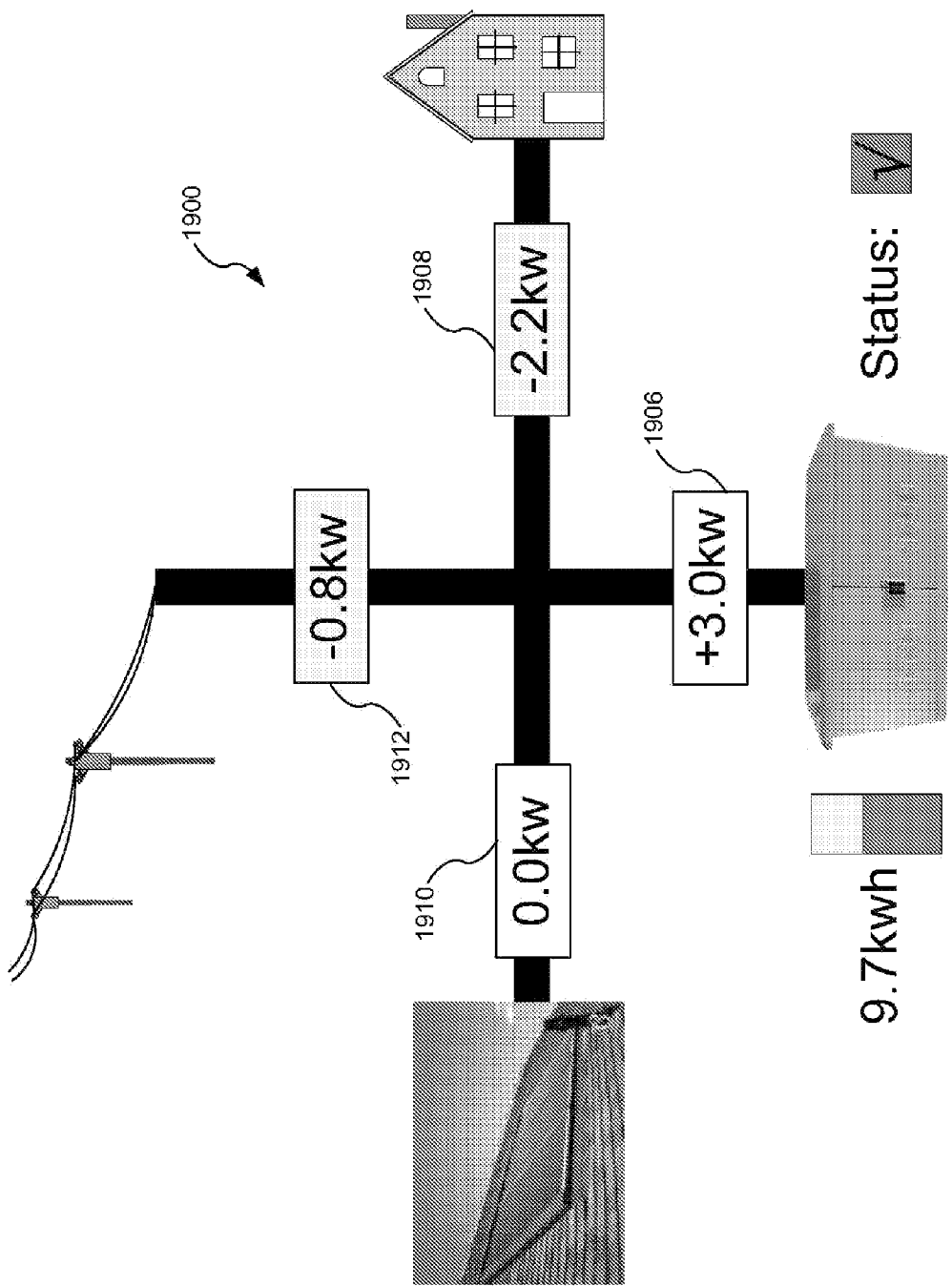

FIG. 19D depicts the state of electrical energy power system 1600 at a point in time when no energy is being produced by the solar panels such as, for example, at night, and when electrical energy storage unit 900 is generating more electricity than is being used to power loads in house 1604. The value 1906 indicates that energy is flowing out of electrical energy storage unit 900 at a rate of 3.0 kw. The value 1908 indicates that energy is flowing into house 1604 to power loads at a rate of 2.2 kw. The value 1910 indicates that no energy is being generated by solar panels 1606. The value 1912 indicates that energy is being provided to grid connection 1608 at a rate of 0.8 kw.

Figure 19E:
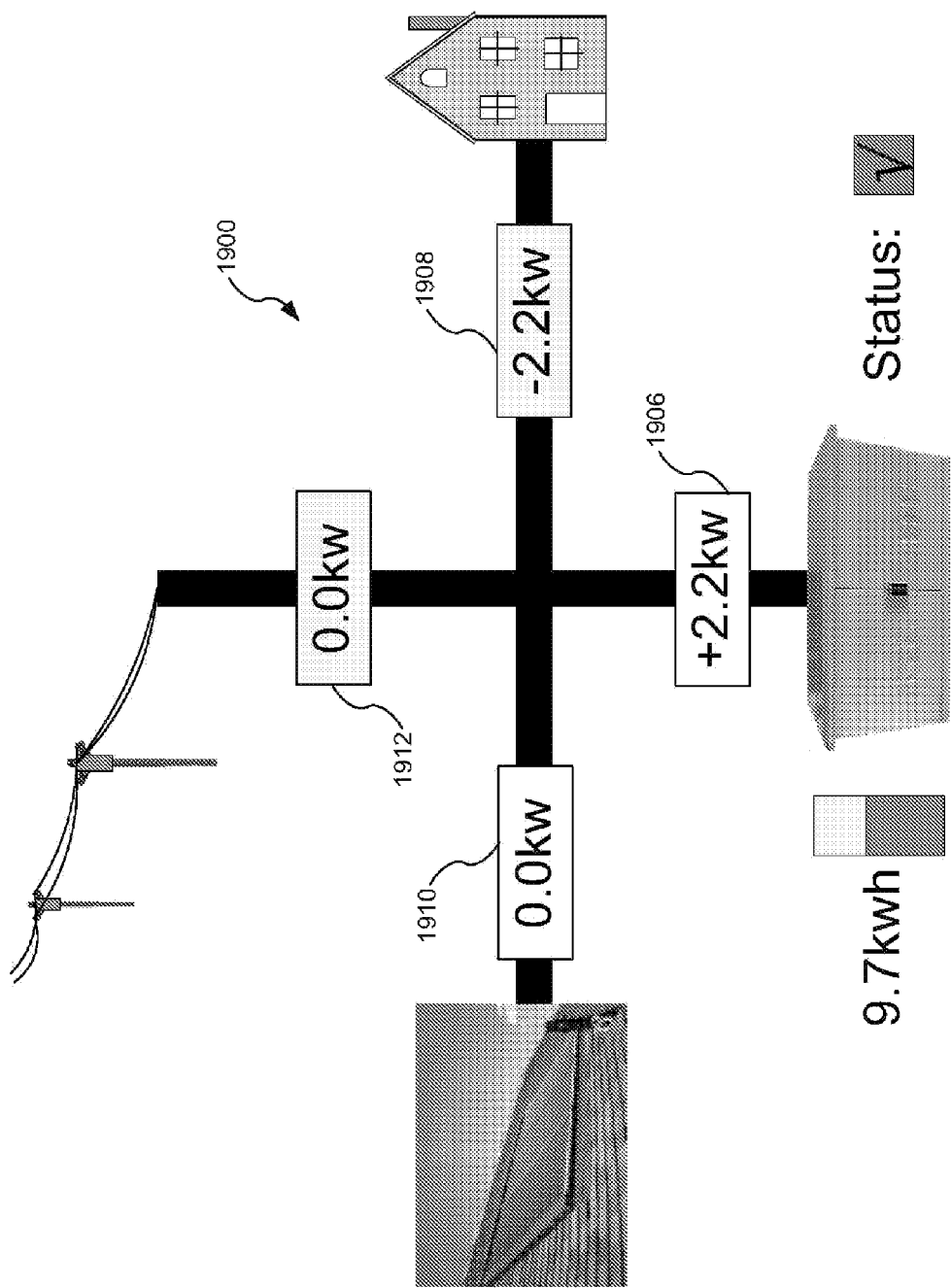

FIG. 19E depicts the state of electrical energy power system 1600 at a point in time when no energy is being produced by the solar panels such as, for example, at night, and when electrical power storage unit 900 is being controlled so as only to generate the electrical needs of loads in house 1604. The value 1906 indicates that energy is flowing out of electrical energy storage unit 900 at a rate of 2.2 kw. The value 1908 indicates that energy is flowing into house 1604 to power loads at a rate of 2.2 kw. The value 1910 indicates that no energy is being generated by solar panels 1606. The value 1912 indicates that no energy is being drawn from or supplied to grid connection 1608.

As will be understood by persons skilled in the relevant arts after reviewed FIGS. 19A-E and the description of the invention herein, electrical energy storage system 1600 has many advantages for both electricity consumers and utilities. These advantages include, but are not limited to, the ability of the utility to level its loads, the ability to provide back-up power for the customer in the event of power disruptions, support for plug-in electric vehicles and the deployment and renewable energy sources (e.g., solar panels), the capability to provide better grid regulation, and the capability to improve distribution line efficiencies.

FIGS. 20-25 are diagrams that illustrate various software features of the invention. In embodiments, the software features are implemented using both programmable memory and non-programmable memory.

FIG. 20 is a diagram that illustrates how various software features of the invention described herein are distributed among the components of an exemplary electrical energy storage unit 900. As shown in FIG. 20, in an embodiment a battery system controller 702 of electrical energy storage unit 900 has three components that include software. The software is executed using a micro-control unit (MCU). These components are an embedded CPU 802, an ampere-hour/power monitor 806, and a low voltage relay controller 816.

Embedded CPU 802 includes a memory 2004 that stores an operating system (OS) 2006 and an application program (APP) 2008. This software is executed using MCU 2002. In an embodiment, this software works together to receive input commands from a user using a user interface, and it provides status information about electrical energy storage unit 900 to the user via the user interface. Embedded CPU 802 operates electrical energy storage unit 900 according to received input commands so long as the commands will not put electrical energy storage unit 900 into an undesirable or unsafe state. Input commands are used to control, for example, when a battery 1102 of electrical energy storage unit 900 is charged and discharged. Input commands are also used to control, for example, the rate at which battery 1102 is charged and discharged as well as how deeply battery 1102 is cycled during each charge-discharge cycle. The software controls charging of battery 1102 by sending commands to a charger electronic control unit (ECU) 2014 of a charger 1106. The software controls discharging of battery 1102 by sending commands to an inverter electronic control unit (ECU) 2024 of an inverter 1108.

In addition to controlling operation of charger 1106 and inverter 1108, embedded CPU 802 works together with battery packs 302a-302n and ampere-hour/power monitor 806 to manage battery 1102. The software resident and executing on embedded CPU 802, the battery system controller 414a-n of battery packs 302a-n, and ampere-hour/power monitor 806 ensure safe operation of battery 1102 at all times and take appropriate action, if necessary, to ensure for example that battery 1102 is neither over-charged nor over-discharged.

As shown in FIG. 20, ampere-hour/power monitor 806 includes a memory 810 that stores an application program 2010. This application program is executed using MCU 808. In embodiments, application program 2010 is responsible for keeping track of how much charge is put into battery 1102 during battery charging evolutions or taken out of battery 1102 during battery discharging evolutions. This information is communicated to embedded CPU 802 and the battery system controllers 414 of battery packs 302.

Low voltage relay controller 816 includes a memory 820 that stores and application program 2012. Application program 2012 is executed using MCU 818. In embodiments, application program 2012 opens and closes both relays and MOSFET switches in responds to commands from embedded CPU 802. In addition, it also sends status information about the states of the relays and MOSFET switches to embedded CPU 802. In embodiments, low voltage relay controller 816 also includes temperature sensors that are monitored using application program 2012, and in some embodiments, application program 2012 includes sufficient functionality so that low voltage relay controller 816 can take over for embedded CPU 802 when it is not operating as expected and make a determination as to whether to shutdown and restart electrical energy storage unit 900.

Charger ECU 2014 of charger 1106 includes a memory 2018 that stores an application program 2020. Application program 2020 is executed using MCU 2016. In embodiments, application program 2020 is responsible for receiving commands from embedded CPU 802 and operating charger 1106 accordingly. Application program 2020 also sends status information about charger 1106 to embedded CPU 802.

Inverter ECU 2024 of inverter 1108 includes a memory 2028 that stores an application program 2030. Application program 2030 is executed using MCU 2026. In embodiments, application program 2030 is responsible for receiving commands from embedded CPU 802 and operating inverter 1108 accordingly. Application program 2030 also sends status information about inverter 1108 to embedded CPU 802.

As also shown in FIG. 20, each battery pack 302 includes a battery system controller 414 that has a memory 518. Each memory 518 is used to store an application program 2034. Each application program 2034 is executed using an MCU 516. The application programs 2034 are responsible for monitoring the cells of each respective battery pack 302 and sending status information about the cells to embedded CPU 802. The application programs 2034 are also responsible for balancing both the voltage levels and the state-of-charge (SOC) levels of the battery cells of each respective battery pack 302.

In an embodiment, each application program 2034 operates as follows. At power on, MCU 518 starts executing boot loader software. The boot loader software copies application software from flash memory to RAM, and the boot loader software starts the execution of the application software.

Once the application software is operating normally, embedded CPU 802 queries battery pack controller 414 to determine whether it contains the proper hardware and software versions for the application program 2008 executing on embedded CPU 802.1f battery pack controller 414 contains an incompatible hardware version, the battery pack controller is ordered to shutdown. If battery pack controller 414 contains an incompatible or outdated software version, embedded CPU 802 provides the battery pack controller with a correct or updated application program, and the battery pack controller reboots in order to start executing the new software.

Once embedded CPU 802 determines that battery pack controller 414 is operating with the correct hardware and software, embedded CPU 802 verifies that battery pack 414 is operating with the correct configuration data. If the configuration data is not correct, embedded CPU 802 provides the correct configuration data to battery pack controller 414, and battery pack controller 414 saves this data for use during its next boot up. Once embedded CPU 802 verifies that battery pack controller 414 is operating with the correct configuration data, battery pack controller 414 executes its application software until it shuts down. In an embodiment, the application software includes a main program that runs several procedures in a continuous while loop. These procedures include, but are not limited to: a procedure to monitor cell voltages; a procedure to monitor cell temperatures; a procedure to determine each cell's SOC; a procedure to balance the cells; a CAN (CANBus) transmission procedure; and a CAN (CANBus) reception procedure. Other procedures implemented in the application software include alarm and error identification procedures as well as procedures needed to obtain and manage the data identified in FIG. 21 not already covered by one of the above procedures.

As will be understood by persons skilled in the relevant art(s) given the description herein, the other application programs described herein with reference to FIG. 20 operate in a similar manner except that the implemented procedures obtain and manage different data. This different data is described herein both above and below with reference to other figures.

FIG. 21 is a diagram that illustrates exemplary data obtained and/or maintained by the battery pack controllers 414 of battery packs 302. As shown in FIG. 21, this data includes: the SOC of the battery pack as well as the SOC of each cell; the voltage of the battery pack as well as the voltage of each cell; the average temperature of the battery pack as well as the temperature of each cell; the AH dischargeable of the battery pack as well as each cell; the WH dischargeable of the battery pack as well as each cell; the capacity of the battery pack as well as each cell; information about the last calibration discharge of the battery pack; information about the last calibration charge of the battery pack, information about the AH and WH efficiency of the battery pack and each cell; and self discharge information.

FIGS. 22A-B are diagrams that illustrate exemplary data obtained and/or maintained by embedded CPU 802 in an embodiment of electrical energy storage unit 900 according to the invention. As shown in FIGS. 22A-B, this data includes: SOC information about battery 1102 and each battery pack 302; voltage information about battery 1102 and each battery pack 302; temperature information about battery 1102 and each battery pack 302; AH dischargeable information about battery 1102 and each battery pack 302; WH dischargeable information about battery 1102 and each battery pack 302; capacity information about battery 1102 and each battery pack 302; information about the last calibration discharge of battery 1102 and each battery pack 302; information about the last calibration charge of battery 1102 and each battery pack 302, information about the AH and WH efficiency of battery 1102 and each battery pack 302; and self discharge information.

In addition to the data identified in FIGS. 22A-B, embedded CPU 802 also obtains and maintains data related to the health or cycle life of battery 1102. This data is identified in FIGS. 23A-B.

In an embodiment, the data shown in FIGS. 23A-B represents a number of charge and discharge counts (i.e., counter values), which work as follows. Assume for example that the battery is initially at 90% capacity, and it is discharged down to 10% of its capacity. This discharge represents an 80% capacity discharge, in which the ending discharge state is 10% of capacity. Thus, for this discharge, the discharge counter represented by a battery SOC after discharge of 10-24%, and which resulted from a 76-90% battery capacity discharge (i.e., the counter in FIG. 23B having a value of 75), would be incremented. In a similar manner, after each charge evolution or discharge evolution of the battery, embedded CPU 802 determines the appropriate counter to increment and increments it. A procedure implemented in software adds the values of the counts, using different weights for different counter values, to determine an effective cycle-life for the battery. For purposes of the invention, the exemplary counters identified in FIGS. 23 A-B are intended to be illustrative and not limiting.

FIGS. 24A-B are diagrams that illustrate how calibration, charging and discharging evolutions of an electrical energy storage unit are controlled according to an embodiment of the invention. As described herein, the battery of an electrical energy storage unit is managed based on both battery cell voltage levels and battery cell state-of-charge (SOC) levels.

As shown in FIG. 24A and described below, four high voltage values 2402 (i.e., $V_{H1}$, $V_{H2}$, $V_{H3}$, and $V_{H4}$) and four high state-of-charge values 2406 (i.e., $SOC_{H1}$, $SOC_{H2}$, $SOC_{H3}$, and $SOC_{H4}$) are used to control charging evolution. Four low voltage values 2404 (i.e., $V_{L1}$, $V_{L2}$, $V_{L3}$, and $V_{L4}$) and four low state-of-charge values 2408 (i.e., $SOC_{L1}$, $SOC_{L2}$, $SOC_{L3}$, and $SOC_{L4}$) are used to control discharging evolution. In embodiments of the invention, as shown in FIG. 24A, the voltages 2410a for a particular set of battery cells (represented by X's in FIG. 24A) can all be below a value of $V_{H1}$ while the SOC values 2410b for some or all of these cells is at or above a value of $SOC_{H1}$. Similarly, as shown in FIG. 24B, the voltages 2410c for a set of battery cells (represented by X's in FIG. 24B) can all be above a value of $V_{L1}$ while the SOC values 2410d for some or all of these cells is at or below a value of $SOC_{L1}$. Therefore, as described in more detail below, all eight voltage values and all eight SOC values are useful, as described herein, for managing the battery of an electrical energy storage unit according to the invention.

Because, as described herein, cell voltage values and cell SOC values are important to the proper operation of an electrical energy storage unit according to the invention, it is necessary to periodically calibrate the unit so that it is properly determining the voltage levels and the SOC levels of the battery cells. This is done using a calibration procedure implemented in software.

The calibration procedure is initially executed when a new electrical energy storage unit is first put into service. Ideally, all the cells of the electrical energy storage unit battery should be at about the same SOC (e.g., 50%) when the battery cells are first installed in the electrical energy storage unit. This requirement is to minimize the amount of time needed to complete the initial calibration procedure. Thereafter, the calibration procedure is executed whenever one of the following recalibration triggering criteria is satisfied: Criteria 1: a programmable recalibration time interval such as, for example six months have elapsed since the last calibration date; Criteria 2: the battery cells have been charged and discharged (i.e., cycled) a programmable number of weighted charge and discharge cycles such as, for example, the weighted equivalent of 150 full charge and full discharge cycles; Criteria 3: the high SOC cell and the low SOC cell of the electrical energy storage unit battery differ by more than a programmable SOC percentage such as, for example 2-5% after attempting to balance the battery cells; Criteria 4: during battery charging, a situation is detected where one cell reaches a value of $V_{H4}$ while one or more cells are at a voltage of less than $V_{H1}$ (see FIG. 24A), and this situation cannot be corrected by cell balancing; Criteria 5: during battery discharging, a situation is detected where one cell reaches $V_{L4}$ while one or more cells are at a voltage of greater than $V_{L1}$, and this situation cannot be corrected by cell balancing.

When one of the above recalibration trigger criteria is satisfied, a battery recalibration flag is set by embedded CPU 802. The first battery charge performed after the battery recalibration flag is set is a charge evolution that fully charges all the cells of the battery. The purpose of this charge is to put all the cells of the battery into a known full charge state. After the battery cells are in this known full charge state, the immediately following battery discharge is called a calibration discharge. The purpose of the calibration discharge is to determine how many dischargeable ampere-hours of charge are stored in each cell of the battery and how much dischargeable energy is stored in each cell of the battery when fully charged. The battery charge conducted after the calibration discharge is called a calibration charge. The purpose of the calibration charge is to determine how many ampere-hours of charge must be supplied to each battery cell and how many watt-hours of energy must be supplied to each battery cell following a calibration discharge to get all the cells back to their known conditions at the end of the full charge. The values determined during implementation of this calibration procedure are stored by embedded CPU 802 and used to determine the SOC of the battery cells during normal operation of the electrical energy storage unit.

In an embodiment, the first charge after the battery recalibration flag is set is performed as follows. Step 1: Charge the cells of the battery at a constant current rate of CAL-I until the first cell of the battery reaches a voltage of $V_{H2}$. Step 2: Once the first cell of the battery reaches a voltage of $V_{H2}$, reduce the battery cell charging current to a value called END-CHG-I, and resume charging the battery cells. Step 3: Continue charging the battery cells at the END-CHG-I current until all cells of the battery have obtained a voltage value between $V_{H3}$ and $V_{H4}$. Step 4: If during Step 3, any cell reaches a voltage of $V_{H4}$: (a) Stop charging the cells; (b) Discharge, for example, using balancing resistors all battery cells having a voltage greater than $V_{H3}$ until these cells have a voltage of $V_{H3}$; (c) Once all cell voltages are at or below $V_{H3}$, start charging the battery cells again at the END-CHG-I current; and (d) Loop back to Step 3. This procedure when implemented charges all of the cells of the battery to a known state-of-charge called $SOC_{H3}$ (e.g., an SOC of about 98%). In embodiments, the charge rate (CAL-I) should be about 0.3 C and the END-CHG-I current should be about 0.02 to 0.05 C.

As noted above, the first discharge following the above charge is a calibration discharge. In embodiments, the calibration discharge is performed as follows. Step 1: Discharge the cells of the battery at a constant current rate of CAL-I until the first cell of the battery reaches a voltage of $V_{L2}$. Step 2: Once the first cell of the battery reaches a voltage of $V_{L2}$, reduce the battery cell discharging current to a value called END-DISCHG-I (e.g., about 0.02-0.05 C), and resume discharging the battery cells. Step 3: Continue discharging the battery cells at the END-DISCHG-I current until all cells of the battery have obtained a voltage value between $V_{L3}$ and $V_{L4}$. Step 4: If during Step 3, any cell reaches a voltage of $V_{L4}$: (a) Stop discharging the cells; and (b) Discharge, for example using the balancing resistors all battery cells having a voltage greater than $V_{L3}$ until these cells have a voltage of $V_{L3}$. At the end of the calibration discharge, determine the ampere-hours discharged by each cell and the watt-hours discharged by each cell, and record these values as indicated by FIGS. 21, 22A, and 22B. As described herein, the purpose of the calibration discharge is to determine how many dischargeable ampere-hours of charge are stored in each battery cell and how much dischargeable energy is stored in each battery cell when fully charged.

Following the calibration discharge, the next charge that is performed is called a calibration charge. The purpose of the calibration charge is to determine how many ampere-hours of charge must be supplied to each battery cell and how many watt-hours of energy must be supplied to each battery cell following a calibration discharge to get all the cells back to a full charge. This procedure works as follows: Step 1: Charge the cells of the battery at a constant current rate of CAL-I until the first cell of the battery reaches a voltage of $V_{H2}$; Step 2: Once the first cell of the battery reaches a voltage of $V_{H2}$, reduce the battery cell charging current to a value called END-CHG-I, and resume charging the battery cells. Step 3: Continue charging the battery cells at the END-CHG-I current until all cells of the battery have obtained a voltage value between $V_{H3}$ and $V_{H4}$. Step 4: If during Step 3, any cell reaches a voltage of $V_{H4}$: (a) Stop charging the cells; (b) Discharge, for example, using the balancing resistors all battery cells having a voltage greater than $V_{H3}$ until these cells have a voltage of $V_{H3}$; (c) Once all cell voltages are at or below $V_{H3}$, start charging the battery cells again at the END-CHG-I current; and (d) Loop back to Step 3. At the end of the calibration charge, the determined ampere-hours needed to recharge each battery cell and the determined watt-hours needed to recharge each battery cell are recorded as indicated by FIGS. 21, 22A, and 22B. By comparing the calibration charge information to the calibration discharge information, one can determine both the AH efficiency and the WH efficiency of the electrical energy storage unit.

In embodiments of the invention, when the battery of the electrical energy storage unit is charged during normal operations, it is charged using the follow charge procedure. Step 1: Receive a command specifying details for charging the electrical energy storage unit battery from an authorized user or the application program running on embedded CPU 802. This message can specify, for example, a charging current (CHG-I), a charging power (CHG-P), or an SOC value to which the battery should be charged. The command also can specify a charge start time, a charge stop time, or a charge duration time. Step 2: After receipt of the command, the command is verified, and a charge evolution is scheduled according to the specified criteria. Step 3: At the appropriate time, the electrical energy storage unit battery is charged according to the specified criteria so long as no battery cell reaches an SOC greater than $SOC_{H2}$ and no battery cell reaches a voltage of $V_{H2}$. Step 4: If during the charge, a cell of the battery reaches a state-of-charge of $SOC_{H2}$ or a voltage of $V_{H2}$, the charging rate is reduced to a rate no greater than END-CHG-I, and in an embodiment the balancing resistor for the cell is employed (i.e., the balancing resistor's switch is closed) to limit the rate at which the cell is charged. Step 5: After the charging rate is reduced in Step 4, the charging of the battery cells continues at the reduced charging rate until all cells of the battery have obtained an SOC of at least $SOC_{H1}$ or a voltage value between $V_{H1}$ and $V_{H3}$. As battery cells obtain a value of $SOC_{H0}$ or $V_{H2}$, their balancing resistors are employed to reduce their rate of charge. Step 6: If during Step 5, any cell reaches a state-of-charge of $SOC_{H3}$ or a voltage of $V_{H3}$: (a) The charging of the battery cells is stopped; (b) After the charging is stopped, all battery cells having a state-of-charge greater than $SOC_{H2}$ or a voltage greater than $V_{H2}$ are discharged using the balancing resistors until these cells have a state-of-charge of $SOC_{H2}$ or a voltage of $V_{H2}$; (c) Once all cell voltages are at or below $SOC_{H2}$ and $V_{H2}$, start charging the battery cells again at the END-CHG-I current; and (d) Loop back to Step 3.

In embodiments, at the end of the charge procedure described above, the recalibration criteria are checked to determine whether the calibration procedure should be implemented. If any of the calibration triggering criteria is satisfied, then the recalibration flag is set by embedded CPU 802.

In embodiments of the invention, when the battery of the electrical energy storage unit is discharged during normal operations, it is discharged using the follow charge procedure. Step 1: Receive a command specifying details for discharging the electrical energy storage unit battery. This command can specify, for example, a discharging current (DISCHG-I), a discharging power (DISCHG-P), or an SOC value to which the battery should be discharged. The command also can specify a discharge start time, a discharge stop time, or a discharge duration time. Step 2: After receipt of the command, the command is verified, and a discharge evolution is scheduled according to the specified criteria. Step 3: At the appropriate time, the electrical energy storage unit battery is discharged according to the specified criteria so long as no battery cell reaches an SOC less than $SOC_{L2}$ and no battery cell reaches a voltage of $V_{L2}$. Step 4: If during the discharge, a cell of the battery reaches a state-of-charge of $SOC_{L2}$ or a voltage of $V_{L2}$, the discharging rate is reduced to a rate no greater than END-DISCHG-I, and the balancing resistor for the cell is employed (i.e., the balancing resistor's switch is closed) to limit the rate at which the cell is discharged. Step 5: After the discharging rate is reduced in Step 4, the discharging of the battery cells continues at the reduced discharging rate until all cells of the battery have obtained an SOC of at least $SOC_{L1}$ or a voltage value between $V_{L1}$ and $V_{L3}$. Step 6: If during Step 5, any cell reaches a state-of-charge of $SOC_{L3}$ or a voltage of $V_{L3}$: (a) The discharging of the battery cells is stopped; (b) After the discharging is stopped, all battery cells having a state-of-charge greater than $SOC_{L1}$ or a voltage greater than $V_{L1}$ are discharged using the balancing resistors until these cells have a state-of-charge of $SOC_{L1}$ or a voltage of $V_{L1}$; (c) Once all cell voltages are at or below $SOC_{L1}$ or $V_{L1}$, all balancing switches are opened and the discharge of the battery cells is stopped.

At the end of the discharge procedure, the battery recalibration criteria are checked to determine whether the calibration procedure should be implemented. If any of the calibration triggering criteria is satisfied, then the battery recalibration flag is set by embedded CPU 802.

As described herein, embedded CPU 802 and the battery packs 302 continuously monitor the voltage levels and SOC levels of all the cells of the ESU battery. If at any time a cell's voltage or a cell's SOC exceeds or falls below a specified voltage or SOC safety value (e.g., $V_{H4}$, $SOC_{H4}$, $V_{L4}$, or $SOC_{L4}$), embedded CPU 802 immediately stops whatever operation is currently being executed and starts, as appropriate, an over-charge prevention or an over-discharge prevention procedure as described below.

An over-charge prevention procedure is implemented, for example, any time embedded CPU 802 detects a battery cell having a voltage greater than $V_{H4}$ or a state-of-charge greater than $SOC_{H4}$. In embodiments, when the over-charge prevention procedure is implemented, it turns-on a grid-connected inverter (if available) and discharges the battery cells at a current rate called OCP-DISCHG-I (e.g., 5 Amps) until all cells of the battery are at or below a state-of-charge level of $SOC_{H3}$ and at or below a voltage level of $V_{H3}$. If no grid connected inverter is available to discharge the battery cells, then balancing resistors are used to discharge any cell having a state-of-charge level greater than $SOC_{H3}$ or a voltage level greater than $V_{H3}$ until all cells are at a state-of-charge level less than or equal to $SOC_{H3}$ and a voltage level less than or equal to $V_{H3}$.

If during operation, embedded CPU 802 detects a battery cell having a voltage less than $V_{L4}$ or a state-of-charge less than $SOC_{L4}$, embedded CPU 802 will immediately stop the currently executing operation and start implementing an over-discharge prevention procedure. The over-discharge prevention procedure turns-on a charger (if available) and charges the batteries at a current rate called ODP-CHG-I (e.g., 5 Amps) until all cells of the battery are at or above a state-of-charge level of $SOC_{L3}$ and at or above a voltage level of $V_{L3}$. If no charger is available to charge the battery cells, then the individual battery pack balancing chargers are used to charge any cell having a state-of-charge level lower than $SOC_{L3}$ or a voltage level lower than $V_{L3}$ until all cells are at a state-of-charge level greater than or equal to $SOC_{L3}$ and a voltage level greater than or equal to $V_{L3}$.

As described herein, one of the functions of the battery packs 302 is to control the voltage balance and the SOC balance of its battery cells. This is achieved using a procedure implemented in software. In an embodiment, this procedure is as follows. Embedded CPU 802 monitors and maintains copies of the voltage and SOC information transmitted by the battery packs 302. The information is used by embedded CPU 802 to calculate target SOC values and/or target voltage values that are communicated to the battery packs 302. The battery packs 302 then try to match the communicated target values to within a specified tolerance range. As described above, this is accomplished by the battery packs 302 by using, for example, balancing resistors or energy transfer circuit elements and balancing chargers.

In order to more fully understand how balancing is achieved in accordance with embodiments of the invention, consider the situation represented by the battery cell voltage values or cell SOC values 2502a depicted in the top half of FIG. 25. The cells 2504 of battery pack 1 (BP-1) are closely centered about a value $V/SOC_2$. The cells 2506 of battery pack 2 (BP-2) are loosely centered about a value between $V/SOC_2$ and $V/SOC_3$. The cells 2508 of battery pack 3 (BP-3) are closely centered about a value $V/SOC_1$. The cells 2510 of battery pack 4 (BP-4) are closely centered about a value between $V/SOC_2$ and $V/SOC_3$. Assuming the targeted value communicated to the battery packs by embedded CPU 802 is that shown in the bottom half of FIG. 25 (i.e., a value between $V/SOC_2$ and $V/SOC_3$), the following actions can be taken by the battery packs to achieve this targeted value. For battery pack 1, the battery pack's balancing charger (e.g., AC balancing charger 416) can be turned-on to add charge to cells 2504 and thereby increase their values from the shown in the top half of FIG. 25 to that shown in the bottom half of FIG. 25. For battery pack 2, the battery pack's balancing charger can be turned-on to add charge to cells 2506 while at the same time closing balancing resistors associated with certain high value cells (thereby by passing charging current), and then turning-off the balancing charger while still leaving some of the balancing resistors closed to discharge energy from the highest value cells until the cells 2506 achieve the state shown in the bottom half of FIG. 25. For battery pack 3, the battery pack's balancing charger can be turned-on to add charge to cells 2508 while at the same time closing balancing resistors associated with certain high value cells (thereby by passing charging current) until the cells 2508 achieve the state shown in the bottom half of FIG. 25. For battery pack 4, no balancing is required because the cells 2510 already conform to the targeted value.

While the above balancing example only discusses balancing four battery packs, the balancing procedure can be applied to balance any number of battery packs. Also, since the procedure can be applied to both SOC values as well as voltage values, the procedure can be implemented at anything in a electrical energy storage unit according to the invention, and it is not limited to periods of time when the battery of the electrical energy storage unit is being charged or discharged.

As will be understood by persons skilled in the relevant art(s) given the description herein, various features of the invention can be implemented using processing hardware, firmware, software and/or combinations thereof such as, for example, application specific integrated circuits (ASICs). Implementation of these features using hardware, firmware and/or software will be apparent to a person skilled in the relevant art. Furthermore, while various embodiments of the invention have been described above, it should be understood that they have been presented by way of example, and not limitation. It will be apparent to persons skilled in the relevant art(s) that various changes can be made therein without departing from the scope of the invention.

It should be appreciated that the detailed description of the invention provided herein, and not the summary and abstract sections, is intended to be used to interpret the claims. The summary and abstract sections may set forth one or more but not all exemplary embodiments of the invention as contemplated by the inventor.

What is claimed is:

1. An electrical energy storage unit, comprising:
   a battery pack controller comprising a processor, the battery pack controller configured to monitor a plurality of battery cells;
   a battery pack discharger, coupled to the battery pack controller, configured to individually discharge energy from each of the plurality of battery cells; and
   a battery pack charger, coupled to the battery pack controller, configured to charge the plurality of battery cells,
   wherein the battery pack controller receives a target balancing value and controls operation of the battery pack discharger and the battery pack charger to adjust a state-of-charge of each of the plurality of battery cells toward the target balancing value by at least:
      instructing, by the battery pack controller, the battery pack charger to charge the plurality of battery cells in response to the state-of-charge of at least one of the plurality of battery cells being below a first threshold related to the target balancing value, and
      instructing, by the battery pack controller, the battery pack discharger to individually discharge one or more of the plurality of battery cells in response to the state-of-charge of the one or more battery cells being above a second threshold related to the target balancing value.

2. The electrical energy storage unit of claim 1, wherein the plurality of battery cells are lithium ion battery cells.

3. The electrical energy storage unit of claim 1, wherein the battery pack discharger comprises a plurality of resistors that are used to discharge energy stored in the plurality of battery cells.

4. The electrical energy storage unit of claim 1, wherein the battery pack discharger comprises one of a capacitor and an inductor that is used to transfer energy stored in a first battery cell to a second battery cell of the plurality of battery cells.

5. The electrical energy storage unit of claim 1, wherein the battery pack controller controls operation of the battery pack discharger and the battery pack charger to adjust a voltage of each of the plurality of battery cells.

6. The electrical energy storage unit of claim 1, wherein the battery pack charger is a constant current charger.

7. The electrical energy storage unit of claim 1, further comprising:
   a second battery pack controller comprising a second processor, the second battery pack controller configured to monitor a second plurality of battery cells;
   a second battery pack discharger, coupled to the second battery pack controller, configured to individually discharge energy from each of the second plurality of battery cells; and
   a second battery pack charger, coupled to the second battery pack controller, configured to charge the second plurality of battery cells,
   wherein the second battery pack controller receives the target balancing value and controls operation of the second battery pack discharger and the second battery pack charger to adjust a state-of-charge of each of the second plurality of battery cells toward the target balancing value by at least:
      instructing, by the second battery pack controller, the second battery pack charger to charge the second plurality of battery cells in response to the state-of-charge of at least one of the second plurality of battery cells being below the first threshold related to the target balancing value, and
      instructing, by the second battery pack controller, the second battery pack discharger to individually discharge one or more of the second plurality of battery cells in response to the state-of-charge of the one or more battery cells being above the second threshold related to the target balancing value.

8. The electrical energy storage unit of claim 7, further comprising:
   a battery system controller, coupled to the first battery pack controller and to the second battery pack controller,
   wherein the battery system controller calculates the target balancing value and transmits the target balancing value to the first battery pack controller and to the second battery pack controller.

9. The electrical energy storage unit of claim 8, wherein the battery system controller communicates a voltage value to the second battery pack controller, and the second battery pack controller controls the second battery pack discharger and the second battery pack charger based at least on the voltage value.

10. The electrical energy storage unit of claim 7, further comprising:
    an ampere-hour monitor, coupled to the second battery pack controller,
    wherein the ampere-hour monitor calculates an ampere-hour value, and the second battery pack controller determines the state-of-charge of each of the second plurality of battery cells based at least on the ampere-hour value.

11. An electrical energy storage unit, comprising:
a battery system controller that calculates a target balancing value; and
a plurality of battery packs, coupled to the battery system controller, wherein each battery pack comprises:
   a plurality of battery cells;
   a battery pack controller comprising a processor, the battery pack controller configured to monitor the plurality of battery cells;
   a battery pack discharger, coupled to the battery pack controller, configured to individually discharge energy from each of the plurality of battery cells; and
   a battery pack charger, coupled to the battery pack controller, configured to charge the plurality of battery cells,
   wherein the battery pack controller receives the target balancing value and controls operation of the battery pack discharger and the battery pack charger to adjust a state-of-charge of each of the plurality of battery cells toward the target balancing value by at least:
      instructing, by the battery pack controller, the battery pack charger to charge the plurality of battery cells in response to the state-of-charge of at least one of the plurality of battery cells being below the first threshold related to the target balancing value, and
      instructing, by the battery pack controller, the battery pack discharger to individually discharge one or more of the plurality of battery cells in response to the state-of-charge of the one or more battery cells being above the second threshold related to the target balancing value.

12. The electrical energy storage unit of claim 11, wherein the plurality of battery cells are lithium ion battery cells.

13. The electrical energy storage unit of claim 11, wherein the battery pack discharger comprises a plurality of resistors that are used to discharge energy stored in the plurality of battery cells.

14. The electrical energy storage unit of claim 11, wherein the battery pack discharger comprises one of a capacitor and an inductor that is used to transfer energy stored in a first battery cell to a second battery cell of the plurality of battery cells.

15. The electrical energy storage unit of claim 11, wherein the battery pack controller controls operation of the battery pack discharger and the battery pack charger to adjust a voltage of each of the plurality of battery cells.

16. The electrical energy storage unit of claim 11, wherein the battery pack charger is a constant current charger.

17. The electrical energy storage unit of claim 11, further comprising:
   an ampere-hour monitor, coupled to the battery system controller,
   wherein the ampere-hour monitor calculates an ampere-hour value, and the battery pack controller determines the state-of-charge of each of the plurality of battery cells based at least on the ampere-hour value.

18. The electrical energy storage unit of claim 17, further comprising: a relay controller, coupled to the battery system controller.

19. The electrical energy storage unit of claim 17, further comprising: a charger, coupled to the plurality of battery packs.

20. The electrical energy storage unit of claim 17, further comprising: an inverter, coupled to the plurality of battery packs.

* * * * *